United States Patent [19]

Kimura et al.

[11] Patent Number: 5,535,027
[45] Date of Patent: Jul. 9, 1996

[54] LIQUID CRYSTAL DISPLAY DEVICE WITH A PHOTOCONDUCTOR AT EACH INTERSECTION OF A LINEAR LUMINOUS SOURCE AND A LINEAR ELECTRODE

[75] Inventors: Naofumi Kimura; Yutaka Ishii, both of Nara; Masaru Yoshida, Ikoma-gun; Masataka Matsuura, Tenri; Akitsugu Hatano, Nara; Yozo Narutaki, Nara; Sayuri Fujiwara, Nara; Yoshihiro Izumi, Kashihara; Yoshitaka Yamamoto, Yamato-Koriyama, all of Japan

[73] Assignee: Sharp Kabushiki Kaisha, Osaka, Japan

[21] Appl. No.: 267,556

[22] Filed: Jun. 28, 1994

Related U.S. Application Data

[63] Continuation of Ser. No. 789,171, Nov. 6, 1991, abandoned.

[30] Foreign Application Priority Data

| Nov. 9, 1990 | [JP] | Japan | 2-304891 |
| Mar. 20, 1991 | [JP] | Japan | 3-57175 |
| Oct. 4, 1991 | [JP] | Japan | 3-258110 |
| Oct. 11, 1991 | [JP] | Japan | 3-263947 |

[51] Int. Cl.$^6$ .............. G02F 1/135; G02F 1/136
[52] U.S. Cl. .............. 359/58; 359/72
[58] Field of Search .............. 359/58, 72, 49

[56] References Cited

U.S. PATENT DOCUMENTS

| 4,183,630 | 1/1980 | Funada et al. | 359/82 |
| 4,408,836 | 10/1983 | Kikuno | 359/62 |
| 5,106,197 | 4/1992 | Ohuchida et al. | 359/88 |
| 5,181,130 | 1/1993 | Hubby, Jr. | 359/82 |

FOREIGN PATENT DOCUMENTS

| 63-64031 | 3/1988 | Japan | 359/72 |
| 1-156724 | 6/1989 | Japan . | |
| 1-173016 | 7/1989 | Japan . | |
| 1-224727 | 9/1989 | Japan . | |
| 2-089029 | 3/1990 | Japan . | |
| 2-134617 | 5/1990 | Japan . | |

OTHER PUBLICATIONS

Hornberger, "Liquid crystal display", IBM Technical Disclosure Bulletin, vol. 12, No. 10 (Mar. 1970), pp. 1697–1698.

*Primary Examiner*—Anita Pellman Gross
*Attorney, Agent, or Firm*—David G. Conlin; Milton Oliver

[57] ABSTRACT

A display apparatus includes two substrates having electrodes, respectively, and a liquid crystal layer arranged between the two substrates. One of the two substrates includes a plurality of linear luminous sources ranged in parallel each other, a plurality of linear electrodes ranged in parallel each other and the linear electrodes being crossed with the plurality of linear luminous sources, and a plurality of photoconductive layers provided at crossed positions of the plurality of linear luminous sources and the plurality of linear electrodes, the photoconductive layers serving to perform switching operation in response to light applied from the plurality of linear luminous sources. The liquid crystal has pixels to be driven by a signal applied through the plurality of linear electrodes and the plurality of photoconductive layers.

10 Claims, 26 Drawing Sheets

LIQUID CRYSTAL DISPLAY DEVICE WITH A PHOTOCONDUCTOR AT EACH INTERSECTION OF A LINEAR LUMINOUS SOURCE AND A LINEAR ELECTRODE

This is a continuation of application Ser. No. 07/789,171 filed on Nov. 6, 1991, now abandoned.

BACKGROUND OF THE INVENTION

1. Field of the Invention

The present invention relates to a display apparatus of matrix type, for example, a matrix type liquid crystal display apparatus which has large capacitance which can be used for AV (Audio-Visual) instruments, OA (Office Automation) instruments, computers and the like.

2. Description of the Related Art

With advance of a highly computerized society, a request for a larger display having larger capacitance has been rising. To comply with the request, a cathode-ray tube (CRT), which is called as "a king of displays", is being developed to be more fine. As to the size of the CRT, the maximum size of a direct-view type CRT is 40 inches and the maximum size of a projection type CRT is 200 inches. The CRTs known by the present inventors, however, are too heavy and long in depth to prevent the realization of a large display having larger capacitance. To avoid the shortcomings the CRTs entails, a drastic solution has been desirous.

A planar type display, which is operated on the different principle from the known CRTs, is now under steady study toward the higher quality stage for a highvision or an engineering workstation (EWS) from the current way of use for a word processor or a personal computer.

The planar type display includes an electroluminescent panel (ELP), a plasma display panel (PDP), a fluorescence character display tube (VFD), an electro-chromic display (ECD), and a liquid crystal display (LCD). The most promising planar type display among those displays is the liquid crystal display because it has the shortest way to the realization of full color and the most suitable characteristics to an LSI (Large-Scale Integration). Hence, the liquid crystal display is remarkable in technical progress.

In recent days, a matrix type liquid crystal display apparatus is more likely to be requested to have larger capacitance. That is, with the recent request for higher resolution of display apparatuses, it has been requested that the number of pixels is increased from 400×600 to 1000×1000 or more and the size of the screen is also increased from 10 inches to 20 inches or more.

The present inventors know that the matrix type liquid crystal display apparatus (referred to as a matrix type LCD apparatus) is, in large, divided into an active matrix driven type liquid crystal display (referred to as an active matrix type LCD) and a simple matrix driven type liquid crystal display (referred to as a simple matrix type LCD). The division standard depends on the difference of the driving method therebetween.

The simple matrix type LCD includes the structure wherein liquid crystal is enclosed in an XY matrix panel composed of a pair of glass substrates located in opposition in a manner to cross the striped electrodes formed on one of the glass substrates with the striped electrodes formed on the other of the glass substrates at right angles, and is operated to display through the effect of sharpness of liquid crystal display characteristic. The active matrix type LCD includes the structure wherein non-linear elements are directly added to pixels and are operated to display through the effect of the non-linear characteristic of each element (switching characteristic, and the like). As compared to the simple matrix type LCD, the active matrix type LCD has lower dependency on the display characteristics of the liquid crystal itself, so that it can realize a high-contrast and high-response display. This kind of non-linear elements are divided into a two-terminal type and a three-terminal type. The two-terminal type non-linear element is MIM (Metal-Insulating material-Metal) or a diode. The three-terminal type non-linear element is TFT (Thin Film Transistor), Si-MOS (Silicon Metal Oxide Semiconductor) or SOS (Silicon-On-Sapphire). For each of the LCDs, the study for enhancing the resolution and enlarging the screen has been made.

Both the active matrix type LCD and the simple matrix type LCD are disadvantageous to realization of a large screen display having large capacitance in light of contrast, a response speed, and reliability.

For the active matrix type LCD, in particular, a thin film transistor (referred to as TFT) active matrix type LCD, some problems to be mentioned below still exist in the study for enhancing the resolution and enlarging the screen.

As the scan lines are increased in number, the writing time for one scan line is decreased. It results in needing larger current for properly driving TFT elements. In order to increase the on current, it is necessary to use a semiconductor material having large mobility for composing the TFT element or to enhance a W/L (Width/Length) ratio of the TFT element. The former case concerns with the property of the semiconductor material, which it is difficult to greatly improve. To implement the latter case, it is necessary to control the manufacturing process of the TFT element very finely, which may result in greatly lowering the yields of the TFT element.

If an area ratio of a TFT element to a pixel is made larger as the resolution becomes higher, the capacitance between a gate and a drain of the TFT element is made larger than the capacitance of the liquid crystal. This results in allowing a gate signal to have a large adverse effect on pixels.

That is, since the active matrix type LCD makes a positive use of a switching characteristic and a nonlinear characteristic of a nonlinear element for displaying an image, the degradation of the display resulting from the realization of larger capacitance is not so remarkable as the simple matrix type LCD. In actual, since the parasitic capacitance exists in the nonlinear element through the scan lines, the problems such as a lower contrast, an after image, and a shorter life of a panel may appear which are caused by a leakage of a scanning electric signal to pixel electrodes. As to the size of the screen, since the wires are made longer, the connection of the increase of wire resistance and the parasitic capacitance results in bringing about attenuation on signal lines, thereby giving a large adverse effect on the evenness and the contrast of the display. It means that this type of LCD earnestly needs an epoch-making novel technique for realizing the larger LCD having large capacitance.

Turning to the simple matrix type LCD, some problems to be mentioned below still exist in the study for enhancing the resolution and enlarging the screen.

As the number of the scan lines is increased more, it is difficult to keep a voltage ratio of selective pixels to non-selective pixels large, resulting in bringing about some shortcomings such as a lower contrast, a smaller visual area and a slower response. Those shortcomings greatly degrade the quality of the display. In actual situations, the critical duty factor is about 1/200 to 1/400. To overcome the appearance of such shortcomings, an upper and lower divisional driving system has been proposed. This system is composed by dividing the signal lines formed on the panel display into an upper and a lower blocks and individually scanning the upper and lower display blocks. Concretely, if not divided, the number of the scan lines is 400, while if divided, the number of the scan lines is apparently 800. The system at the trial stage reaches the display capacitance of 800×1024 lines. This system makes it possible to scan 2N scan lines at a 1/N duty factor, so that the number of the scan lines is apparently doubled. This system, however, has some problems as well. For example, it requires twice as many driving circuits as the simple matrix type LCD without using this system. Further, it is incapable of scanning 2N or more scan lines.

That is, in the simple matrix type LCD, a ratio of an effective voltage of selective pixel electrodes to non-selective pixel electrodes comes closer to 1 as the scan lines are increased in number. The display characteristic of the liquid crystal itself is required to have sharpness. The securable sharpness is limited. In actual, the number of the scan lines is suppressed to be about 400. The response speed is likely to be opposed to the sharpness of the display characteristic and is made slower as the number of the scan lines (the number of duties). In general, when the number of the scan lines is 400, the response time is 100 ms (millisecond) to 300 ms or some.

The foregoing upper and lower divisional driving system needs two drivers for the data signal lines for the upper and the lower blocks, resulting in providing twice as many as the normal simple matrix type LCD, thereby making the LCD costlier if this divisional system is used. Moreover, the divisional system is inferior to the active matrix type LCD in light of contrast and response speed. The wires of the transparent electrodes are made longer as the display panel is made larger. It results in increasing the wiring resistance, thereby disadvantageously lowering the display unevenness and contrast resulting from the attenuation of the signals. It means that a breakthrough technique is necessary to the realization of the larger display having larger capacitance.

SUMMARY OF THE INVENTION

It is therefore an object of the present invention to provide a high-resolution display apparatus which provides a light switching function for the purpose of easily increasing current for driving the pixels and the apparent number of scan lines without having to greatly lower a voltage ratio of selected pixels to non-selected pixels.

It is another object of the present invention to provide a planar type display apparatus which is capable of displaying an image at high quality and with large capacitance.

The object of the invention can be achieved by a display apparatus including:

two substrates having electrodes, respectively, one of the two substrates including a plurality of linear luminous sources ranged in parallel each other, a plurality of linear electrodes ranged in parallel each other and the linear electrodes being crossed with the plurality of linear luminous sources, and a plurality of photoconductive layers provided at crossed positions of the plurality of linear luminous sources and the plurality of linear electrodes, the photoconductive layers serving to perform switching operation in response to light applied from the plurality of linear luminous sources; and a liquid crystal layer arranged between the two substrates, the liquid crystal having pixels to be driven by a signal applied through the plurality of linear electrodes and the plurality of photoconductive layers.

The object of the invention can be also achieved by a display apparatus, including:

two substrates having electrodes, respectively, one of the two substrates including a plurality of linear luminous sources ranged in parallel each other, a plurality of linear electrodes ranged in parallel and the linear electrodes being crossed with the plurality of linear luminous sources, a plurality of pixel electrodes formed on the same level as the plurality of linear electrodes, a plurality of photoconductive layers adjacent to crossed positions of the plurality of linear luminous sources and the plurality of linear electrodes, the photoconductive layers being located between the plurality of pixel electrodes and the plurality of linear electrodes, respectively, and serving to perform switching operation in response to light applied from the linear luminous sources; and a liquid crystal layer being located between the two substrates, the liquid crystal layer having pixels to be driven by a signal applied through the plurality of linear electrodes and the plurality of photoconductive layers.

In operation, when a ray of light is applied from the activated linear luminous sources to the photoconductive layers, it results in lowering the impedance of the photoconductive layers, thereby switching on the light-applied photoconductive layers. Then, the linear electrodes are allowed to apply signals to the pixels of the liquid crystal layer through the activated photoconductive layers. The photoconductive layers serve as switching elements. Hence, current flows in the thickness direction of the photoconductive layer in each light switch element, resulting in being able to increase the current. Further, since the scan signal is light, unlike the TFT element, no unfavorable state appears wherein the scan signal (gate signal) is flown into the pixel electrodes through the element capacitance.

The object of the invention can be achieved by a display apparatus, including:

a display medium;

a plurality of pixel electrodes for driving the display medium;

a plurality of signal lines arranged in a row or a column direction;

a plurality of photoconductors provided for the plurality of pixel electrodes, and serving to electrically connect or disconnect the signal lines to or from the pixel electrodes, respectively; and a plurality of linear luminous sources arranged in a row or a column direction for selectively applying light to the plurality of photoconductors, and for controlling connection or disconnection of the photoconductors.

The object of the invention can be also achieved by a display apparatus including two substrates having electrodes, respectively, and a display medium provided between the two substrates, including:

a plurality of pixel electrodes for driving the display medium;

a plurality of signal lines arranged in a row or a column direction;

a plurality of photoconductors provided for the plurality of pixel electrodes and serving to electrically connect or disconnect the plurality of signal lines to or from the pixel electrodes, respectively; and a plurality of linear luminous sources arranged in a row or a column direction for selectively applying light to the plurality of photoconductors, and for controlling connection or disconnection of the photoconductors, the plurality of pixel electrodes, the plurality of signal lines and the plurality of photoconductors being formed on one of the two substrates and the plurality of linear luminous sources being formed on the other one of the two substrates.

In operation, as the linear luminous sources are sequentially made luminous, the light-applied photoconductors change their impedances so that those photoconductors are made conductive, resulting in electrically connecting the pixel electrodes corresponding to the conductive photoconductors to the signal lines. Hence, the voltage applied on the signal lines is applied to the pixel electrodes through the photoconductors. The photoconductors to which no light is applied are made non-conductive, resulting in applying no substantial voltage to the corresponding pixel electrodes. The voltage difference between both of the pixel electrodes results in forming an image on a display media. That is, the pixel electrodes are connected to or disconnected from the signal lines through the effect of the photoconductors serving to be conductive or non-conductive in receipt of light. Hence, no performance degradation resulting from the parasitic capacitance and the wire resistance takes place. The liquid crystal display is thus capable of realizing the large display at high quality and with large capacitance.

Further objects and advantages of the present invention will be apparent from the following description of the preferred embodiments of the invention as illustrated in the accompanying drawings.

DESCRIPTION OF THE PREFERRED EMBODIMENTS

Figure 1:
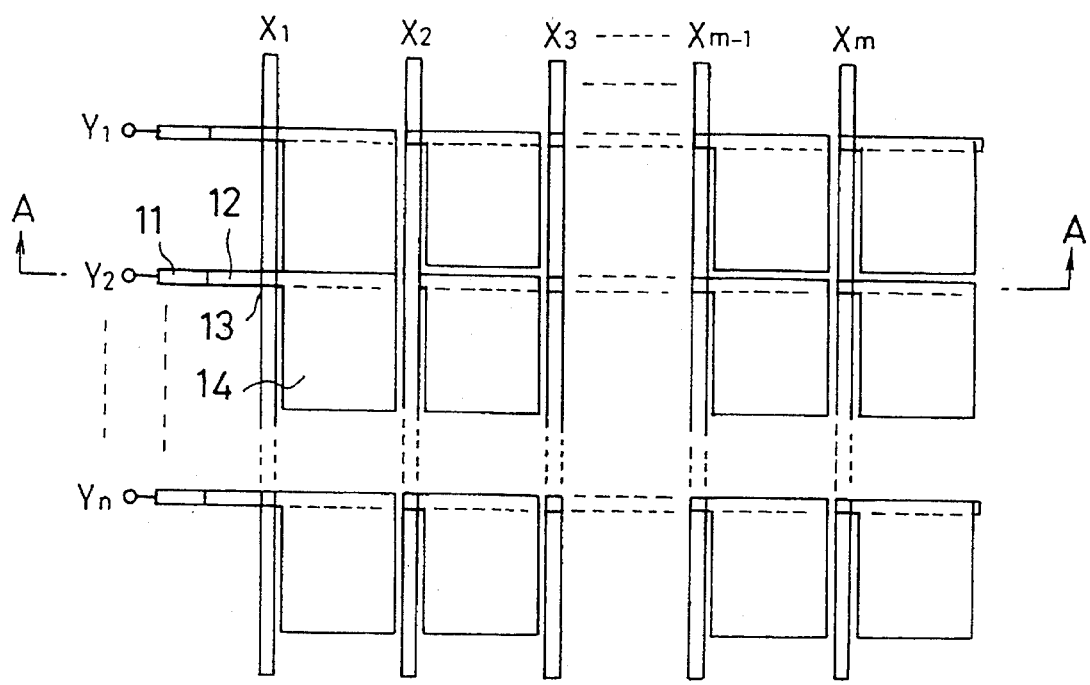
FIG. 1 is a plan view showing fundamental structure of an active matrix driven type LED according to a first embodiment of the present invention.
Figure 2:
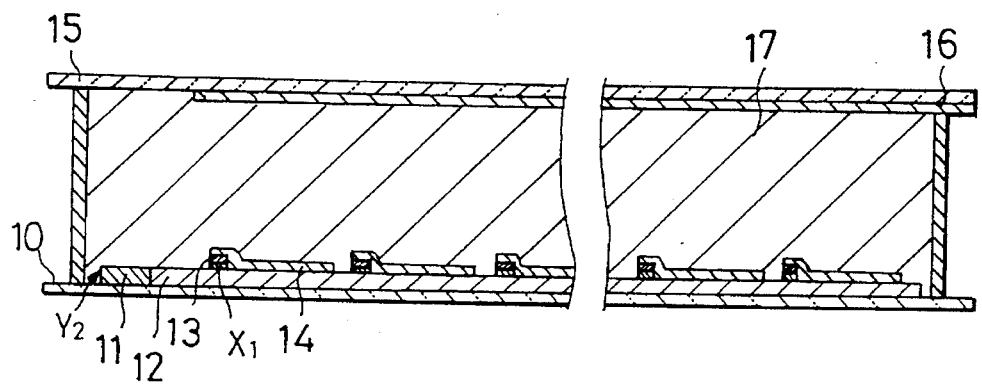
FIG. 2 is a sectional view cut on the A—A line of FIG. 1.

FIG. 1 is a plan view showing fundamental structure of an active matrix driven type LCD according to a first embodiment of the present invention. FIG. 2 is a sectional view cut on the A—A line of FIG. 1.

As shown in FIGS. 1 and 2, a plurality of linear luminous sources $Y_1, Y_2, \ldots, Y_n$ are arranged on one glass substrate 10 along the Y (longitudinal) direction of FIG. 1. A plurality of linear electrodes $X_1, X_2, \ldots, X_{m-1}, X_m$ are arranged on those linear luminous sources in the X (perpendicular) direction of FIG. 1. The linear electrodes are crossed with the linear luminous sources for example at right angles.

Each of the linear luminous sources $Y_1, Y_2, \ldots, Y_n$, for example, the linear luminous source $Y_2$ is composed of a luminous portion 11 and a light waveguide 12. The luminous portion 11 is made of an electroluminescent (EL) element, for example. By activating the luminous portion 11, the linear luminous source $Y_2$ serves to emit a linear ray of light from the overall surface of the luminous source $Y_2$. It is possible to use all the linear luminous sources $Y_1, Y_2, \ldots, Y_n$ as a luminous area. However, the structure of the present embodiment is more advantageous in light of low power consumption.

Each of the plurality of linear electrodes $X_1, X_2, \ldots X_{m-1}, X_m$ is composed of a transparent conductive layer. At each crossed portion of the linear luminous sources $Y_1, Y_2, \ldots, Y_n$ and the linear electrodes $X_1, X_2, \ldots, X_{m-1}, X_m$, a light switch element is provided. The light switch element is made of a photoconductive layer. For example, at the crossed portion of the linear luminous source $Y_2$ and the linear electrode $X_1$, a light switch element 13 is provided. The light switch element 13 is laid between each of the linear electrodes $X_1, X_2, \ldots, X_{m-1}, X_m$ and each pixel electrode. For example, the light switch element 13 is provided between the linear electrode $X_1$ and the pixel electrode 14. By applying light to the light switch element 13, the light switch element 13 reduces its electric resistance. This results in applying a signal from the linear electrode $X_1$ to the pixel electrode 14.

A transparent electrode 16 is provided on the other glass substrate 15. A liquid crystal layer 17 is sealed between both of the substrates.

For performing light scanning, the linear luminous sources $Y_1, Y_2, \ldots, Y_n$ are activated sequentially from $Y_1$ to $Y_n$. An electric signal corresponding to the light-scanning is applied to each of the linear electrodes $X_1, X_2, \ldots, X_{m-1}, X_m$. While the linear luminous sources $Y_1, Y_2, \ldots, Y_n$ are made luminous (activated), the light switch element located on the linear luminous source is operated on. Hence, the linear electrodes $X_1, X_2, \ldots, X_{m-1}, X_m$ serve to apply an electric signal to the corresponding pixel electrodes, respectively. That is, in place of an electric gate signal of a TFT element, each of the light switch elements is scanned by the light signal applied from the linear luminous sources $Y_1, Y_2, \ldots, Y_n$.

As is apparent from the above description, current flows in the thickness direction of the photoconductive layer in each light switch element, resulting in being able to increase the current. Further, since the scan signal is light, unlike the TFT element, no unfavorable state appears wherein the scan signal (gate signal) is flown into the pixel electrodes through the element capacitance.

Figure 3:
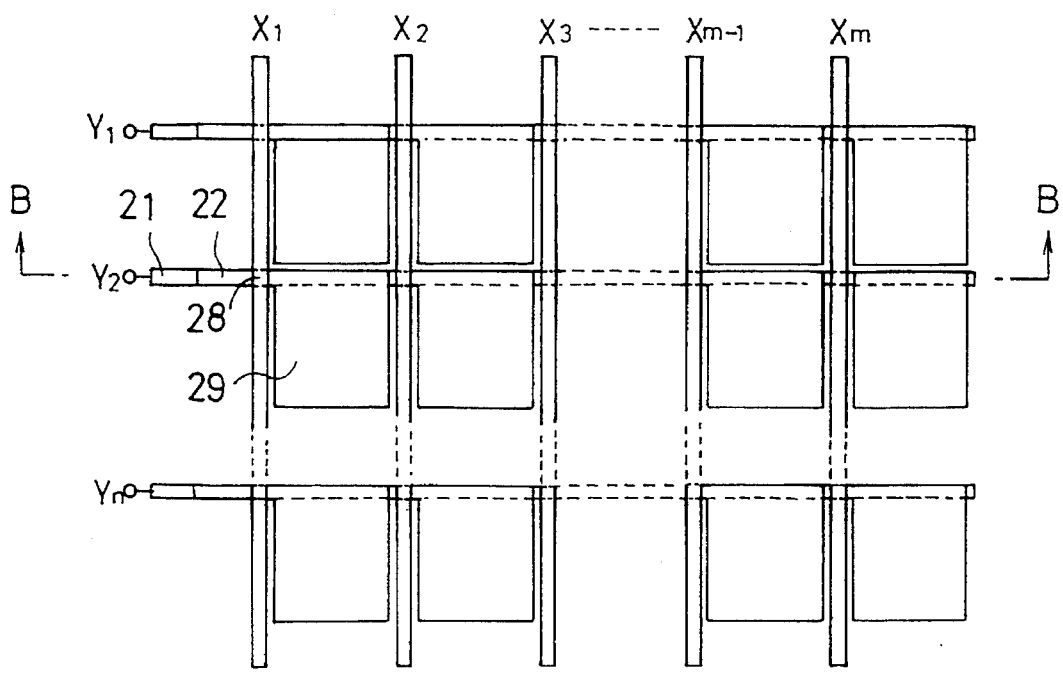
FIG. 3 is a plan view showing structure of an active matrix driven type LCD according to a second embodiment of the present invention.
Figure 4:
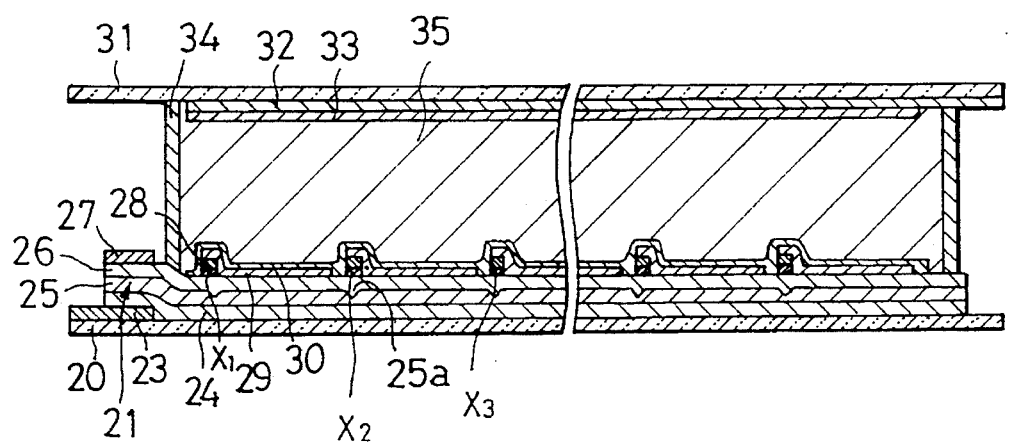
FIG. 4 is a sectional view cut on the B—B line of FIG. 3.

FIG. 3 is a plan view showing structure of an active matrix driven type LCD according to a second embodiment of the present invention. FIG. 4 is a sectional view cut on the B—B line of FIG. 3.

As shown in FIGS. 3 and 4, a plurality of linear luminous sources $Y_1, Y_2, \ldots, Y_n$ are arranged on one glass substrate 20 in the Y (longitudinal) direction of FIG. 3. A plurality of linear electrodes $X_1, X_2, \ldots, X_{m-1}, X_m$ are arranged on those linear luminous sources in the X (perpendicular) direction of FIG. 3. The linear electrodes are crossed with the linear luminous sources for example at right angles.

Each of the linear luminous sources $Y_1, Y_2, \ldots, Y_n$, for example, the linear luminous source $Y_2$ is composed of a luminous portion 21 and a light waveguide 22. The luminous portion 21 is made of an electroluminescent element, for example. By activating the luminous portion 21, the linear luminous source $Y_2$ serves to emit a linear ray of light from the overall surface of the source $Y_2$. It is possible to use all the linear luminous sources $Y_1, Y_2, \ldots, Y_n$ as a luminous area.

The luminous portion 21 and the light waveguide 22 are formed in the process indicated below.

An aluminum (Al) layer is formed on the glass substrate 20 by means of an electron beam (EB) deposition method. Then, an etching treatment is carried out on the aluminum layer for forming each of electrodes 23. This electrode 23 is formed as short strips arranged in parallel and provided on one end of the linear luminous source $Y_2$.

Next, a lower insulating layer 24 is formed on the glass substrate 20 and part of the electrode 23. The lower insulating layer 24 is deposited thereon by sputtering silicon dioxide ($SiO_2$) or silicon nitride ($Si_2N_3$). Then, a luminous layer 25 is laminated on the lower insulating layer 24. For forming the luminous layer 25, it is necessary to form a zinc sulfide (ZnS) layer with an addition of 0.5% of manganese (Mn) by means of the electron beam deposition method and carry out the linear patterning of the resulting zinc sulfide (ZnS) layer by means of the vacuum heating and etching treatments. For doing the etching treatment, it is better to provide a cut-away 25a in the luminous layer 25, because the provision of the cut-away 25a results in increasing the quantity of light emitted outside of the luminous layer 25, thereby enhancing a utilization factor of light.

Then, an upper insulating layer 26 is formed. This upper insulating layer 26 is deposited on the luminous layer 25 by sputtering silicon nitride ($Si_2N_3$) or aluminum oxide ($Al_2O_3$). An electrode 27 is formed on the upper insulating layer 26 at an opposite position to the electrode 23. This electrode 27 is formed by performing the electron beam (EB) deposition of an aluminum layer on a part of the upper insulating layer 26.

For forming those electrodes 23 and 27, it is possible to use metal such as molybdenum (Mo) or indium-tin oxide (ITO) in addition to aluminum (Al). For forming the lower and the upper insulating layers 24 and 26, it is possible to use silicon nitride group ($SiN_x$), strontium titanium oxide ($SrTiO_3$) or tantalum oxide barium ($BaTa_2O_6$) in addition to $SiO_2$, $Si_2N_3$ and $Al_2O_3$. For forming the luminous layer 25, it is possible to use zinc selenide (ZnSe) in addition to ZnS.

Each of the linear electrodes $X_1, X_2, \ldots, X_{m-1}, X_m$ is composed of a transparent conductive film. Those linear electrodes $X_1, X_2, \ldots, X_{m-1}, X_m$ are deposited by sputtering ITO on the upper insulating layer 26 and patterning the resulting ITO layer.

At each crossed portion of the linear luminous sources $Y_1, Y_2, \ldots, Y_n$ and the linear electrodes $X_1, X_2, \ldots X_{m-1}, X_m$, a light switch element is provided. The light switch element is made of a photoconductive layer. For example, at the crossed portion of the linear luminous source $Y_2$ and the linear electrode $X_1$, a light switch element 28 is provided. The light switch element 28 is laid between each of the linear electrodes $X_1, X_2, \ldots, X_{m-1}, X_m$ and each pixel electrode, For example, the light switch element 28 is provided between the linear electrode $X_1$ and the pixel electrode 29. The photoconductive layer is formed by forming the linear electrodes $X_1, X_2, \ldots, X_{m-1}, X_m$, forming an a-Si (amorphous silicon) film on the linear electrodes with a plasma chemical vapor deposition (CVD) method, and patterning the resulting layer. The pixel electrode is deposited by sputtering ITO on the photoconductive layer and patterning the resulting layer. When light is applied to the light switch element 28, the light switch element 28 reduces its electric resistance, resulting in applying a signal from the linear electrode $X_1$ to the pixel electrode 29.

An orientation layer 30 is formed on those layers. This orientation layer 30 is composed by rubbing a polyimide film formed with a spinner.

An transparent electrode 32 is provided on the other glass substrate 31. This transparent electrode 32 is deposited by sputtering ITO on the glass substrate 31. An orientation layer 33 is formed on the transparent electrode 32. This orientation layer 33 is formed by rubbing a polyimide film formed with a spinner.

A plurality of spacers (not shown) are dispersed between the substrates having some layers formed thereon. Both of the substrates are pasted through a sealing member 34 laid therebetween. Then, liquid crystal is injected into the space defined between both of the substrates for forming a liquid crystal layer 35. The thickness of the liquid crystal layer 35 is about 5 μm. The display mode of the liquid crystal layer 35 is a twisted nematic (TN) normal white type. For a liquid crystal material, for example, a PCH (phenylcyclohexanone) liquid crystal ZLI-1565 (manufactured by Merck Co., Inc.) is used. This liquid crystal is injected in vacuum for forming the liquid crystal 35.

For performing light scanning, the linear luminous sources $Y_1, Y_2, \ldots, Y_n$ are activated sequentially from $Y_1$ to $Y_n$. An electric signal corresponding to the light-scanning is applied to each of the linear electrodes $X_1, X_2, \ldots, X_{m-1}, X_m$. While the linear luminous sources $Y_1, Y_2, \ldots, Y_n$ are made luminous (activated), the light switch elements located on the activated linear luminous sources are operated on. Hence, the linear electrodes $X_1, X_2, \ldots, X_{m-1}, X_m$ serve to apply electric signals to the corresponding pixel electrodes, respectively for the purpose of representing an image on a screen.

As is apparent from the above description, the active matrix driven type LCD according to the present embodiment has the structure where a switch is provided for each pixel like the TFT element. This structure makes it possible to display an image at high contrast. Current flows in the thickness direction of the photoconductive layer in each light switch element, resulting in being able to increase the current. Further, since the scan signal is light, unlike the TFT element, no unfavorable state appears wherein the scan signal (gate signal) is flown into the pixel electrodes through the element capacitance. So, if the number of the scan lines are more than 1000, no unfavorable state appears.

Figure 5:
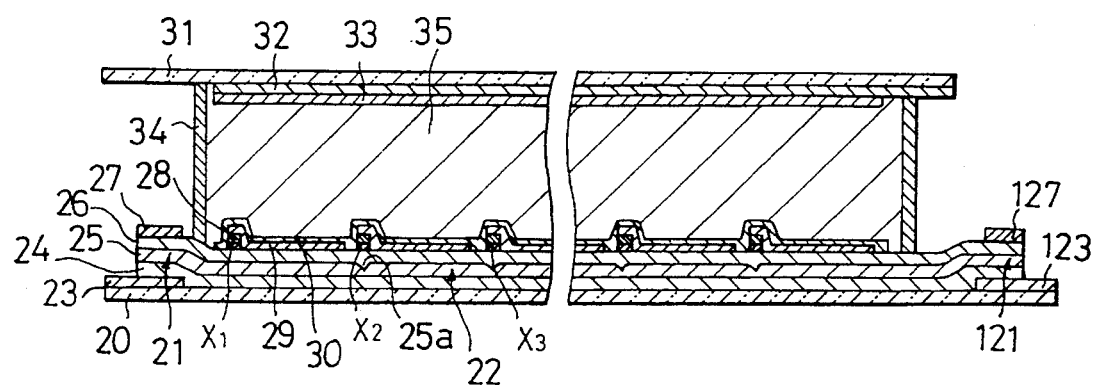
FIG. 5 is a sectional view showing structure of an active matrix driven type LCD according to the third embodiment of the present invention.

FIG. 5 is a sectional view showing an active matrix driven type LCD according to the third embodiment of the present invention.

According to the present embodiment, each of the linear luminous sources $Y_1, Y_2, \ldots, Y_n$ for example, the linear luminous source $Y_2$ includes luminous portions 21 and 121 at both ends thereof. The luminous portions 21 and 121 are made of an electroluminescent (EL) element, for example. As shown in FIG. 5, at the opposite ends to the electrodes 23 and 27 of the linear luminous source, electrodes 123 and 127 are provided. That is, the luminous portions are formed on both sides of the substrate. This structure results in greatly enhancing light intensity of the linear luminous source. The manufacturing process, the structure and the operation of the present embodiment are the same as those of the embodiment shown in FIGS. 3 and 4, except the above-described partial structure.

Figure 6:
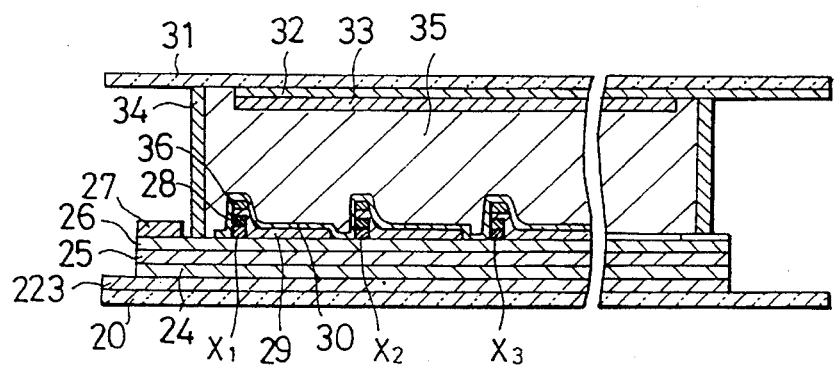
FIG. 6 is a sectional view showing a transformation of the active matrix driven type LCD according to the third embodiment of the present invention.

FIG. 6 is a sectional view showing a transformation of the active matrix driven type LCD according to the third embodiment of the present invention.

According to the transformation of the third embodiment, an aluminum layer is formed on the glass substrate 20 by means of an electron-beam (EB) deposition method. Then, the etching treatment is carried out on the aluminum layer for forming an electrode 223 on the overall area of reverse side of the linear luminous sources $Y_1, Y_2, \ldots, Y_n$. This results in being able to prevent leakage of light From the luminous layer 25, thereby considerably enhancing light intensity. A light-shielding layer is provided on a light switch element provided at each of the crossed portions of the linear luminous sources $Y_1, Y_2, \ldots, Y_n$ and the linear electrodes $X_1, X_2, \ldots, X_{m-1}, X_m$. For example, a light-shielding layer 36 is provided on a light switch element 28 located at the crossed portion of the linear luminous source $Y_2$ and the linear electrode $X_1$. The provision of the light-shielding layer 36 results in being able to prevent the light incident in the upward direction from being applied to each light switch element. The manufacturing process, the structure and the operation of the present embodiment is the same as those of the embodiment shown in FIGS. 3 and 4, except the above-described respect.

Figure 7:
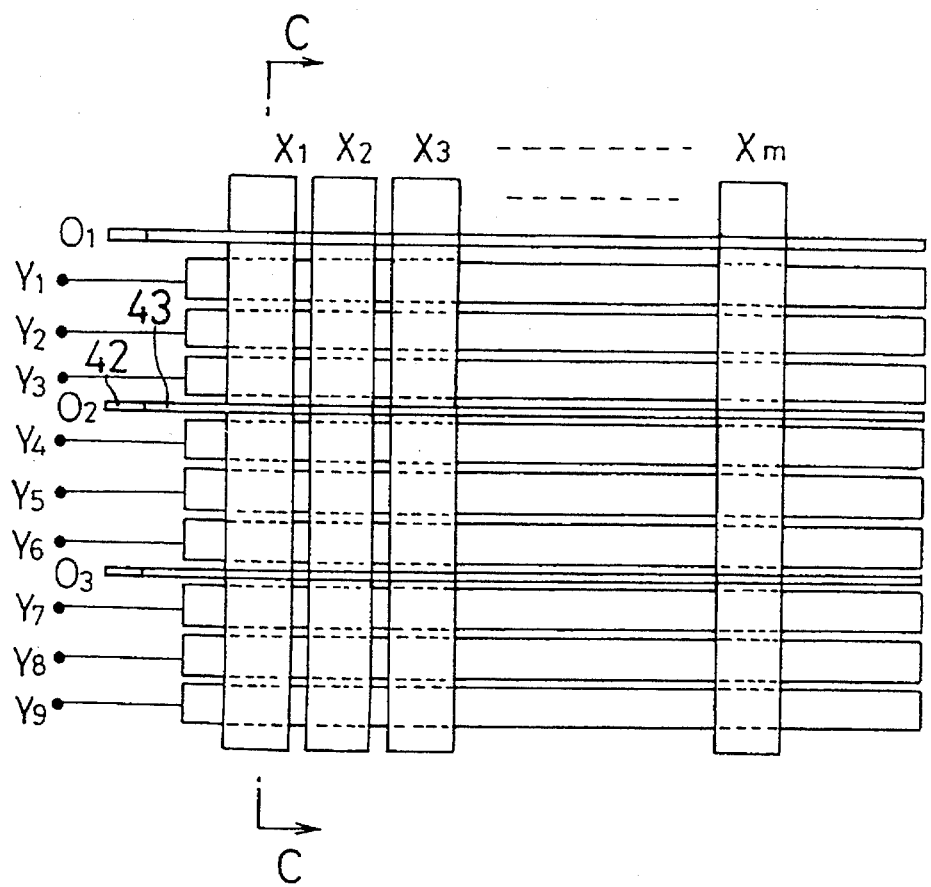
FIG. 7 is a plan view showing fundamental structure of a simple matrix driven type LCD according to a fourth embodiment of the present invention.
Figure 8:
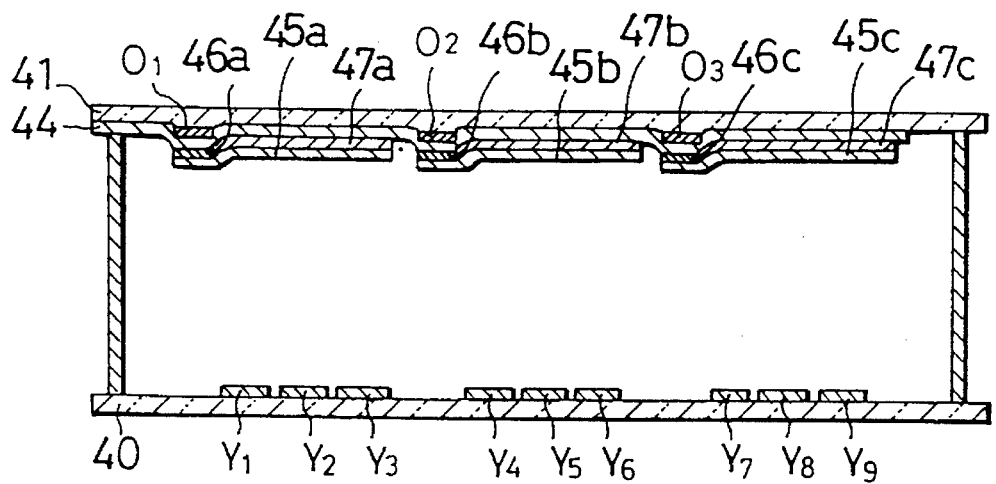
FIG. 8 is a sectional view cut on the C—C line of FIG. 7.
Figure 9:
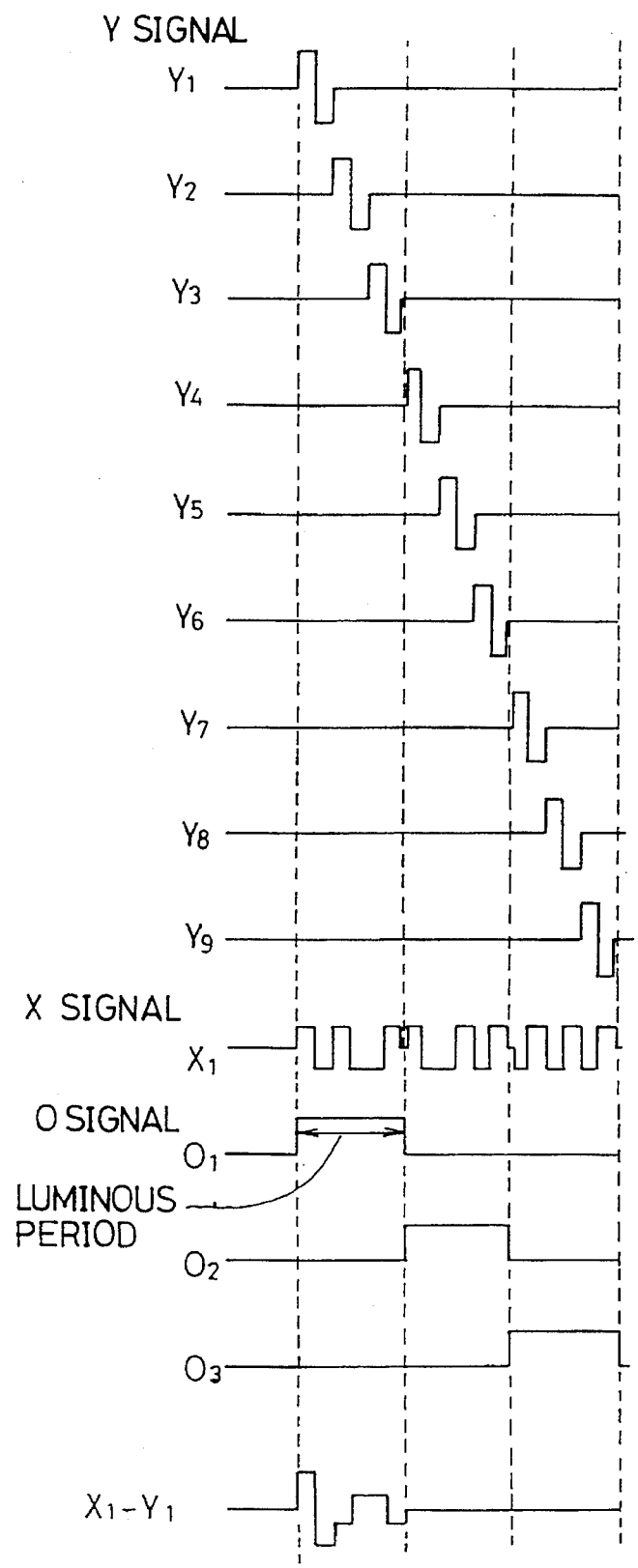
FIG. 9 is a time chart showing the operation of the fourth embodiment of FIG. 7.

FIG. 7 is a plan view showing fundamental structure of a simple matrix driven type LCD according to a fourth embodiment of the present invention, FIG. 8 is a sectional view cut on the C—C line of FIG. 7, and FIG. 9 is a time chart showing the operation of this embodiment.

As shown in FIGS. 7 and 8, a plurality of linear electrodes $Y_1, Y_2, \ldots, Y_9$ are arranged on one glass substrate 40 along the Y (longitudinal) direction of FIG. 7. A plurality of linear luminous sources $O_1, O_2$ and $O_3$ are arranged on the other glass substrate 41 along the Y direction of FIG. 7. A plurality of linear electrodes $X_1, X_2, \ldots, X_m$ are arranged in the X (perpendicular) direction of FIG. 7. Those linear electrodes $X_1, X_2, \ldots, X_m$ are crossed with those linear electrodes $Y_1, Y_2, \ldots, Y_9$ and the linear luminous sources $O_1, O_2$ and $O_3$.

Each of the linear luminous sources $O_1, O_2$ and $O_3$, for example, the linear luminous source $O_2$ is composed of a luminous portion 42 and a light waveguide 43. The luminous portion 42 is made of an electroluminescent (EL) element, for example. The light waveguide 43 is formed linearly and transmits light from the luminous portion 42. By activating the luminous portion 42, the linear luminous source $O_2$ serves to emit a linear ray of light from the overall surface of the source. It is possible to use all the linear luminous sources $O_1$, $O_2$ and $O_3$ as a luminous area. However, the structure according to the present embodiment is more advantageous in light of low power consumption.

Each of the linear electrodes $X_1$, $X_2$, ..., $X_m$ is composed of a dual-structured transparent conductive layer. That is, the linear electrode $X_1$ is composed of a linear transparent electrode 44 and the linear divisional transparent electrodes 45a, 45b, 45c. The transparent electrode 44 and the divisional transparent electrodes 45a, 45b, 45c are laminated through light switch elements 46a, 46b, 46c or insulating layers 47a, 47b, 47c laid therebetween. Specifically, the light switch element 46a and the insulating layer 47a are laid between the transparent electrode 44 and the divisional transparent electrode 45a, the light switch element 46b and the insulating layer 47b are laid between the transparent electrode 44 and the divisional transparent electrode 45b, and the light switch element 46c and the insulating layer 47c are laid between the transparent electrode 44 and the divisional transparent electrode 45c.

At each of the crossed portions of the linear luminous sources $O_1$, $O_2$, $O_3$ and the linear electrodes $X_1$, $X_2$, ..., $X_m$, a light switch element composed of a photoconductive layer is provided. For example, at each of the crossed portions of the linear luminous sources $O_1$, $O_2$, $O_3$ and the linear electrode $X_1$, the light switch elements 46a, 46b, 46c are provided. As mentioned above, those light switch elements are laid between the transparent electrode 44 and the divisional transparent electrodes 45a, 45b, 45c, respectively. For example, the light switch element 46a is laid between the transparent electrode 44 of the linear electrode $X_1$ and the divisional transparent electrode 45a. The insulating layer 47a is provided on the other portion, that is, the portion having no light switch element formed thereon, between the transparent electrode 44 and the divisional transparent electrode 45a. When light is applied to the light switch element 46a, the light switch element 46a reduces its electric resistance, resulting in being able to apply a signal from the linear electrode $X_1$ into the divisional transparent electrode 45a.

For performing light scanning, the linear luminous sources $O_1$, $O_2$, $O_3$ are sequentially activated. An electric signal corresponding to the light-scanning is applied to each of the linear electrodes $X_1$, X2, ..., $X_m$. While the linear luminous sources $O_1$, $O_2$, $O_3$ are made luminous (activated), the light switch elements located on the linear luminous sources are operated on. Hence, the linear electrodes $X_1$, $X_2$, ..., $X_m$ serve to apply an electric signal to the corresponding divisional transparent electrodes, respectively. In synchronism with the light scanning operation done by each of the luminous sources $O_1$, $O_2$, $O_3$, the linear electrodes $Y_1$ to $Y_3$, $Y_4$ to $Y_6$ and $Y_7$ to $Y_9$ are scanned as shown in FIG. 9. Those linear electrodes are operated in a manner to reduce the number of Y-directional scan lines crossed with the X-directional linear electrodes $X_1$, $X_2$, ..., $X_m$ to one third of the scan lines (according to the present embodiment). Conversely, if the simple-matrix driven type LCD according to the present embodiment increases the scan lines by a factor of 3, it results in offering the similar characteristics to the foregoing known LCD. In addition, in the above description, the number of the linear luminous sources for dividing the Y-directional scan line is 3, but the number may be any if it is 2 or more.

As is apparent from the above description, the simple matrix driven type LCD of the present embodiment is capable of driving a lot of scan lines at a voltage of a low duty factor. Hence, if the scan lines are increased to 1000 or more, this LCD keeps high contrast, a wide angle of view, and a high response.

Considering the capacitance between the transparent electrode and the divisional transparent electrodes, for example, the transparent electrode 44 of the linear electrode $X_1$ and the divisional transparent electrode 45a, the transparent electrode 44 and the divisional transparent electrode 45a are overlapped only on the light switch element 46a without being overlapped on the other portion between the transparent electrode 44 and the divisional transparent electrode 45a.

Figure 10:
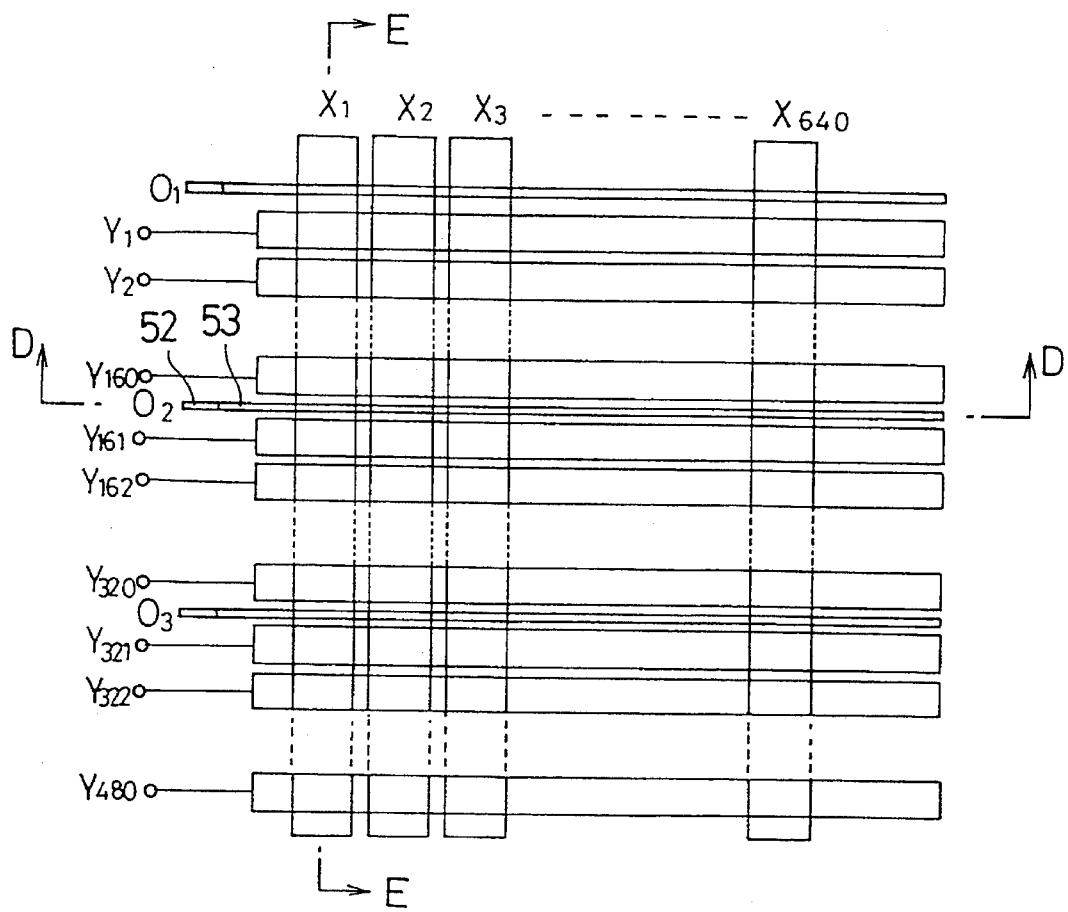
FIG. 10 is a plan view showing a simple matrix driven type LCD according to a fifth embodiment of the present invention.
Figure 11:
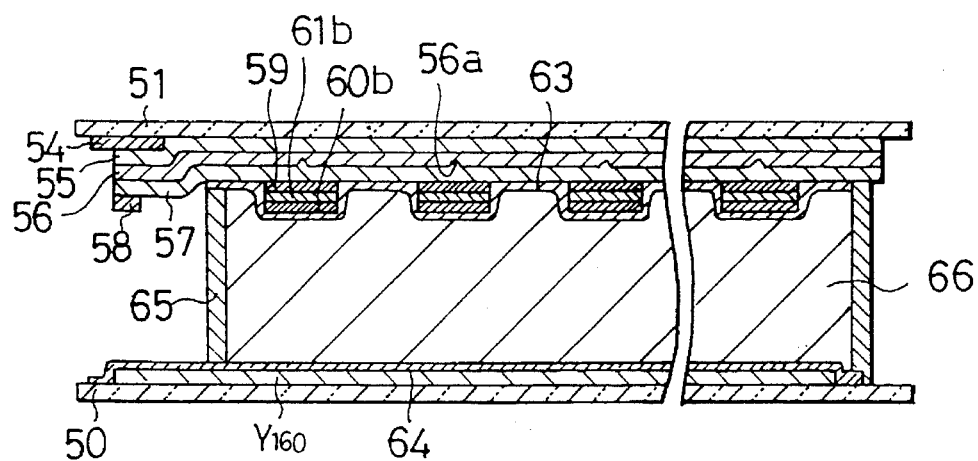
FIG. 11 is a sectional view cut on the D—D line of FIG. 10.
Figure 12:
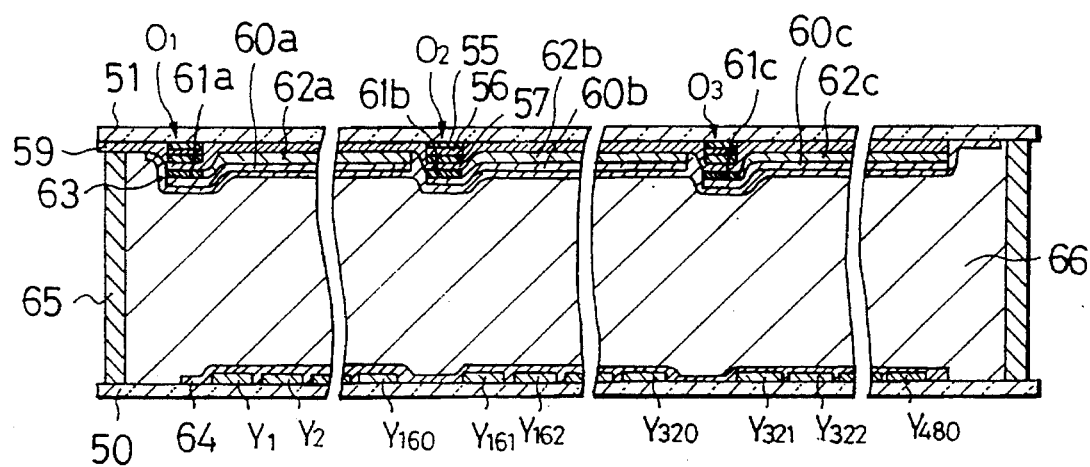
FIG. 12 is a sectional view cut on the E—E line of FIG. 10.
Figure 13:
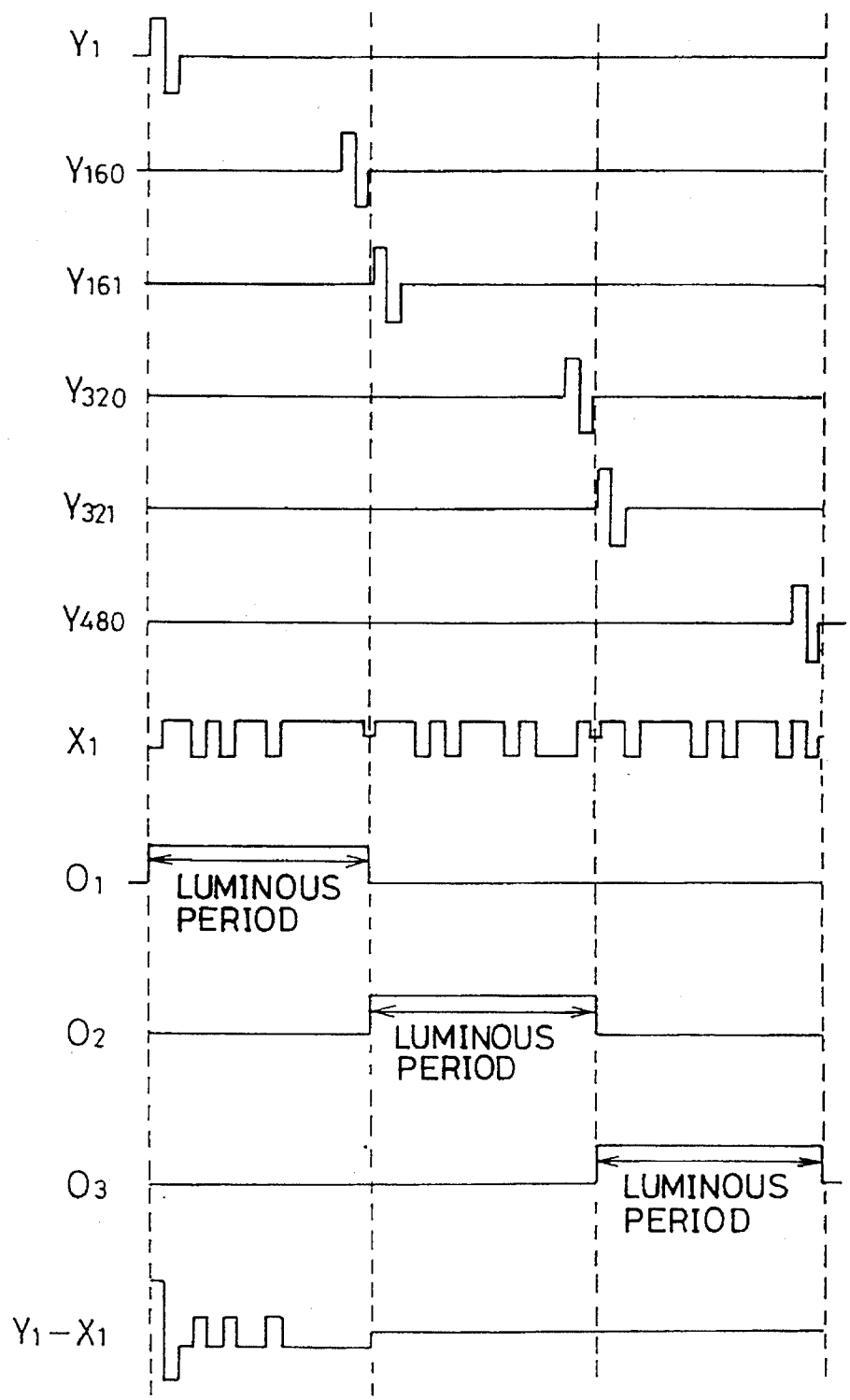
FIG. 13 is a time chart showing the operation of the fifth embodiment shown in FIG. 10.

FIG. 10 is a plan view showing a simple matrix driven type LCD according to a fifth embodiment of the present invention, FIG. 11 is a sectional view cut on the D—D line of FIG. 10, FIG. 12 is a sectional view cut on the E—E line of FIG. 10, and FIG. 13 is a time chart showing the operation of the embodiment shown in FIG. 10.

As shown in FIGS. 10 to 12, a plurality of linear electrodes $Y_1$, $Y_2$, ..., $Y_{480}$ are arranged on one glass substrate 50 along the Y (longitudinal) direction of FIG. 10. A plurality of linear luminous sources $O_1$, $O_2$ and $O_3$ are arranged on the other glass substrate 51 along the Y direction of FIG. 10. A plurality of linear electrodes $X_1$, $X_2$, ..., $X_{640}$ are arranged along the X (perpendicular) direction of FIG. 10. Those linear electrodes $X_1$, $X_2$, ..., $X_{640}$ are crossed with those linear electrodes $Y_1$, $Y_2$, ..., $Y_{480}$ and the linear luminous sources $O_1$, $O_2$, $O_3$.

Each of the linear luminous sources $O_1$, $O_2$ and $O_3$, for example, the linear luminous source $O_2$ is composed of a luminous portion 52 and a light waveguide 53. The luminous portion 52 is made of an electroluminescent (EL) element, for example. The light waveguide 53 is formed linearly and transmits light from the luminous portion 52. By activating the luminous portion 52, the linear luminous source $O_2$ serves to emit a linear ray of light from the overall surface of the source. It is possible to use all the linear luminous sources $O_1$, $O_2$, $O_3$ as a luminous area.

The luminous portion 52 and the light waveguide 53 are formed in the process indicated below.

An aluminum (Al) layer is formed on the glass substrate 51 by means of an electron beam (EB) deposition method. Then, an etching treatment is carried out on the aluminum layer for forming each of the electrodes 54. This electrode 54 is formed as short strips arranged in parallel and provided on one end of the linear luminous source $O_2$.

Next, a lower insulating layer 55 is formed on the glass substrate 51 and a part of the electrode 54. The lower insulating layer 55 is deposited thereon by sputtering silicon dioxide ($SiO_2$) or silicon nitride ($Si_2N_3$). Then, a luminous layer 56 is laminated on the lower insulating layer 55. For forming the luminous layer 56, it is necessary to form a zinc sulfide (ZnS) layer with an addition of 0.5% of manganese (Mn) by means of an electron beam (EB) deposition method and carry out the linear patterning of the resulting zinc sulfide (ZnS) layer by means of the vacuum heating and etching treatments. For doing the etching treatment, it is better to provide a cut-away 56a in the luminous layer 56, because the provision of the cut-away 56a results in increasing the quantity of light emitted outside of the luminous layer 56, thereby enhancing a utilization factor of light.

Then, an upper insulating layer 57 is formed. This upper insulating layer 57 is deposited on the luminous layer 56 by sputtering silicon nitride ($Si_2N_3$) or aluminum oxide ($Al_2O_3$). An electrode 58 is formed on the upper insulating layer 57 at an opposite location to the electrode 54. This electrode 58 is formed by performing the electron beam (EB) deposition of an aluminum layer on a part of the upper insulating layer 57.

For forming those electrodes 54 and 58, it is possible to use metal such as molybdenum (Mo) or indium-titanium oxide (ITO) in addition to aluminum (Al). For forming the lower and the upper insulating layers 55 and 57, it is possible to use silicon nitride group ($SiN_x$), strontium titanium oxide ($SrTiO_3$) or tantalum oxide barium ($BaTa_2O_6$) in addition to $SiO_2$, $Si_2N_3$ and $Al_2O_3$. For forming the luminous layer 56, it is possible to form zinc selenide (ZnSe) in addition to ZnS.

Each of the linear electrodes $X_1, X_2, \ldots, X_{640}$ is composed of a dual-structured transparent conductive layer. That is, as shown in FIG. 12, the linear electrode $X_1$ is composed of a linear transparent electrode 59 and the linear divisional transparent electrodes 60a, 60b, 60c. The transparent electrode 59 is formed by sputtering ITO on the upper insulating layer 57 and patterning the resulting layer. The transparent electrode 59 and the divisional transparent electrodes 60a, 60b, 60c are laminated through light switch elements 61a, 61b, 61c or insulating layers 62a, 62b, 62c laid therebetween. Specifically, the light switch element 61a and the insulating layer 62a are laid between the transparent electrode 59 and the divisional transparent electrode 60a, the light switch element 61b and the insulating layer 62b are laid between the transparent electrode 59 and the divisional transparent electrode 60b, and the light switch element 61c and the insulating layer 62c are laid between the transparent electrode 59 and the divisional transparent electrode 60c.

At each of the crossed portions of the linear luminous sources $O_1, O_2, O_3$ and the linear electrodes $X_1, X_2, \ldots, X_{640}$, a light switch element composed of a photoconductive layer is provided. For example, at each of the crossed portions of the linear luminous sources $O_1, O_2, O_3$ and the linear electrode $X_1$, the light switch elements 61a, 61b, 61c are provided. As mentioned above, those light switch elements are laid between the transparent electrode 59 and the divisional transparent electrodes 60a, 60b, 60c. For example, the light switch element 61a is laid between the transparent electrode 59 of the linear electrode $X_1$ and the divisional transparent electrode 60a. The insulating layer 62a is provided on the other portion, that is, the portion having no light switch element Formed thereon, between the transparent electrode 59 and the divisional transparent electrode 60a. For example, the light switch element 61a, that is, the photoconductive layer is formed by performing the steps of forming the transparent electrode 59, forming an a-Si film on the transparent electrode 59 with a plasma CVD method and patterning the a-Si film. In place of the a-Si, a-SiC or a-SiN may be used. Then, the divisional transparent electrode 60a is deposited by sputtering ITO on the photoconductive layer and patterning the ITO layer.

When light is applied to the light switch element 61a, the light switch element 61a reduces the electric resistance, resulting in being able to apply a signal from the linear electrode $X_1$ into the divisional transparent electrode 60a.

An orientation layer 63 is formed on those layers. This orientation layer 63 is composed by rubbing a polyimide film formed with a spinner.

A plurality of linear transparent electrodes $Y_1, Y_2, \ldots, Y_{480}$ are provided on the other glass substrate 50. Those transparent electrodes are deposited by sputtering ITO on the glass substrate 50. An orientation layer 64 is formed on those transparent electrodes $Y_1, Y_2, \ldots, Y_{480}$. This orientation layer 64 is formed by rubbing a polyimide film formed with a spinner.

A plurality of spacers are dispersed between the substrates having some layers formed thereon. Both of the substrates are pasted through a sealing member 65 laid therebetween. Then, liquid crystal is injected into the space defined between both of the substrates for forming a liquid crystal layer 66. The thickness of the liquid crystal layer 66 is about 7 μm. The display mode of the liquid crystal layer 66 is a super twisted nematic (STN) mode with deflection angle 240°. The used liquid crystal used is a PCH liquid crystal ZLI-1565 (manufactured by Merck Co., Inc.), for example. This liquid crystal is injected in vacuum for forming the liquid crystal 66.

For performing light scanning, the linear luminous sources $O_1, O_2, O_3$ are sequentially activated. An electric signal corresponding to the light-scanning is applied to each of the linear electrodes $X_1, X_2, \ldots, X_{640}$. While the linear luminous sources $O_1, O_2, O_3$ are made luminous, the light switch elements located on the linear luminous sources are operated on. Hence, the linear electrodes $X_1, X_2, \ldots, X_{640}$ serve to apply electric signals to the corresponding divisional transparent electrodes, respectively. In synchronism with the light scanning operation done by each of the luminous sources $O_1, O_2, O_3$, the linear electrodes $Y_1$ to $Y_{160}$, $Y_{161}$ to $Y_{320}$ and $Y_{321}$ to $Y_{480}$ are scanned as shown in FIG. 13. Those linear electrodes are operated in a manner to reduce the number of Y-directional scan lines crossed with the X-directional linear electrodes $X_1, X_2, \ldots, X_{640}$ to one third of the scan lines (according to the present embodiment). Conversely, if the simple-matrix driven type LCD according to the present embodiment increases the scan lines by a factor of 3, this results in offering the similar characteristics to the foregoing known LCD. In addition, in the above description, the number of the linear luminous sources for dividing the Y-directional scan line is 3, but the number may be any if it is 2 or more. The structure according to the present embodiment is capable of displaying an image at a high contrast of 480×640 with a duty factor of 1/160.

As is apparent from the above description, the simple matrix driven type LCD of the present embodiment is capable of driving a lot of scan lines at a voltage of a low duty factor. Hence, if the scan lines are increased to 1000 or more, this LCD keeps high contrast, a wide angle of view, and a high response.

The luminous portions may be formed on both sides of the substrate by providing the electrodes on the opposite ends to the electrodes 54 and 58 of the linear luminous sources. This results in being able to greatly enhance light intensity of the linear luminous source. Further, it is possible to form the electrode over the rear surface of the linear luminous sources $O_1, O_2, O_3$ by forming an aluminum layer on the glass substrate 51 with the electron (EB) deposition method and carrying out the etching treatment on the aluminum layer. This results in being able to prevent light leakage from the luminous layer, thereby considerably enhancing light intensity. A light-shielding layer may be provided on the light switch element (the photoconductive layer) provided at each of the crossed portions of the linear luminous sources $O_1, O_2, O_3$ and the linear electrodes $X_1, X_2, \ldots, X_{640}$. The provision of the light-shielding layer results in being able to prevent the light incident from the upward from being applied to each light switch element.

Figure 14:
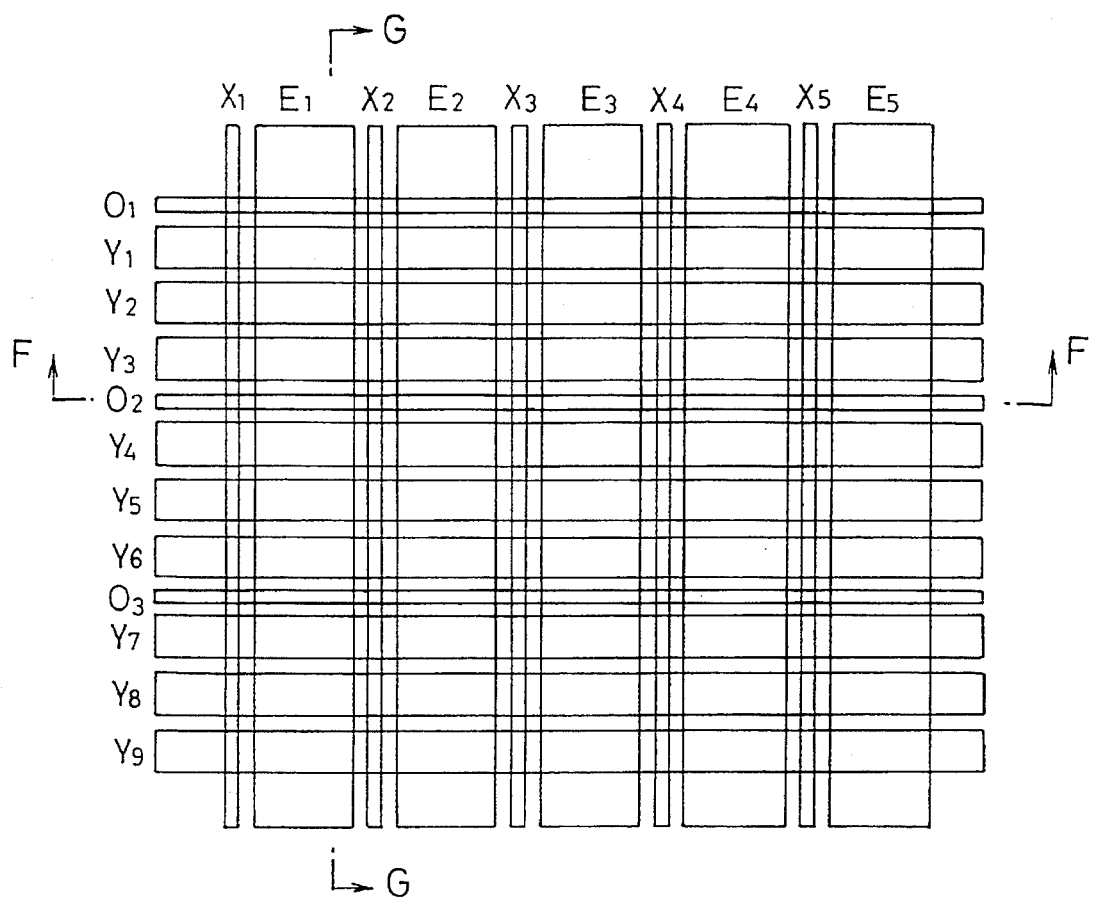
FIG. 14 is a plan view showing a transformation of the simple matrix driven type LCD according to the fifth embodiment.
Figure 15:
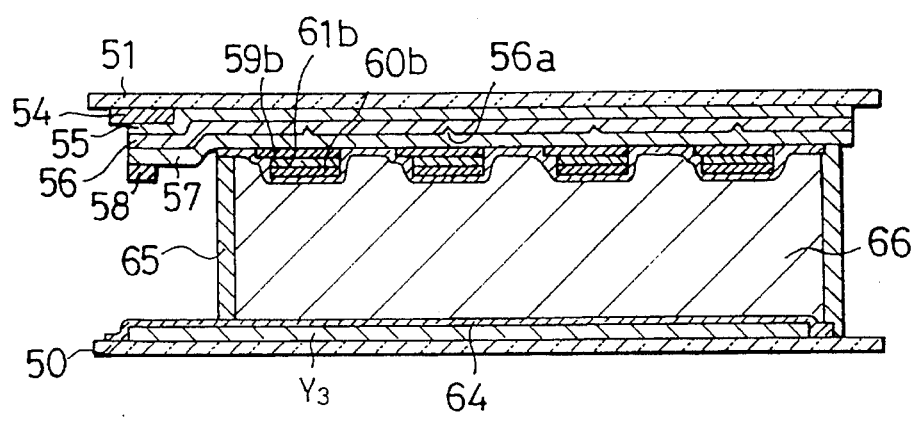
FIG. 15 is a sectional view cut on the F—F line of FIG. 14.
Figure 16:
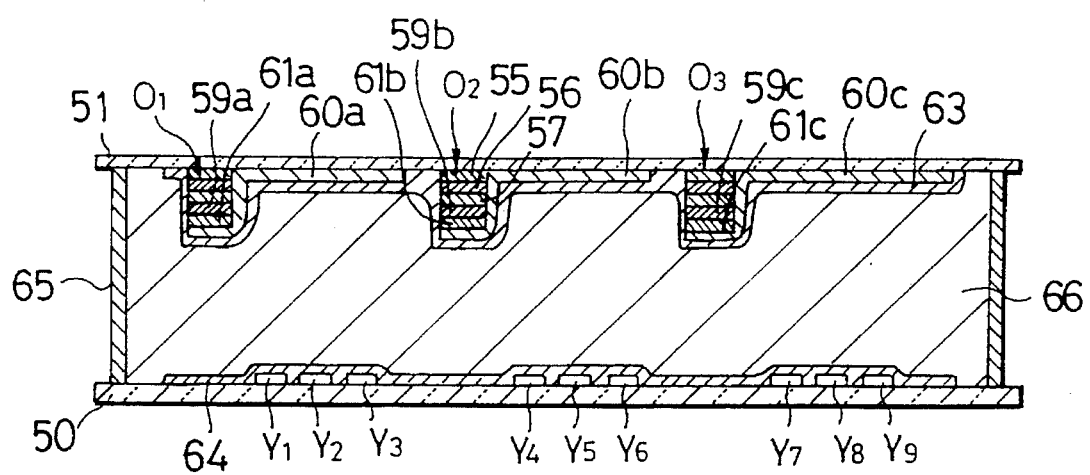
FIG. 16 is a sectional view cut on the G—G line of FIG. 14.

FIG. 14 is a plan view showing another transformation of the simple matrix driven type LCD according to the fifth embodiment, FIG. 15 is a sectional view cut on the F—F line of FIG. 14, and FIG. 16 is a sectional view cut on the G—G line of FIG. 14.

As shown in FIGS. 14 to 16, the transparent electrode 59 of the linear electrode $X_1$ and the divisional transparent electrode 60a are overlapped only on the portion where the light switch element 61a is formed. However, those electrodes 59a and 60a are arranged on the other portion in a planar manner without being overlapped. This structure results in overcoming the shortcoming that the capacitance between the transparent electrode and the divisional transparent electrode has an adverse effect on the signal. The manufacturing process, the structure and the operation of this transformation is the same as the embodiment shown in FIGS. 10, 11 and 12, except in the above-described different respect.

Figure 17:
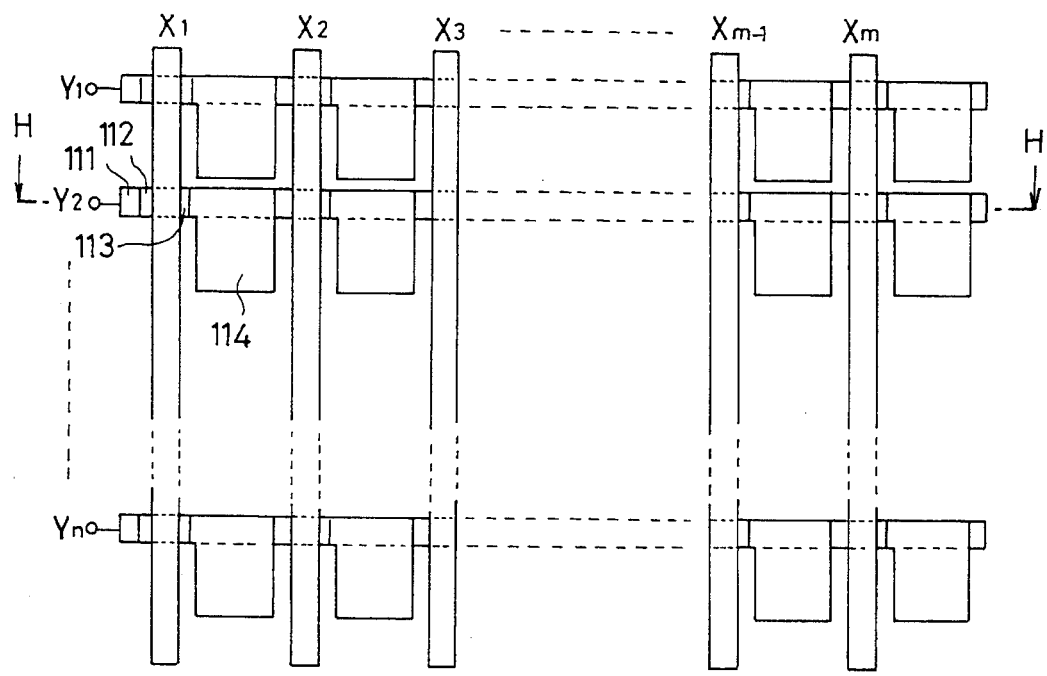
FIG. 17 is a plan view showing fundamental structure of an active matrix driven type LCD according to a sixth embodiment of the present invention.
Figure 18:
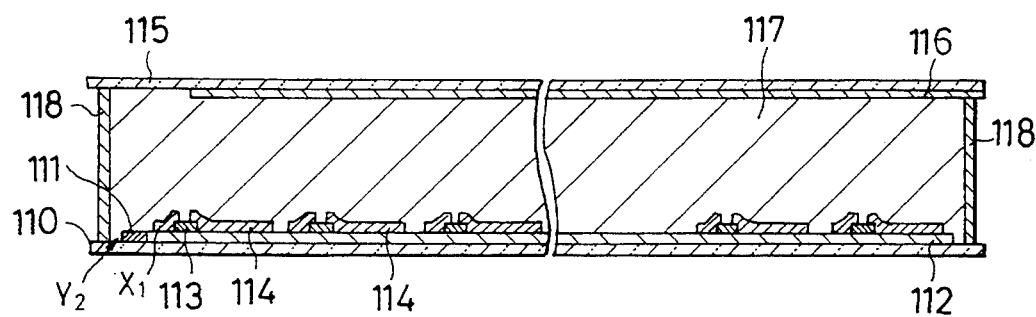
FIG. 18 is a sectional view cut on the line H—H line of FIG. 17.

FIG. 17 is a plan view showing fundamental structure of an active matrix driven type LCD according to the sixth embodiment of the present invention. FIG. 18 is a sectional view cut on the line H—H line of FIG. 17.

In the plan view of FIG. 17, a glass substrate 115, a transparent electrode 116, a liquid crystal layer 117 and a sealing member 118 are not shown.

As shown in FIGS. 17 and 18, a plurality of linear luminous sources $Y_1, Y_2, \ldots, Y_n$ are arranged on one glass substrate 110 along the Y (longitudinal) direction of FIG. 17. A plurality of linear electrodes $X_1, X_2, \ldots, X_{m-1}, X_m$ are arranged on those linear luminous sources along the X (perpendicular) direction of FIG. 17. The linear electrodes are crossed with the linear luminous sources for example at right angles.

Each of the linear luminous sources $Y_1, Y_2, \ldots, Y_n$, for example, the linear luminous source $Y_2$ is composed of a luminous portion 111 and a light waveguide 112. The luminous portion 111 is made of an electroluminescent (EL) element, for example. The light waveguide 112 is formed linearly and transmits light from the luminous portion 111. By activating the luminous portion 111, the linear luminous source $Y_2$ serves to emit a linear ray of light from the overall surface of the source.

It is possible to use all the linear luminous sources $Y_1, Y_2, \ldots, Y_n$ as a luminous area. However, the structure of the present embodiment is more advantageous in light of low power consumption.

At each of the crossed portions of the linear luminous sources $Y_1, Y_2, \ldots, Y_n$ and the linear electrodes $X_1, X_2, \ldots, X_m$, that is, adjacent to each of the crossed portions of the linear luminous sources $Y_1, Y_2, \ldots, Y_n$ and the linear electrodes $X_1, X_2, \ldots, X_m$, a light switch element is provided. The light switch element is made of a photoconductive layer. The linear electrodes $X_1, X_2, \ldots, X_m$ and a pixel electrode 114 for driving a display medium such as liquid crystal are formed on the same level. The light switch elements are provided between the linear electrodes $X_1, X_2, \ldots, X_m$ and the pixel electrode 114. For example, at the crossed portion of the linear luminous source $Y_2$ and the linear electrode $X_1$, the light switch element 113 is provided between the linear electrode $X_1$ and the pixel electrode 114.

When light is applied to the light switch element 113, that is, the linear luminous source $Y_2$ is made luminous (activated), the light switch element 113 reduces its electric resistance, resulting in being able to apply a signal from the linear electrode $X_1$ to the pixel electrode 114.

A transparent electrode 116 is provided on the other glass substrate 115. A liquid crystal layer 117 is sealed in the area defined by both of the substrates and the sealing member 118.

For performing light scanning, the linear luminous sources $Y_1, Y_2, \ldots, Y_n$ are activated sequentially from $Y_1$ to $Y_n$. An electric signal corresponding to the light-scanning is applied to each of the linear electrodes $X_1, X_2, \ldots, X_{m-1}, X_m$. While the linear luminous sources $Y_1, Y_2, \ldots, Y_n$ are made luminous, the light switch elements located on the linear luminous sources are operated on. As a result, the linear electrodes $X_1, X_2, \ldots, X_{m-1}, X_m$ serve to apply electric signals to the corresponding pixel electrodes, respectively. That is, in place of an electric gate signal of a TFT element, each of the light switch elements is scanned by the light applied from the linear luminous sources $Y_1, Y_2, \ldots, Y_n$.

As is apparent from the above description, since the scan signal is a ray of light, no unfavorable state appears wherein the scan signal (gate signal) is flown into the pixel electrodes through the element capacitance.

Figure 19:
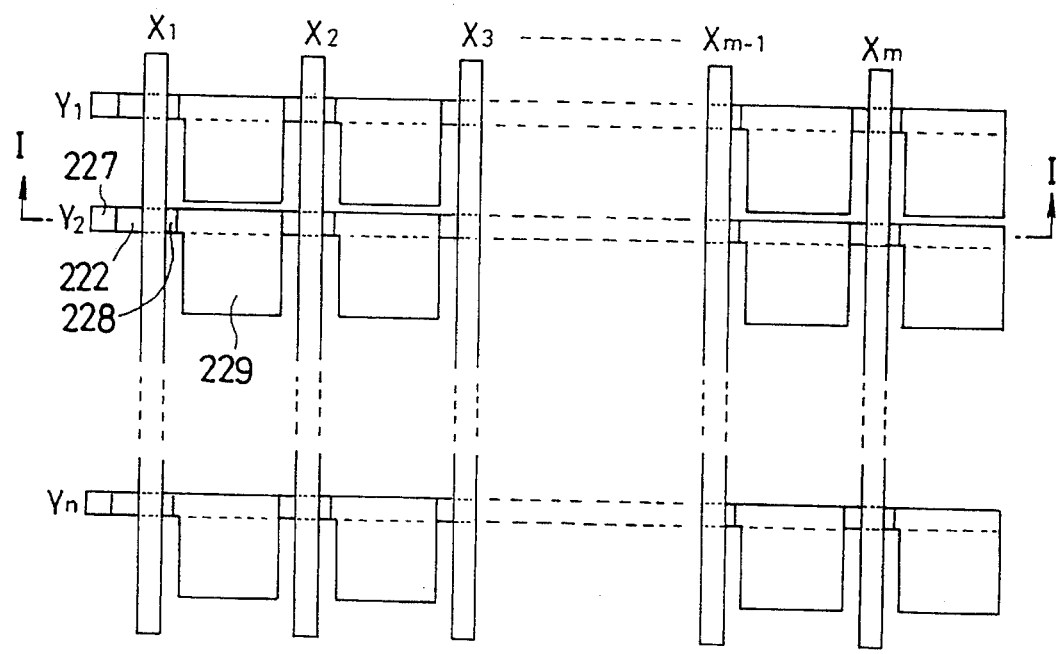
FIG. 19 is a plan view showing structure of an active matrix driven type LCD according to a seventh embodiment of the present invention.
Figure 20:
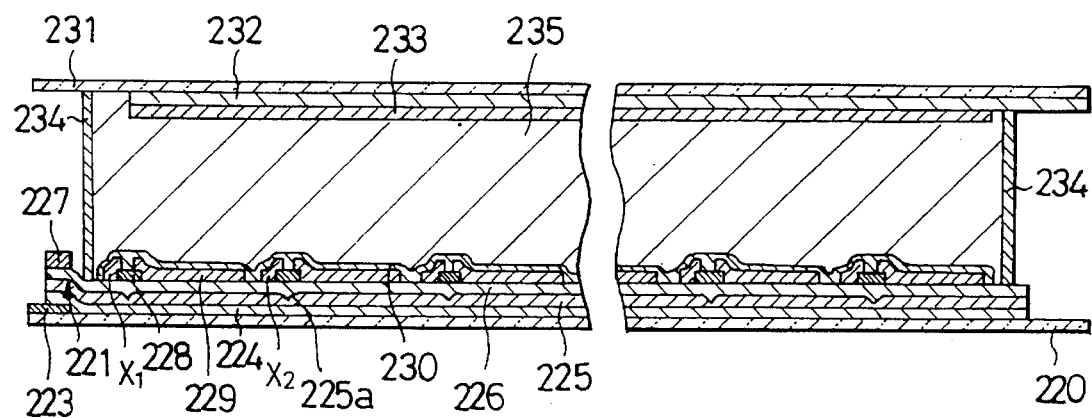
FIG. 20 is a sectional view cut on the I—I line of FIG. 19.

FIG. 19 is a plan view showing structure of an active matrix driven type LCD according to the seventh embodiment of the present invention and FIG. 20 is a sectional view cut on the I—I line of FIG. 20.

In the plan view of FIG. 19, there are not shown an orientation layer 230, a glass substrate 231, a transparent electrode 232, an orientation layer 233, a sealing member 234 and a liquid crystal layer 235, though they are shown in FIG. 20.

As shown in FIGS. 19 and 20, a plurality of linear luminous sources $Y_1, Y_2, \ldots, Y_n$ are arranged on one glass substrate 220 along the Y (longitudinal) direction of FIG. 19. A plurality of linear electrodes $X_1, X_2, \ldots, X_{m-1}, X_m$ are arranged on those linear luminous sources along the X (perpendicular) direction of FIG. 19. The linear electrodes are crossed with the linear luminous sources for example at right angles.

Each of the linear luminous sources $Y_1, Y_2, \ldots, Y_n$, for example, the linear luminous source $Y_2$ is composed of a luminous portion 221 and a light waveguide 222. The luminous portion 221 is made of an electroluminescent (EL) element, for example. The light waveguide 222 is formed linearly and transmit light from the luminous portion 221. By activating the luminous portion 221, the linear luminous source $Y_2$ serves to emit a linear ray of light from the overall surface of the source. It is possible to use all the linear luminous sources $Y_1, Y_2, \ldots, Y_n$ as a luminous area.

The luminous portion 221 and the light waveguide 222 are formed in the process indicated below.

An aluminum (Al) layer is formed on the glass substrate 220 by means of an electron beam (EB) deposition method. Then, an etching treatment is carried out on the aluminum layer for forming each of the electrodes 223. This electrode 223 is formed as short strips arranged in parallel and provided on one end of the linear luminous source $Y_2$.

Next, a lower insulating layer 224 is formed on the glass substrate 220 and a part of the electrode 223. The lower insulating layer 224 is deposited thereon by sputtering silicon dioxide ($SiO_2$) or silicon nitride ($Si_2N_3$). Then, a luminous layer 225 is laminated on the lower insulating layer 224. For forming the luminous layer 225, it is necessary to form a zinc sulfide (ZnS) layer with an addition of 0.5% of manganese (Mn) by means of the electron beam (EB) deposition method and carry out the linear patterning of the resulting zinc sulfide (ZnS) layer by means of the vacuum heating and etching treatments. For doing the etching treatment, it is better to provide a cut-away 225a in the luminous layer 225, because the provision of the cut-away 225a results in increasing the quantity of light emitted outside of the luminous layer 225, thereby enhancing a utilization factor of light.

Then, an upper insulating layer 226 is formed. This upper insulating layer 226 is deposited on the luminous layer 225 by sputtering silicon nitride ($Si_2N_3$) or aluminum oxide ($Al_2O_3$). An electrode 227 is formed on the upper insulating layer 226 at an opposite location to the electrode 223. This electrode 227 is formed by performing the electron beam (EB) deposition of an aluminum layer on a part of the upper insulating layer 226.

For forming those electrodes 223 and 227, it is possible to use metal such as molybdenum (Mo) or indium-tin oxide (ITO) in addition to aluminum (Al). For forming the lower and the upper insulating layers 224 and 226, it is possible to use silicon nitride group ($SiN_x$), strontium titanium oxide ($SrTiO_3$) or tantalum oxide barium ($BaTa_2O_6$) in addition to $SiO_2$, $Si_2N_3$ and $Al_2O_3$. For forming the luminous layer 225, it is possible to form zinc selenide (ZnSe) in addition to ZnS.

At each of the crossed portions of the linear luminous sources $Y_1, Y_2, \ldots, Y_n$ and the linear electrodes $X_1, X_2, \ldots, X_m$, that is, adjacent to each of the crossed portions of the linear luminous sources $Y_1, Y_2, \ldots, Y_n$ and the linear electrodes $X_1, X_2, \ldots, X_m$, a light switch element is provided. The light switch element is composed of a photoconductive layer. The linear electrodes $X_1, X_2, \ldots, X_m$ and the pixel electrode 229 for driving a display medium such as liquid crystal are formed on the same level. The light switch elements are provided between the linear electrodes $X_1, X_2, \ldots, X_m$ and the pixel electrode 229. For example, at the crossed portion of the linear luminous source $Y_2$ and the linear electrode $X_1$, a light switch element 228 is provided between the linear electrode $X_1$ and the pixel electrode 229.

The photoconductive layer is formed on the upper insulating layer 226 by forming a hydrogenated amorphous silicon (a-Si:H) film with a plasma CVD (Chemical Vapor Deposition) and patterning the a-Si:H film. Next, for forming the linear electrodes $X_1, X_2, \ldots, X_{m-1}, X_m$ on the upper insulating layer 226, a metal film like aluminum (Al) is formed by means of the electron beam (EB) deposition method and patterning the metal film. Then, the pixel electrode 229 is formed by sputtering ITO on the upper insulating layer 226 and patterning the ITO-sputtered layer.

When light is applied to the light switch element 228, the light switch element 228 reduces its electric resistance, resulting in applying a signal from the linear electrode $X_1$ to the pixel electrode 229.

The orientation layer 230 is formed on those layers. This orientation layer 230 is composed by rubbing a polyimide film formed with a spinner.

An transparent electrode 232 is provided on the other glass substrate 231. This transparent electrode 232 is formed by sputtering ITO on the glass substrate 231. An orientation layer 233 is formed on the transparent electrode 232. This orientation layer 233 is formed by rubbing a polyimide film formed with a spinner.

A plurality of spacers (not shown) are dispersed between the substrates having some layers formed thereon. Both of the substrates are pasted through the sealing member 234 laid therebetween. Then, liquid crystal is injected into the space defined between both of the substrates and the sealing member 234 for forming a liquid crystal layer 235.

The thickness of the liquid crystal layer 235 is about 5 μm. The display mode of the liquid crystal layer 235 is a twisted nematic (TN) normal white type. For a liquid crystal material, for example, a PCH (phenylcyclohexanone) liquid crystal ZLI-1565 (manufactured by Merck Co., Inc.) is used. This liquid crystal is injected in vacuum for forming the liquid crystal 235.

For doing light scanning, the linear luminous sources $Y_1, Y_2, \ldots, Y_n$ are activated sequentially from $Y_1$ to $Y_n$. An electric signal corresponding to the light-scanning is applied to each of the linear electrodes $X_1, X_2, \ldots, X_{m-1}, X_m$. While the linear luminous sources $Y_1, Y_2, \ldots, Y_n$ are made luminous (activated), the light switch elements located on the activated linear luminous sources are operated on. As a result, the linear electrodes $X_1, X_2, \ldots, X_{m-1}, X_m$ serve to apply electric signals to the corresponding pixel electrodes, respectively for the purpose of representing an image on a screen.

As is apparent from the above description, the active matrix driven type LCD according to the present embodiment has the structure where a switch is provided for each pixel like the TFT element. This structure makes it possible to display an image at high contrast. Further, since the scan signal is a ray of light, unlike the TFT element, no unfavorable state appears wherein the scan signal (gate signal) is flown into the pixel electrodes through the element capacitance. Hence, the number of the scan lines is allowed to be increased to 1000 or more.

Figure 21:
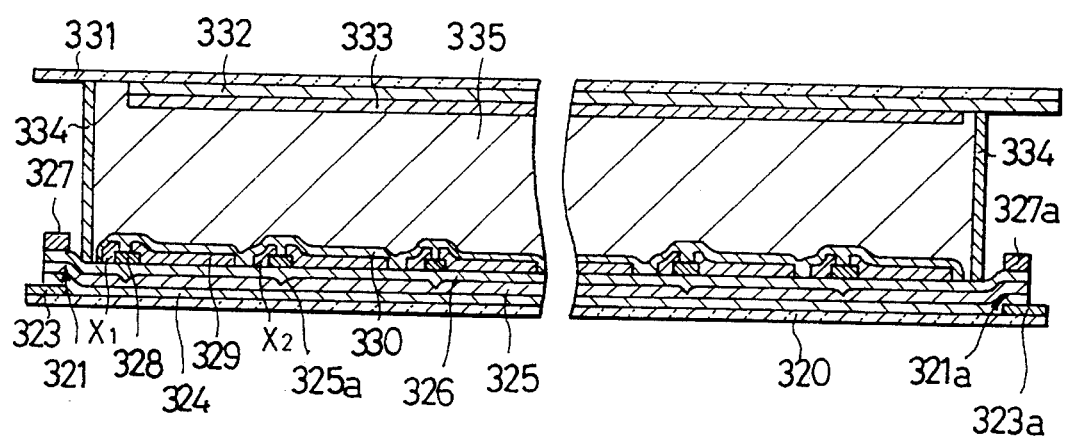
FIG. 21 is a sectional view showing structure of an active matrix driven type LCD according to an eighth embodiment of the present invention.

FIG. 21 is a sectional view showing structure of an active matrix driven type LCD according to the eighth embodiment of the present invention.

According to the present embodiment, each of the linear luminous sources $Y_1, Y_2, \ldots, Y_n$, for example, the linear luminous source $Y_2$ includes luminous portions 321 and 321a at both ends thereof. Each of the luminous portions 321 and 321a is made of an electroluminescent (EL) element, for example. As shown in FIG. 21, at the opposite ends to the electrodes 323 and 327 of the linear luminous source, electrodes 323a and 327a are provided.

This results in being able to greatly enhance light intensity of the linear luminous source. The manufacturing process, the structure and the operation of the present embodiment are the same as the seventh embodiment shown in FIGS. 19 and 20 except in the above different respect.

As is apparent from the above description, the active matrix driven type LCD according to the present embodiment has the structure where a switch is provided for each pixel like the TFT element. This structure makes it possible to display an image at high contrast. Further, since the scan signal is a ray of light, unlike the TFT element, no unfavorable state appears wherein the scan signal (gate signal) is flown into the pixel electrodes through the element capacitance. Hence, the number of the scan lines is allowed to be increased to 1000 or more.

Figure 22:
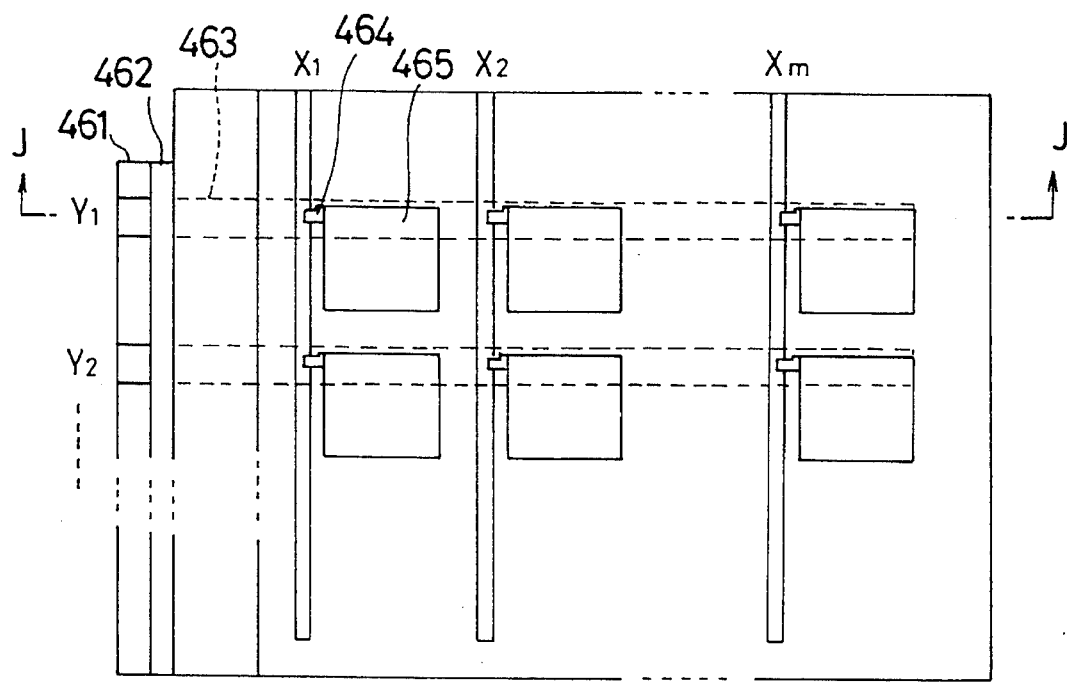
FIG. 22 is a plan view showing structure of an active matrix driven type LCD according to a ninth embodiment of the present invention.
Figure 23:
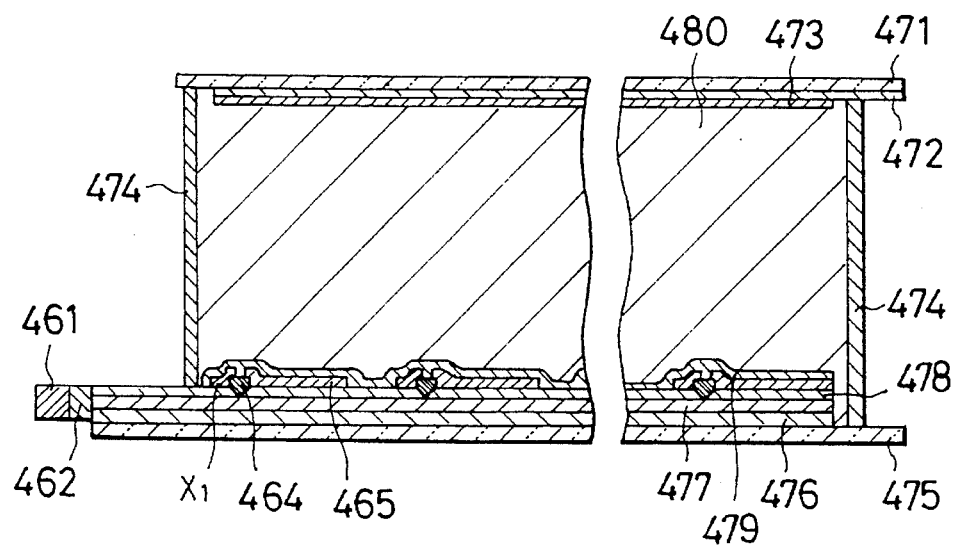
FIG. 23 is a sectional view cut on the line J—J of FIG. 22.

FIG. 22 is a plan view showing structure of an active matrix driven type LCD according to a ninth embodiment of the present invention. FIG. 23 is a sectional view cut on the line J—J of FIG. 22.

In the plan view of FIG. 22, there are not shown a glass substrate 471, a transparent electrode 472, an orientation layer 473, a sealing member 474, an orientation layer 479, and a liquid crystal layer 480, though they are shown in FIG. 23.

As shown in FIGS. 22 and 23, a plurality Of linear luminous sources $Y_1, Y_2, \ldots, Y_n$ are arranged on one glass substrate 475 along the Y (longitudinal) direction of FIG. 22. A plurality of linear electrodes $X_1, X_2, \ldots, X_m$ are arranged on those linear luminous sources along the X (perpendicular) direction of FIG. 22. The linear electrodes are crossed with the linear luminous sources for example at right angles.

Each of the linear luminous sources $Y_1, Y_2, \ldots, Y_n$, for example, the linear luminous source $Y_1$ is composed of an LED (light-emitting diode) array 461 serving as a luminous portion and a light waveguide 463. By activating the luminous portion, the linear luminous source $Y_1$ serves to emit a linear ray of light.

At each of the crossed portions of the linear luminous sources $Y_1, Y_2, \ldots, Y_n$ and the linear electrodes $X_1, X_2, \ldots, X_m$, that is, adjacent to each of the crossed portions of the linear luminous sources $Y_1, Y_2, \ldots, Y_n$ and the linear electrodes $X_1, X_2, \ldots, X_m$, a light switch element is provided. The light switch element is composed of a photoconductive layer. The linear electrodes $X_1, X_2, \ldots, X_m$ and the pixel electrode 465 for driving a display medium such as liquid crystal are formed on the same level. The light switch elements are provided between the linear electrodes $X_1, X_2, \ldots, X_m$ and the pixel electrode 465. For example, at the crossed portion of the linear luminous source $Y_1$ and the linear electrode $X_1$, a light switch element 464 is provided between the linear electrode $X_1$ and the pixel electrode 465.

When light is applied to the light switch element 464, that is, the linear luminous source $Y_1$ is made luminous, the switch element 464 reduces its electric resistance, resulting in being able to apply a signal from the linear electrode $X_1$ to the pixel electrode 465.

The light waveguide 463 is formed in accordance with the process indicated below.

At first, epoxy resin is coated on the glass substrate 475. The coat of the epoxy resin serves as a clad layer 476. A bisphenol-Z-polycarbonate (PCZ) film containing photopolymerization monomer (acrylate) is formed on the epoxy resin with a solution casting method. By selectively polymerizing the PCZ film through a linear photomask, the PCZ layer is formed as a core layer 477 and the polymerized portion of the PCZ and polyacrylate having a smaller index of refraction than the PCZ is formed as the clad layer 476. By coating epoxy resin as a protection layer, the light waveguide 463 is formed. Then, the light switch element 464, the pixel electrode 465 and the orientation layer 479 are formed on the light waveguide 463 by the same process as the seventh embodiment shown in FIGS. 19 and 20.

For the light waveguide, for example, it is possible to use a glass light waveguide formed by an ion exchange method. Alternatively. a SELFOK lens (distributed index lens) may be used.

In this embodiment, the LED array 461 and the light waveguide 463 are joined by an optical fiber array 462.

A transparent electrode 472 is provided on the other glass substrate 471. This transparent electrode 472 is formed by sputtering ITO on the glass substrate 471. An orientation layer 473 is formed on the transparent electrode 472. The orientation layer 473 is formed by rubbing a polyimide film formed with a spinner.

A plurality of spacers (not shown) are dispersed between the substrates having some layers formed thereon. Both of the substrates are pasted through the sealing member 474 laid therebetween. Then, liquid crystal is injected into the space defined between both of the substrates and the sealing member 474 for forming a liquid crystal layer 480.

The other manufacturing process, the structure and the operation of the present embodiment are the same as the seventh embodiment shown in FIGS. 19 and 20, except in the above different respect.

As is apparent from the above description, the active matrix driven type LCD according to the present embodiment has the structure where a switch is provided for each pixel like the TFT element. This structure makes it possible to display an image at high contrast. Further, since the scan signal is a ray of light, unlike the TFT element, no unfavorable state appears wherein the scan signal (gate signal) is flown into the pixel electrodes through the element capacitance. Hence, the number of the scan lines is allowed to be increased to 1000 or more.

Figure 24:
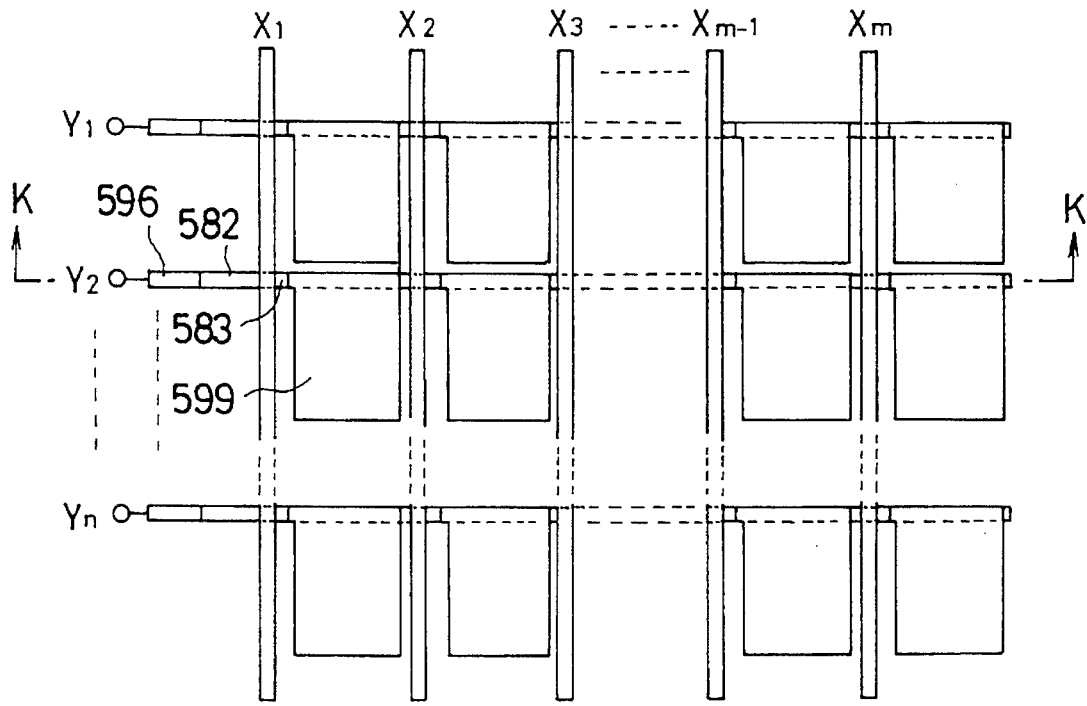
FIG. 24 is a plan view showing structure of an active matrix driven type LCD according to a tenth embodiment of the present invention.
Figure 25:
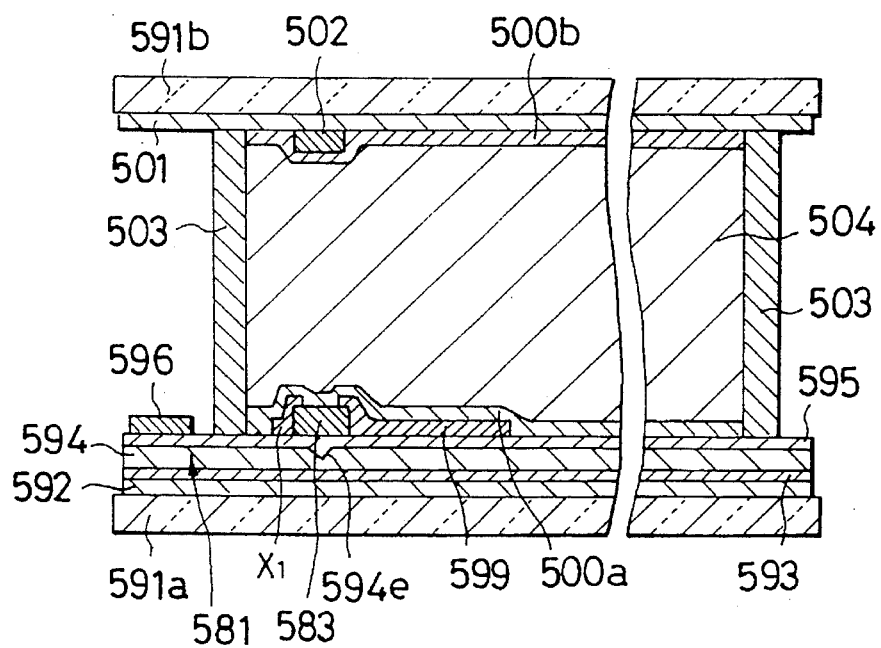
FIG. 25 is a sectional view cut on the K—K line of FIG. 24.

FIG. 24 is a plan view showing structure of an active matrix driven type LCD according to a tenth embodiment of the present invention. FIG. 25 is a sectional view cut on the K—K line of FIG. 24.

In the plan view of FIG. 24, there are not shown a fiber plate substrate 591b, orientation layers 500a and 500b, a transparent electrode 501, a light-shielding layer 502, a sealing member 503, and a liquid crystal layer 504, though they are shown in FIG. 25.

As shown in FIGS. 24 and 25, a plurality of linear luminous sources $Y_1, Y_2, \ldots, Y_n$ are arranged on one fiber plate substrate 591a along the Y (longitudinal) direction of FIG. 24. A plurality of linear electrodes $X_1, X_2, \ldots, X_{m-1}, X_m$ are arranged along the X (perpendicular) direction of FIG. 24. Those linear electrodes are crossed with the linear luminous sources for example at right angle.

Each of the linear luminous sources $Y_1, Y_2, \ldots, Y_n$, for example, the linear luminous source $Y_2$ is composed of a luminous portion 581 and a linear light waveguide 582 for passing light from the luminous portion 581. The luminous portion 581 is made of an electroluminescent (EL) element, for example. By activating the luminous portion 581, the linear luminous source $Y_2$ serves to emit a linear ray of light. In addition, it is possible to use all of the linear luminous sources $Y_1, Y_2, \ldots, Y_n$ as a luminous area.

The luminous portion 581 and the light waveguide 582 are formed with the process indicated below.

An aluminum (Al) layer is formed on the fiber plate substrate 591a by means of an electron beam (EB) deposition method. Then, an etching treatment is carried out on the aluminum layer for forming the electrode 592. This electrode 592 is formed as short strips arranged in parallel. The electrode 592 serves as its essential role, that is, an electrode as well as shielding the light (outside light) incident from the lower portion of the element to the photoconductive layer, that is, a light-shielding layer.

Next, a lower insulating layer 593 is formed on the fiber plate substrate 591a and a part of the electrode 592. The lower insulating layer 593 is deposited thereon by sputtering silicon dioxide ($SiO_2$) or silicon nitride ($Si_2N_3$). Then, a luminous layer 594 is laminated on the lower insulating layer 593. For forming the luminous layer 594, it is necessary to form a zinc sulfide (ZnS) layer with an addition of 0.5% of manganese (Mn) by the electron beam (EB) deposition method and carry out the linear patterning of the resulting zinc sulfide (ZnS) layer by means of the vacuum heating and etching treatments.

For doing the etching treatment, it is better to form a cut-away 594e in the luminous layer 594, because the provision of the cut-away 594e results in increasing the quantity of light emitted outside of the luminous layer 594, thereby enhancing a utilization factor of light.

Then, an upper insulating layer 595 is formed. This upper insulating layer 595 is deposited on the luminous layer 594 by sputtering silicon nitride ($Si_2N_3$) or aluminum oxide ($Al_2O_3$). An electrode 596 is formed on the upper insulating layer 595 at an opposite location to the electrode 592. This electrode 596 is formed by performing the electron beam (EB) deposition of an aluminum layer on a part of the upper insulating layer 595.

For forming those electrodes 592 and 596, it is possible to use metal such as molybdenum (Mo) in addition to aluminum (Al). In particular, for forming the electrode 596, indium-tin oxide (ITO) may be used. For forming the lower and the upper insulating layers 593 and 595, it is possible to use silicon nitride group ($SiN_x$), strontium titanium oxide ($SrTiO_3$) or tantalum oxide barium ($BaTa_2O_6$) in addition to $SiO_2$, $Si_2N_3$ and $Al_2O_3$. For forming the luminous layer 594, it is possible to use zinc selenide (ZnSe) in addition to ZnS.

At each of the crossed portions of the linear luminous sources $Y_1, Y_2, \ldots, Y_n$ and the linear electrodes $X_1, X_2, \ldots, X_m$, that is, adjacent to each of the crossed portions of the linear luminous sources $Y_1, Y_2, \ldots, Y_n$ and the linear electrodes $X_1, X_2, \ldots, X_m$, a light switch element is provided. The light switch element is composed of a photoconductive layer. The linear electrodes $X_1, X_2, \ldots, X_m$ and the pixel electrode 599 for driving a display medium such as liquid crystal are formed on the same level. The light switch elements are provided between the linear electrodes $X_1, X_2, \ldots, X_m$ and the pixel electrode 599, respectively. For example, at the crossed portion of the linear luminous source $Y_2$ and the linear electrode $X_1$, a light switch element 583 is provided between the linear electrode $X_1$ and the pixel electrode 599.

The photoconductive layer is formed by forming a hydrogenated amorphous silicon (a-Si:H) film with a plasma CVD (Chemical Vapor Deposition) method and patterning the a-Si:H film. Next, for forming the linear electrodes $X_1, X_2, \ldots, X_m$ on the upper insulating layer 595, a metal film like aluminum is formed by means of the electron beam (EB) deposition method and patterning the metal film. Then, the pixel electrode 599 is formed by sputtering ITO on the upper insulating layer 595 and patterning the ITO-sputtered layer.

When light is applied to the light switch element 583, the light switch element 583 reduces its electric resistance, resulting in applying a signal from the linear electrode $X_1$ to the pixel electrode 599.

The orientation layer 500a is formed on those layers. This orientation layer 500a is composed by rubbing a polyimide film formed with a spinner.

A transparent electrode 501 is provided on the other fiber plate substrate 591b made of a fiber plate. This transparent electrode 501 is formed by sputtering ITO on the fiber plate substrate 591b. Then, a light-shielding layer 502 is formed on the transparent electrode 501 in a manner to match the patterns of the light switch element 583 formed on the opposed fiber plate substrate 591a. The light-shielding layer 502 is formed by depositing aluminum (Al) with the electron beam (EB) deposition method.

For forming the light-shielding layer 502, it is possible to use metal such as molybdenum (Mo), an organic pigment dispersed type resin, or an inorganic pigment dispersed type resin in addition to aluminum (Al).

The orientation layer 500b is formed on those transparent electrode 501 and light-shielding layer 502. This orientation layer 500b is composed by rubbing a polyimide film formed with a spinner.

A plurality of spacers (not shown) are dispersed between the substrates having some layers formed thereon. Both of the substrates are pasted through the sealing member 503 laid therebetween. Then, liquid crystal is injected into the space defined between both of the substrates and the sealing member 503 for forming a liquid crystal layer 504.

The thickness of the liquid crystal layer 504 is about 5 μm. The display mode of the liquid crystal layer 504 is a twisted nematic (TN) normal white type. For a liquid crystal material, for example, a PCH (phenycyclohexanone) liquid crystal ZLI-1565 (manufactured by Merck Co., Inc.) is used. This liquid crystal is injected in vacuum for forming the liquid crystal layer 504.

For performing light scanning, the linear luminous sources $Y_1, Y_2, \ldots, Y_n$ are activated sequentially from $Y_1$ to $Y_n$. An electric signal corresponding to the light-scanning is applied to each of the linear electrodes $X_1, X_2, \ldots, X_m$. While the linear luminous sources $Y_1, Y_2, \ldots, Y_n$ are made luminous (activated), the light switch elements located on the activated linear luminous sources are operated on. Hence, the linear electrodes $X_1, X_2, \ldots, X_m$ serve to apply electric signals to the corresponding pixel electrodes, respectively for the purpose of representing an image on a screen.

As is apparent from the above description, the active matrix driven type LCD according to the present embodiment has the structure where a switch is provided for each pixel like the TFT element. This structure makes it possible to display an image at high contrast. Further, since the scan signal is a ray of light, unlike the TFT element, no unfavorable state appears wherein the scan signal (gate signal) is flown into the pixel electrodes through the element capacitance. Hence, the number of the scan lines is allowed to be increased to 1000 or more.

Further, since the fiber plate substrate is used in the present embodiment, it is just necessary to screen the light leaked around the light switch element without having to screen the light incident from an oblique location.

Figure 26:
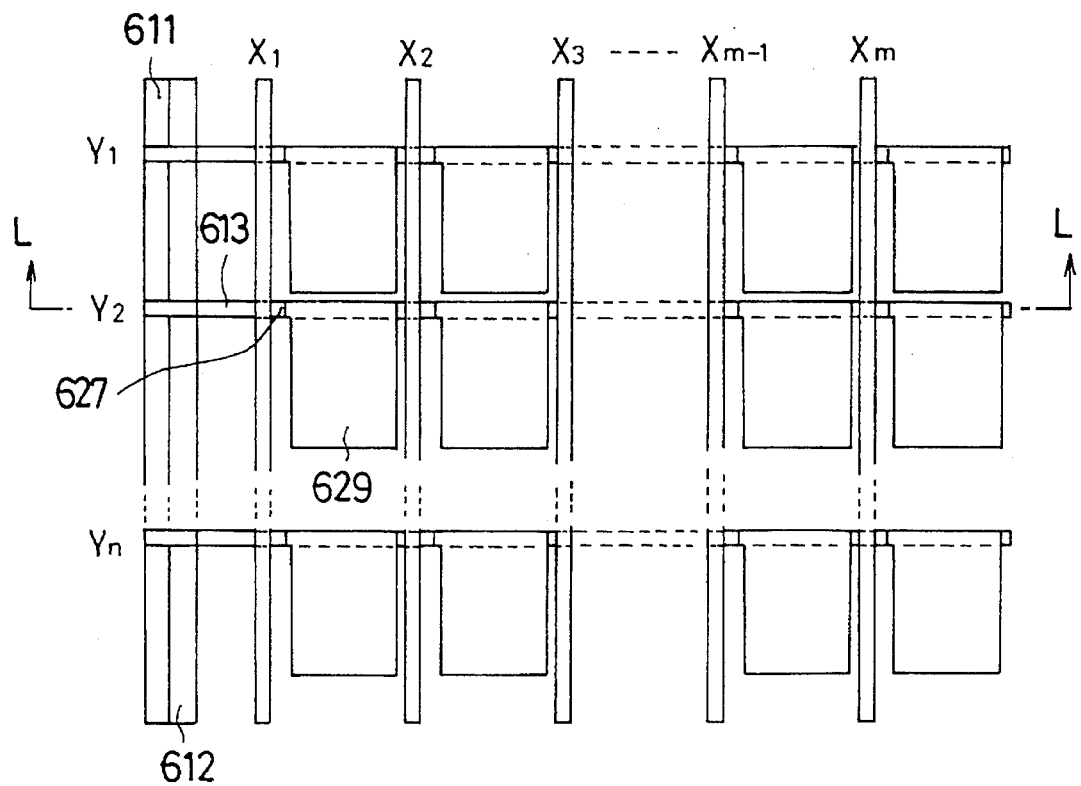
FIG. 26 is a plan view showing structure of an active matrix driven type LCD according to an eleventh embodiment of the present invention.
Figure 27:
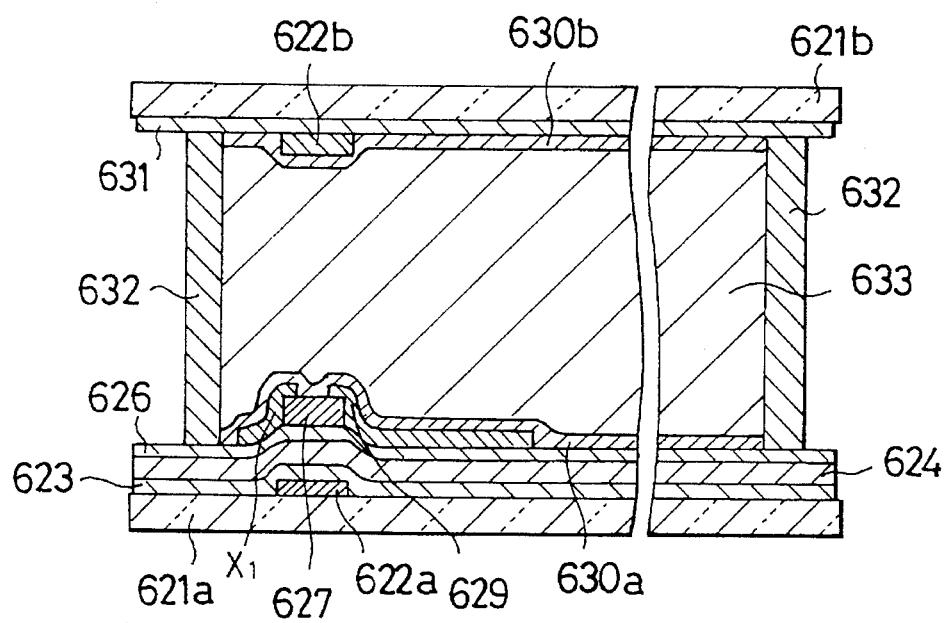
FIG. 27 is a sectional view cut on the L—L line of FIG. 26.

FIG. 26 is a plan view showing structure of an active matrix driven type LCD according to an eleventh embodiment of the present invention. FIG. 27 is a sectional view cut on the L—L line.

In the plan view of FIG. 26, there are not shown a fiber plate 621b, a light-shielding layer 622b, orientation layers 630a and 630b, a transparent electrode 631, a sealing member 632, and a liquid crystal layer 633, though they are shown in FIG. 27.

As shown in FIGS. 26 and 27, a plurality of linear luminous sources $Y_1, Y_2, \ldots, Y_n$ are arranged on one fiber plate substrate 621a along the Y (longitudinal) direction of FIG. 26. A plurality of linear electrodes $X_1, X_2, \ldots, X_{m-1}$, $X_m$ are arranged along the X (perpendicular) direction of FIG. 26. Those linear electrodes are crossed with the linear luminous sources for example at right angle.

Each of the linear luminous sources $Y_1, Y_2, \ldots, Y_n$, for example, the linear luminous source $Y_2$ is composed of a luminous portion and a linear light wave guide 613. The luminous portion includes an LED (light-emitting diode) array 611 and an optical fiber array 612. The linear light waveguide 613 transmits light from the luminous portion. By activating the luminous portion, the linear luminous source $Y_2$ serves to emit a linear ray of light. Alternatively, it is possible to use all of the linear luminous sources $Y_1, Y_2, \ldots, Y_n$ as the luminous area.

The light waveguide 613 is formed in accordance with the process indicated below.

At first, a light-shielding layer 622a is formed by depositing an aluminum (Al) layer on the fiber plate substrate 621a with the electron beam (EB) deposition method. This light-shielding layer 622a serves to prevent the light (outer light) incident from the lower side of the element to the upper-located photoconductive layer. The patterns of the light-shielding layer 622a are formed to match the patterns of the photoconductive layer.

For forming the light-shielding layer 622a, it is possible to use metal such as molybdenum (Mo), an organic pigment dispersed type resin, or an inorganic pigment dispersed type resin in addition to aluminum (Al).

In the present embodiment, the light-shielding layer 622a includes the similar patterns to those of the photoconductive layer. However, the light-shielding layer 622a may be formed as stripes like the electrode 592 serving as a light-shielding layer in the tenth embodiment shown in FIG. 25.

Next, for forming a clad layer 623, epoxy resin is coated on the fiber plate substrate 621a and the light-shielding layer 622a with a spinner. A PCZ film containing photopolymerization monomer (acrylate, for example, methyl acrylate) is formed on the epoxy resin with a solution casting method. By selectively polymerizing the PCZ film through a linear photomask, the PCZ layer is formed as a core layer 624 and a mixture of the PCZ and polyacrylate having a smaller index of refraction than the PCZ is formed as a clad layer 623. The clad layer 623 and the core layer 624 are formed as stripes each other. By coating epoxy resin for forming a surface layer 626, the light waveguide 613 is formed.

For applying light to the light switch elements, it is necessary to blemish the spots on the surface of the light waveguide 613 matching to the light switch elements by carrying out the etching treatment.

For the light waveguide, alternatively, it is possible to use a glass light waveguide formed by the ion exchange method or another light waveguide.

In the present embodiment, the LED array 611 and the light waveguide 613 are connected through an optical fiber array 612. In place of the optical fiber array 612, however, a SELFOK lens (distributed index lens) or the like may be used.

At each of the crossed portions of the linear luminous sources $Y_1, Y_2, \ldots, Y_n$ and the linear electrodes $X_1, X_2, \ldots, X_m$, that is, adjacent to each of the crossed portions of the linear luminous sources $Y_1, Y_2, \ldots, Y_n$ and the linear electrodes $X_1, X_2, \ldots, X_m$, a light switch element is provided. The light switch element is composed of a photoconductive layer. The linear electrodes $X_1, X_2, \ldots, X_m$ and the pixel electrode 629 for driving a display medium such as liquid crystal are formed on the surface layer 628. The light switch elements are provided between the linear electrodes $X_1, X_2, \ldots, X_m$ and the pixel electrode 629, respectively. For example, at the crossed portion of the linear luminous source $Y_2$ and the linear electrode $X_1$, a light switch element 627 is provided between the linear electrode $X_1$ and the pixel electrode 629.

The photoconductive layer is formed by forming a hydrogenated amorphous silicon (a-Si:H) film with a plasma CVD (Chemical Vapor Deposition) method and patterning the a-Si:H film. Next, for forming the linear electrodes $X_1, X_2, \ldots, X_m$ on the surface layer 626, a metal film like aluminum is formed by means of the electron beam (EB) deposition method and patterning the metal film. Then, the pixel electrode 629 is formed by sputtering ITO on the surface layer 626 and patterning the ITO-sputtered layer.

When light is applied to the light switch element 627, the light switch element 627 reduces its electric resistance, resulting in applying a signal from the linear electrode $X_1$ to the pixel electrode 629.

The orientation layer 630a is formed on those layers. This orientation layer 630a is composed by rubbing a polyimide film formed with a spinner.

A transparent electrode 631 is provided on the other fiber plate substrate 621b made of a fiber plate. This transparent electrode 631 is deposited by sputtering ITO on the fiber plate substrate 621b. Then, a light-shielding layer 622b is formed on the transparent electrode 631 in a manner to match the patterns of the light switch element 627 and light-shielding layer 622a formed on the opposed fiber plate substrate 621a. The light-shielding layer 622b is formed by depositing aluminum (Al) with the electron beam (EB) deposition method.

For forming the light-shielding layer 622b, it is possible to use metal such as molybdenum (Mo), an organic pigment dispersed type resin, or an inorganic pigment dispersed type resin in addition to aluminum (Al).

The orientation layer 630b is formed on those transparent electrode 631 and light-shielding layer 622b. This orientation layer 630b is composed by rubbing a polyimide film formed with a spinner.

A plurality of spacers (not shown) are dispersed between the substrates having some layers formed thereon. Both of the substrates are pasted through the sealing member 632 laid therebetween. Then, liquid crystal is injected into the space defined between both of the substrates and the sealing member 632 for forming a liquid crystal layer 633.

The thickness of the liquid crystal layer 633 is about 5 μm. The display mode of the liquid crystal layer 633 is a twisted nematic (TN) normal white type. For a liquid crystal material, for example, a PCH liquid crystal ZLI-1565 (manufactured by Merck Co., Inc.) is used. This liquid crystal is injected in vacuum for forming the liquid crystal layer 633.

For performing light scanning, the linear luminous sources $Y_1, Y_2, \ldots, Y_n$ are activated sequentially from $Y_1$ to $Y_n$. An electric signal corresponding to the light-scanning is applied to each of the linear electrodes $X_1, X_2, \ldots, X_{m-1}, X_m$. While the linear luminous sources $Y_1, Y_2, \ldots, Y_n$ are made luminous (activated), the light switch elements located on the activated linear luminous sources are operated on. Hence, the linear electrodes $X_1, X_2, \ldots, X_{m-1}, X_m$ serve to apply electric signals to the corresponding pixel electrodes, respectively for the purpose of representing an image on a screen.

As is apparent from the above description, the active matrix driven type LCD according to the present embodiment has the structure where a switch is provided for each pixel like the TFT element. This structure makes it possible to display an image at high contrast. Further, since the scan signal is a ray of light, unlike the TFT element, no unfavorable state appears wherein the scan signal (gate signal) is flown into the pixel electrodes through the element capacitance. Hence, the number of the scan lines is allowed to be increased to 1000 or more.

Further, since the fiber plate substrate is used in the present embodiment, it is just necessary to screen the light leaked around the light switch element without having to screen the light incident from an oblique location.

Figure 28:
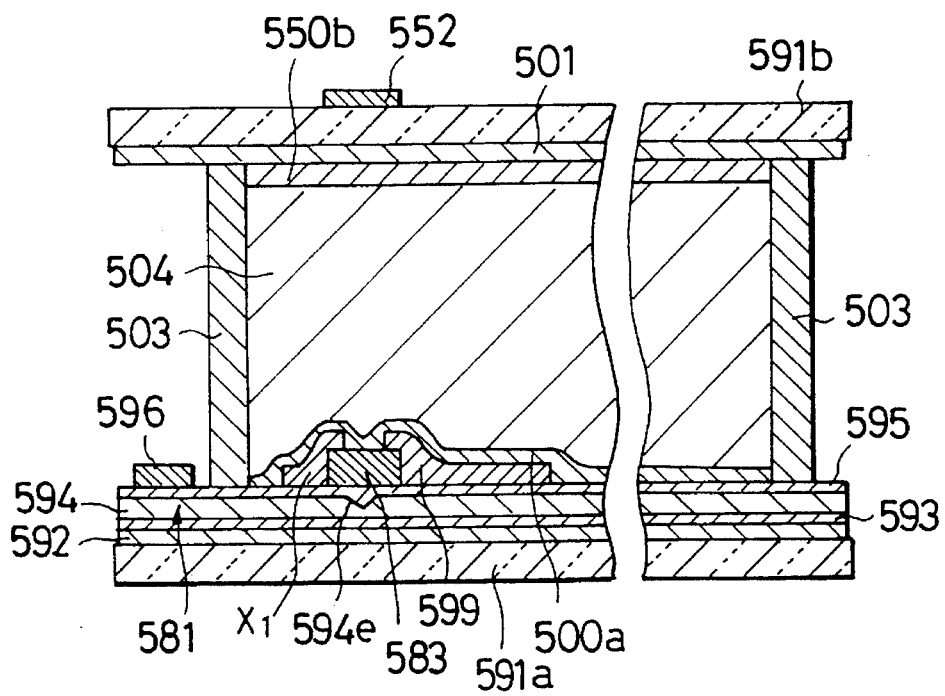
FIG. 28 is a sectional view showing structure of an active matrix driven type LCD according to a twelfth embodiment of the present invention.

FIG. 28 is a sectional view cut on the line K—K of FIG. 24 showing structure of an active matrix driven type LCD according to a twelfth embodiment of the present invention.

The manufacturing process, the structure and the operation of the active matrix driven type LCD according to the present embodiment are basically same as those of the tenth embodiment of FIGS. 24 and 25. The same components in FIG. 28 as those shown in FIGS. 24 and 25 have the same reference numbers.

As shown in FIG. 28, the different respect of the present (twelfth) embodiment from the tenth embodiment shown in FIGS. 24 and 25 is that the light-shielding layer 552 is formed at the outermost portions of the apparatus, that is, the outside of the fiber plate substrate 591*b*.

Like the tenth embodiment, the layers from the electrode 592 to the orientation layer 500*a* are sequentially formed on the fiber plate substrate 591*a*.

Then, the transparent electrode 501 is formed by sputtering ITO on the fiber plate substrate 591*b*.

The orientation layer 550*b* is formed on those layers. This orientation layer 550*b* is composed by rubbing a polyimide film formed with a spinner.

The light-shielding layer 552 is formed by depositing aluminum (Al) on the opposite side of the fiber plate substrate 591*b* to the transparent electrode 501 and the orientation layer 550*b* with the electron beam (EB) deposition method. For forming the light-shielding layer 552, the Al layer is etched in a manner to match the patterns of the light switch element 583 composed of a photoconductive layer formed on the opposed fiber plate substrate 591*a*.

For forming the light-shielding layer 552, it is possible to use metal such as molybdenum (Mo), an organic pigment dispersed type resin, or an inorganic pigment dispersed type resin in addition to aluminum (Al).

A plurality of spacers (not shown) are dispersed between the substrates having some layers formed thereon. Both of the substrates are pasted through the sealing member 503 laid therebetween. Then, liquid crystal is injected into the space defined between both of the substrates and the sealing member 503 for forming a liquid crystal layer 504.

As is apparent from the above description, the active matrix driven type LCD according to the present embodiment has the structure where a switch is provided for each pixel like the TFT element. This structure makes it possible to display an image at high contrast. Further, since the scan signal is a ray of light, unlike the TFT element, no unfavorable state appears wherein the scan signal (gate signal) is flown into the pixel electrodes through the element capacitance. Hence, the number of the scan lines is allowed to be increased to 1000 or more.

Further, singe the fiber plate substrate is used in the present embodiment, it is just necessary to screen the light leaked around the light switch element without having to screen the light incident from an oblique location.

Since the light-shielding layer is formed at the outermost portion of the apparatus, there is no difference in level on the transparent electrode 501 in the cell where the liquid crystal is injected, resulting in further simplifying the manufacturing process.

Figure 29:
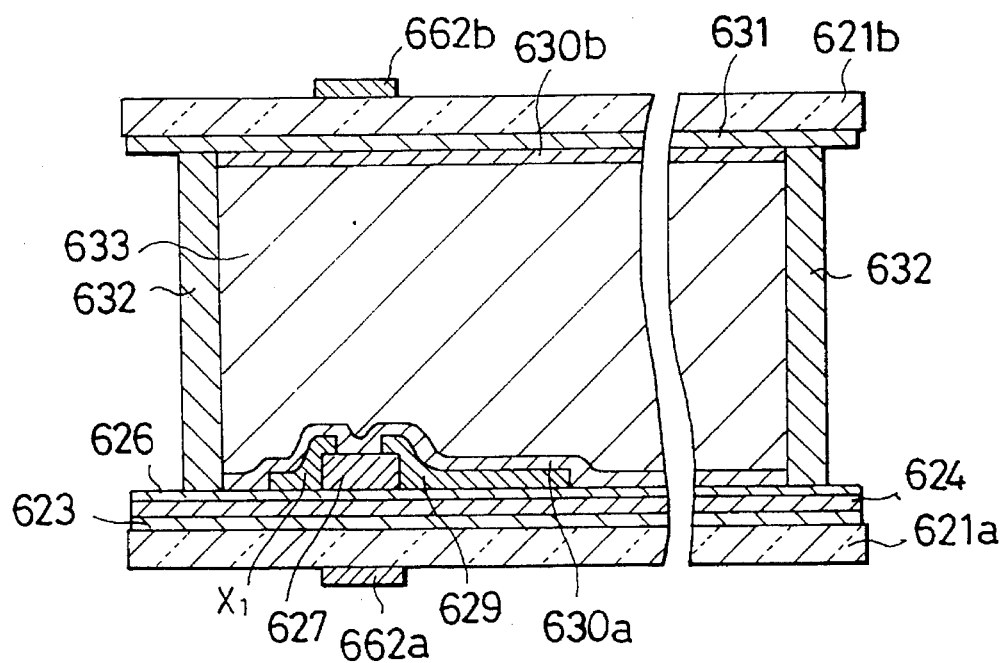
FIG. 29 is a sectional view showing structure of an active matrix driven type LCD according to an thirteenth embodiment of the present invention.

FIG. 29 is a sectional view cut on the L—L line of FIG. 26 showing an active matrix driven type LCD according to a thirteenth embodiment of the present invention.

The manufacturing process, the structure and the operation of the active matrix driven type LCD according to the present embodiment are basically same as those of the eleventh embodiment shown in FIGS. 26 and 27. The same components in FIG. 29 as those shown in FIGS. 26 and 27 have the same reference numbers.

As shown in FIG. 29, the different respect of the present embodiment from the eleventh embodiment shown in FIGS. 26 and 27 is that the light-shielding layers 662*a* and 662*b* are formed at the outermost portion of the apparatus, that is, the outside of the fiber plate substrates 621*a* and 621*b* respectively, in place of the light-shielding layers 622*a* and 622*b* in the eleventh embodiment.

The light-shielding layer 662*a* is formed by depositing aluminum (Al) by means of the electron beam (EB) deposition method on the opposite side of the fiber plate substrate 621*a* to the clad layer 623 formed thereon. The light-shielding layer 662*b* is formed by depositing aluminum (Al) by means of the electron beam (EB) deposition method on the opposite side of the fiber plate substrate 621*b* to the transparent electrode 631 formed thereon. For forming each of those light-shielding layers 662*a* and 662*b*, the Al layer is etched in a manner to match the patterns of the light switch element 627 composed of a photoconductive layer formed on the fiber plate substrate 621*a*.

Like the eleventh embodiment shown in FIGS. 26 and 27, the clad layer 623, the core layer 624, the surface layer 626, all of which correspond to the light waveguide 613 shown in FIG. 26, and the orientation layer 630*a* are formed on the fiber plate substrate 621*a* having the light-shielding layer 662*a* formed on the rear surface thereof.

Then, the transparent electrode 631 is formed by sputtering ITO on the fiber plate substrate 621*b* having the light-shielding layer 662*b* formed on the rear surface thereof.

Next, the orientation layer 630*b* is formed on the transparent electrode 631. This orientation layer 630*b* is composed by rubbing a polyimide film formed with a spinner.

The manufacturing process, the structure and the operation of the thirteenth embodiment are quite identical to those of the eleventh embodiment shown in FIGS. 26 and 27.

As is apparent from the above description, the active matrix driven type LCD according to the present embodiment has the structure where a switch is provided for each pixel like the TFT element. This structure makes it possible to display an image at high contrast. Further, since the scan signal is a ray of light, unlike the TFT element, no unfavorable state appears wherein the scan signal (gate signal) is flown into the pixel electrodes through the element capacitance. Hence, the number of the scan lines is allowed to be increased to 1000 or more.

Further, since the fiber plate substrate is used in the present embodiment, it is just necessary to screen the light leaked around the light switch element without having to screen the light incident from an oblique location.

Since the light-shielding layer is formed at the outermost portion of the apparatus, the difference in level appearing in forming the clad layer to the surface layer is allowed to be reduced, resulting in further simplifying the manufacturing process.

Figure 30:
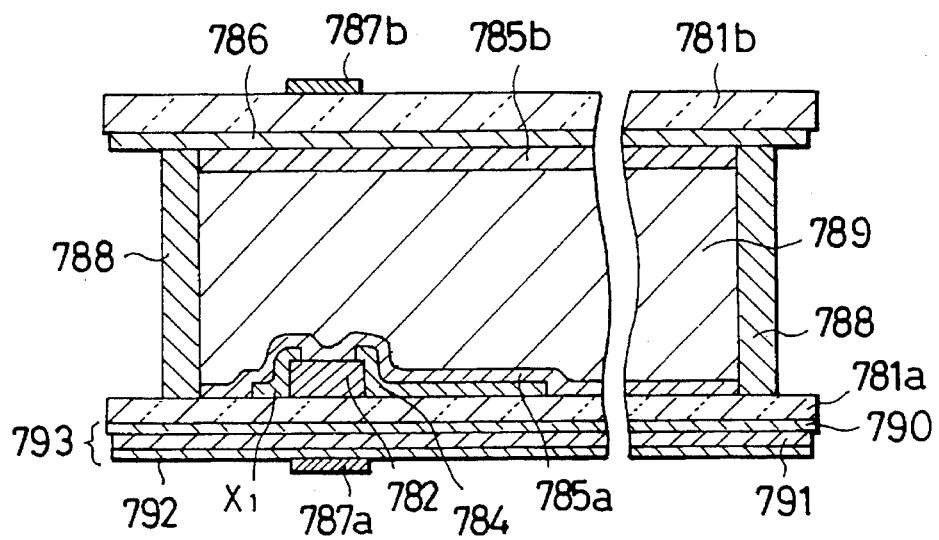
FIG. 30 is a sectional view showing structure of an active matrix driven type LCD according to a fourteenth embodiment of the present invention.

FIG. 30 is a sectional view cut on the L—L line of FIG. 26 showing structure of an active matrix driven type LCD according to a fourteenth embodiment of the present invention.

As shown in FIG. 30, the different respects of the present embodiment from the eleventh embodiment shown in FIGS. 26 and 27 are that in place of the light-shielding layers 622*a* and 622*b* in the eleventh embodiment, light-shielding layers 787*a* and 787*b* are formed at the outermost portion of the apparatus, that is, the outside of fiber plate substrates 781*a* and 781*b* respectively and in place of the light waveguide 613 in the eleventh embodiment, a light waveguide 793 is formed at the outside of a fiber plate substrate 781*a*.

First, the light switch element 782 composed of a photoconductive layer is formed on the fiber plate substrate 781*a*. For forming the light switch element 782, an a-Si:H film is coated on the fiber plate substrate 781*a* with the plasma CVD method and then is etched for patterning the a-Si:H film.

Then, the metal such as aluminum (Al) is formed on the light switch element 782 as a linear electrode $X_1$ with the electron beam (EB) deposition method and is patterned.

An ITO film is further deposited on the fiber plate substrate 781*a* with the sputtering method and is patterned for forming a pixel electrode 784.

An orientation layer 785*a* is formed on those layers. This orientation layer 785*a* is composed by rubbing a polyimide film formed with a spinner.

Then, a transparent electrode 786 is formed on the fiber plate substrate 781*b* opposed to the fiber plate substrate 781*a*. An orientation layer 785*b* is formed on the transparent electrode 786.

The transparent electrode 786 is formed by sputtering ITO on the fiber plate substrate 781*b*. The orientation layer 785*b* is composed by rubbing a polyimide film formed with a spinner.

A plurality of spacers (not shown) are dispersed between the substrates having some layers formed thereon. Both of the substrates are pasted through the sealing member 788. Then, liquid crystal is injected into the space defined between both of the substrates and the sealing member 788 for forming a liquid crystal layer 789.

The thickness of the liquid crystal layer 789 is about 5 μm. The display mode of the liquid crystal layer 789 is a twisted nematic (TN) normal white type. For a liquid crystal material, for example, a PCH (phenycyclohexanone) liquid crystal ZLI-1565 (manufactured by Merck Co., Inc.) is used. This liquid crystal is injected in vacuum for forming the liquid crystal layer 789.

Next, the light-shielding layer 787*b* is formed outside of the fiber plate substrate 781*b*. This light-shielding layer 787*b* is formed by depositing aluminum (Al) with the electron beam (EB) deposition method and etching the aluminum (Al) film for patterning itself.

The patterns of the light-shielding layer 787*b* are formed in a manner to match to the patterns of the light switch element 782, for example.

The light waveguide 793 and the light-shielding layer 787*b* are formed outside of the opposite fiber plate substrate 781*a*.

That is, a PCZ film containing photopolymerization monomer (acrylate, for example, methyl acrylate) is formed on the fiber plate substrate 781*a* with a solution casting method. By selectively polymerizing the PCZ film through a linear photomask, the PCZ layer is formed as a core layer 790 and a mixture of the PCZ and polyacrylate having a smaller index of refraction than the PCZ is formed as a clad layer 791. The clad layer 791 and the core layer 790 are formed as stripes each other. Then, by coating the epoxy resin film for forming a surface layer 792, the light waveguide 793 is formed.

For the light waveguide, alternatively, it is possible to use a glass light waveguide formed by the ion exchange method or the other light waveguide. According to the present embodiment, the fiber plate substrate 781*a* has an index of refraction which is equal to or more than that of the core layer 790 of the light waveguide 793 so that light passing through the light waveguide 793 can enter the light switch element 782.

The light-shielding layer 787*a* is formed on the surface layer 792 of the light waveguide 793 by depositing aluminum (Al) with the electron beam (EB) deposition method and patterning the resulting aluminum (Al) film. For forming the light-shielding layer 787*a*, it is possible to use metal such as molybdenum (Mo), an organic pigment dispersed type resin, or an inorganic pigment dispersed type resin in addition to aluminum (Al).

As mentioned above, the present embodiment provides the light waveguide and the light-shielding layer formed outside of the fiber plate substrate. Hence, the requisites for producing the photoconductive layer and the electrodes (with the deposition or etching method) are allowed to be greatly mitigated.

The present embodiment operates in the same manner as the eleventh embodiment shown in FIGS. 26 and 27.

As is apparent from the above description, the active matrix driven type LCD according to the present embodiment has the structure where a switch is provided for each pixel like the TFT element. This structure makes it possible to display an image at high contrast. Further, since the scan signal is a ray of light, unlike the TFT element, no unfavorable state appears wherein the scan signal (gate signal) is flown into the pixel electrodes through the element capacitance. Hence, the number of the scan lines is allowed to be increased to 1000 or more.

Further, since the fiber plate substrate is used in the present embodiment, it is just necessary to screen the light leaked around the light switch element without having to screen the light incident from an oblique location.

Figure 31:
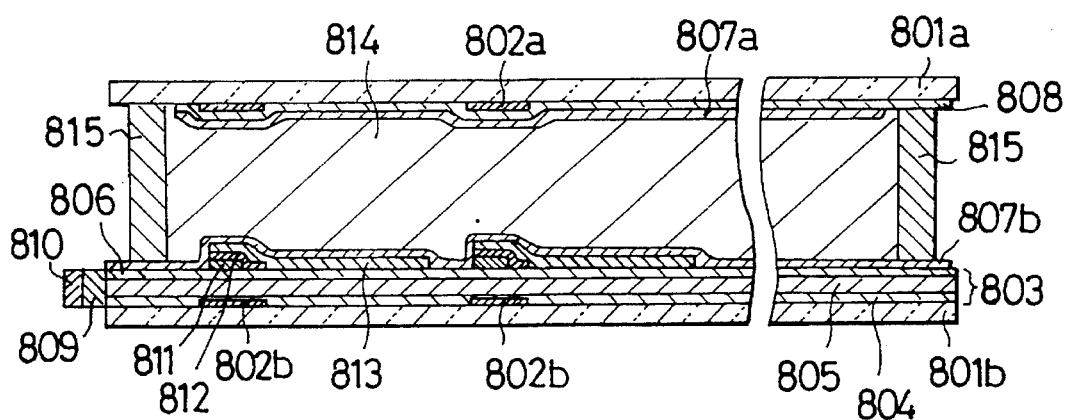
FIG. 31 is a sectional view showing structure of an active matrix driven type LCD according to a fifteenth embodiment of the present invention

FIG. 31 is a sectional view showing an active matrix driven type LCD according to a fifteenth embodiment of the present invention.

As shown in FIG. 31, each of the linear luminous sources is composed of an LED array 810 and a light waveguide 803.

A light-shielding layer 802*b* is formed on a glass substrate 801*b* for avoiding the adverse effect of outer light entered from the glass substrate 801*b* on a light switch element 812 composed of a photoconductive layer. A light-shielding layer 802*a* is formed on a glass substrate 801*a* for avoiding the adverse effect of outer light entered from the glass substrate 801*a* on the light switch element 812.

The manufacturing method of the apparatus will be described below.

Metal such as aluminum (Al) is deposited on the glass substrate 801*b* with the electron beam (EB) depositing method. The metal film is patterned for forming the light-shielding layer 802*b*. Then, for forming a clad layer 804, epoxy resin is coated on the fiber plate substrate 801*b* and the light-shielding layer 802*b*. A PCZ film containing photopolymerization monomer (acrylate) is formed on the clad layer 804 film with a solution casting method. By selectively polymerizing the PCZ film through a linear photomask, the PCZ layer is formed as a core layer 805 and a polymerized portion of the PCZ and polyacrylate is formed as the clad layer. By coating an epoxy resin film for forming a surface layer 806, the light waveguide 803 is formed.

Next, a linear electrode 811 is formed by depositing ITO with the sputtering method and patterning the ITO film. A pixel electrode 813 is formed on the light switch element 812 and the surface layer 806 by depositing ITO. Then, a polyimide film is coated on the pixel electrode 813 and is subject to the rubbing treatment for forming an orientation layer 807*b*.

That is, adjacent to the crossed portion of the linear electrode 811 and the linear luminous source composed of the light waveguide 803, there is provided the light switch element 812 composed of a photoconductive layer. The linear electrode 811 and the pixel electrode 813 for driving a display medium such as liquid crystal are formed on the surface layer 806. The light switch element 812 is provided between the linear electrode 811 and the pixel electrode 813.

When light is applied to the light switch element 812, the light switch element 812 reduces its electric resistance, resulting in being able to apply a signal from the linear electrode 811 into tile pixel electrode 813.

Next, the light-shielding layer 802a is formed on the glass substrate 801a by depositing metal such as aluminum (Al) and patterning the metal layer. A transparent electrode 808 is formed on the glass substrate 801a and the light-shielding layer 802a by depositing ITO with the sputtering method. Then, a polyimide film is spin-coated on the transparent electrode 808. The polyimide film is subject to the rubbing treatment for forming an orientation layer 807a.

A plurality of spacers (not shown) are dispersed between the substrates having some layers formed thereon. Both of the substrates are pasted through the sealing member 815. Then, liquid crystal is injected into the space defined between both of the substrates and the sealing member 815 for forming a liquid crystal layer 814.

The liquid crystal layer 814 uses fluorine liquid crystal. The display mode of the liquid crystal 814 is a twisted nematic (TN) mode. The resulting substrate and the LED array 810 are connected through a SELFOK lens array 809.

Then, the description will be directed to a transformation of the fifteenth embodiment wherein a light waveguide is made of glass.

A multi-mode thallium (Tl) ion exchange waveguide is formed as a glass waveguide. An electrode and an a-Si:H layer are formed on the glass waveguide.

The opposite side to the side having the electrode and the a-Si:H layer formed thereon is abraded for reducing the thickness of glass. Then, the resulting glass waveguide is pasted on the glass substrate 801a opposed to the glass substrate 801b having the light-shielding layer 802b of FIG. 31 formed thereon. The subsequent process is the same as the process of the fifteenth embodiment.

According to the transformed embodiment, it is possible to completely avoid the adverse effect of back light and outer light on the light switch element.

The operation of this embodiment is the same as that of the seventh embodiment shown in FIGS. 19 and 20.

As is apparent from the above description, the active matrix driven type LCD according to the present embodiment has the structure where a switch is provided for each pixel like the TFT element. This structure makes it possible to display an image at high contrast. Further, since the scan signal is a ray of light, unlike the TFT element, no unfavorable state appears wherein the scan signal (gate signal) is flown into the pixel electrodes through the element capacitance. Hence, the number of the scan lines is allowed to be increased to 1000 or more.

Figure 32:
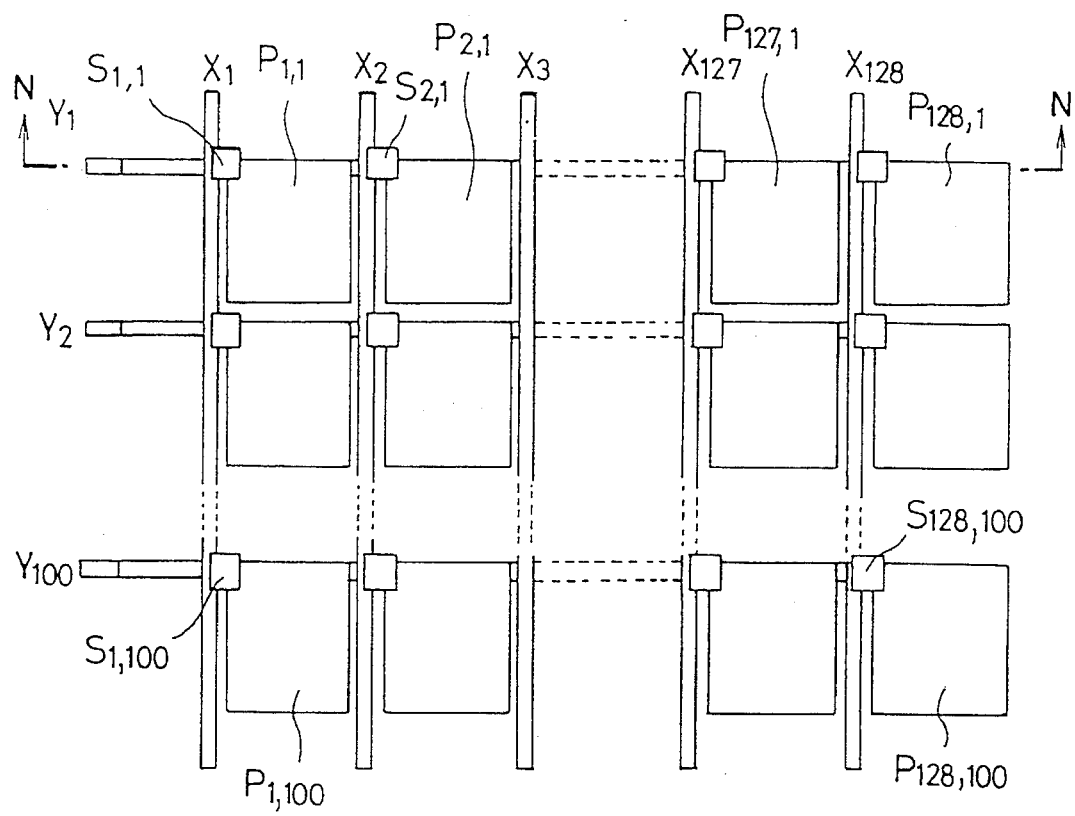
FIG. 32 is a plan view showing structure of a light scanning substrate used in an active matrix driven type LCD according to a sixteenth embodiment of the present invention.

FIG. 32 is a plan view showing a light scanning substrate used in an active matrix driven type LCD according to a sixteenth embodiment of the present invention. According to the present embodiment, tile arrangement of pixels formed on a display panel is 100 (column)×128 (row) and the display mode of liquid crystal is a twisted nematic (TN) mode.

As shown in FIG. 32, pixel electrodes $P_{1,1}$ to $P_{128,100}$ are arranged on the substrate in a matrix, where 100 electrodes are arranged on one column and 128 electrodes are arranged on one row. For each of the pixel electrodes $P_{1,1}$ to $P_{128,100}$, photoconductive elements $S_{1,1}$ to $S_{128,100}$ are provided, respectively. For each column of the matrix composed of the pixel electrodes $P_{1,1}$ to $P_{128,100}$, that is, for each group of the pixel electrodes $P_{1,1}$ to $P_{1,100}$, $P_{2,1}$ to $P_{2,100}$, ..., $P_{128,1}$ to $P_{128,100}$, signal lines $X_1, X_2, \ldots, X_{128}$ extending in the column direction are formed on the same substrate. The signal lines $X_1, X_2, \ldots, X_{128}$ are respectively connected to each corresponding column group of $P_{1,1}$ to $P_{1,100}$, $P_{2,1}$ to $P_{2,100}$, ..., $P_{128,1}$ to $P_{128,100}$ through each group of the photoconductive elements $S_{1,1}$ to $S_{1,100}$, $S_{2,1}$ to $S_{2,100}$, ..., $S_{128,1}$ to $S_{128,100}$.

The photoconductive elements $S_{1,1}$ to $S_{128,100}$ normally hold high impedance. Only if light is applied to the photoconductive element, it serves to lower the impedance, resulting in being able to selectively electrically connect the corresponding one of the signal lines $X_1$ to $X_{128}$ to the corresponding one of the pixel electrodes $P_{1,1}$ to $P_{128,100}$.

For each row of the pixel electrodes $P_{1,1}$ to $P_{128,100}$, that is, for each row $S_{1,1}$ to $S_{128,1}$, $S_{1,2}$ to $S_{128,2}$, ..., $S_{1,100}$ to $S_{128,100}$, each of linear luminous sources $Y_1$ to $Y_{100}$ extending in the row direction are formed on the same substrate. Those linear luminous sources $Y_1$ to $Y_{100}$ are provided on the lower side of the photoconductive elements $S_{1,1}$ to $S_{128,100}$ and the pixel electrodes $P_{1,1}$ to $P_{128,100}$ so as to selectively apply light to the photoconductive elements $S_{1,1}$ to $S_{128,100}$.

Figure 33:
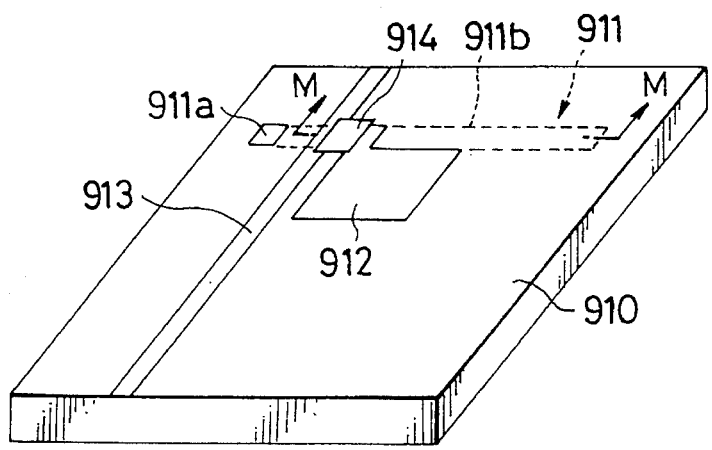
FIG. 33 is a perspective view showing the substrate of the sixteenth embodiment for describing a connection between the pixel electrode and the signal line.
Figure 34:
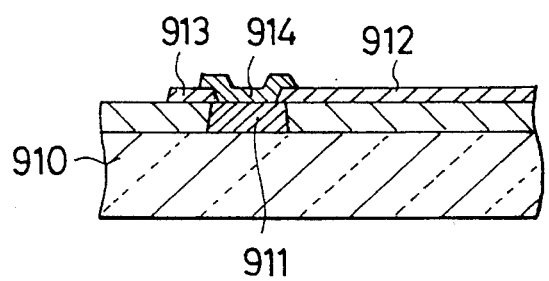
FIG. 34 is a sectional view cut on the M—M line of FIG. 33.

FIG. 33 is a perspective view showing the substrate of the sixteenth embodiment for describing a connection between the pixel electrode and the signal line. FIG. 34 is a sectional view cut on the M—M line of FIG. 33.

As shown in FIGS. 33 and 34, a linear luminous source 911 extending in the row direction is formed on a glass substrate 910. A photoconductive element 914 is bridged over the linear luminous source 911. The photoconductive element 914 serves to electrically turn on and off the connection between a pixel electrode 912 and a signal line 913 extending in the column direction.

According to the present embodiment, for making the photoconductive elements 914 and $S_{1,1}$ to $S_{128,100}$, amorphous silicon (a-Si) is used. For making the linear luminous sources 911 and $Y_1$ to $Y_{100}$, any device may be used only if it serves to emit a linear ray of light. Herein, the linear luminous source 911 is the combination of a luminous source 911a made of an electroluminescent (EL) element or a polymer waveguide and a light waveguide 911b connected at one end to the luminous source 911a. When the luminous source 911a is activated, that is, when the luminous source 911a is made luminous, the light from the luminous source 911a is applied to the light waveguide 911b, resulting in making the overall light waveguide 911b linearly luminous.

Figure 35:
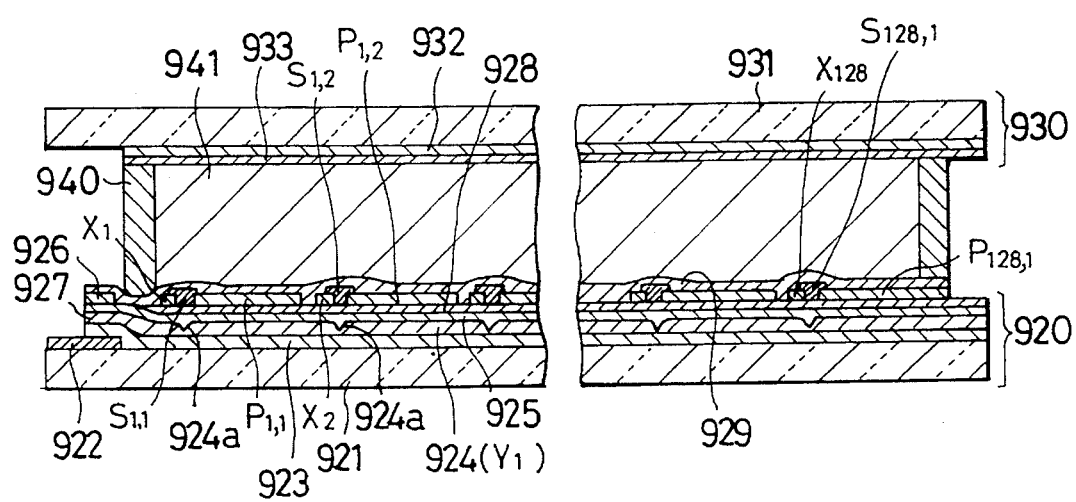
FIG. 35 is a sectional view cut on the N—N line of FIG. 32 showing a liquid crystal display panel having a light-scan substrate incorporated therein.

FIG. 35 is a sectional view cut on the N—N line of FIG. 32 showing a liquid crystal display panel having a light-scan substrate incorporated therein.

At first, the light-scan substrate 920 will be described. An aluminum (Al) layer is formed on the glass substrate 921 with the electron beam (EB) deposition method. The etching treatment is carried out on the Al layer for forming a lower electrode 922 of the luminous source made of an electroluminescent (EL) element. By sputtering $Al_2O_3$ (aluminum oxide) and $Si_3N_4$ (silicon nitride), an insulating film 923 is formed on the glass substrate 921 and the lower electrode 922. The thickness of the insulating film 923 is about 2000 Å. The light waveguide 924 (corresponding to the linear luminous source $Y_1$ of FIG. 32) is formed on the insulating film 923 with the electron beam (EB) deposition method. The light waveguide 924 is made of ZnS (zinc sulfide) containing 0.5% of Mn (manganese). The thickness of the light waveguide 924 is about 8000 Å. The etching treatment is selectively carried out on the light waveguide 924 for forming cutaways 924a at the spots of the light waveguide 924 corresponding to the photoconductive elements $S_{1,1}$ to $S_{128,1}$. By sputtering $Si_3N_4$ and $SiO_2$ (silicon oxide), another insulating film 925 is formed on the light waveguide 924 where the cutaways 924a are selectively formed. The thickness of the insulating film 925 is about 2000 Å. By sputtering ITO (Indium Tin Oxide) on the insulating film 925 and etching the ITO film, an upper electrode 926 is formed. The thickness of the ITO film is about 1500 Å. The light waveguide 924 is laid between the upper electrode 926 and the lower electrode 922. The end of the light waveguide 924 composes the luminous source 927 made of an electroluminescent (EL) element or a polymer waveguide.

After forming a polyimide layer 928 for leveling the display surface, the signal lines $X_1$ to $X_{128}$ and the pixel electrodes $P_{1,1}$ to $P_{128,1}$ are formed by sputtering ITO on the polyimide layer 928.

For forming the photoconductive elements $S_{1,1}$ to $S_{128,1}$, an a-Si film is formed to have the thickness of about 1000 Å with the plasma CVD (Chemical Vapor Deposition) method. Then, the a-Si film is etched. This results in completing the formation of the photoconductive elements $S_{1,1}$ to $S_{128,1}$ above the cutaways 924a of the light waveguides 924 ($Y_1$).

A substrate 930 opposed to the light-scan substrate 920 is formed by depositing an ITO electrode 932 on the glass substrate 931 with the sputtering method. The thickness of the ITO electrode 932 is about 1500 Å.

Polyimide films 929 and 933 are coated on the surfaces of the light-scan substrate 920 and the opposed substrate 930, respectively. Those polyimide films 929 and 933 serve for horizontally orientating the liquid crystal and have the thickness of about 500 Å, respectively. Then, the rubbing treatment is carried out on the polyimide films 929 and 933. The light-scan substrate 920 and the opposed substrate 930 are pasted by a sealing member 940 with spacers having 5 µm thickness. Then, liquid crystal 941 of PCH (phenylcyclohexanone) system (ZLI-1565, manufactured by Merck Co., Inc.) as a display medium is injected and sealed in vacuum between the substrates 920 and 930, resulting in forming the liquid crystal display panel.

Then, the description will be directed to the operation of the LCD panel according to the present (sixteenth) embodiment.

By applying a voltage between the lower electrode 922 and the upper electrode 926 shown in FIG. 35, the luminous source 927 made of an electroluminescent (EL) element serves to emit light through the light waveguide 924 and apply the light to the photoconductive elements $S_{1,1}$ to $S_{128,1}$ formed on the light waveguide 924. When the light is applied, the photoconductive elements $S_{1,1}$ to $S_{128,1}$ serve to lower its impedance, thereby become conductive, resulting in electrically connecting the pixel electrodes $P_{1,1}$ to $P_{128,1}$ corresponding to the signal lines $X_1$ to $X_{128}$, respectively. Hence, the signals corresponding to a display pattern are transferred from the signal lines $X_1$ to $X_{128}$ to the pixel electrodes $S_{1,1}$ to $S_{128,1}$ on the selected row.

By sequentially activating the linear luminous sources $Y_1$ to $Y_{100}$ on each row and electrical connecting the pixel electrodes $P_{1,1}$ to $P_{128,1}$, $P_{1,2}$ to $P_{128,2}$, ..., $P_{1,100}$ to $P_{128,100}$ on each row to the signal lines $X_1$ to $X_{128}$, the signals corresponding to the display pattern selectively input to the signal lines $X_1$ to $X_{128}$ are transferred to the pixel electrodes on each row in sequence.

When the selection period where the light is applied to the photoconductive elements is changed into a non-selection period (no light emitting period), the photoconductive element enters into a high-impedance state. The charges injected to the pixel electrode are held in the capacitance element of the liquid crystal element until the photoconductive elements are selected. The operation principle is the same as the TFT-LCD known by the present inventors.

The display apparatus according to the present embodiment, however, is structured to scan the pixel electrodes with a ray of light. Unlike the known TFT-LCD, however, no unfavorable conditions appear wherein the gate signal is leaked to the pixel electrode through the effect of the parasitic capacitance between a gate electrode and a drain electrode connected to the pixel electrode. This results in completely eliminating the appearance of a lower contrast, an after image, a shorter life resulting from distortion of a symmetric voltage waveform with a positive and a negative polarities by the appearance of d.c. (direct current) components on the pixel electrodes. Further, the known TFT-LCD is arranged to add one-scan parasitic capacitance to one gate electrode. Hence, a large-size and large-capacitance LCD serves to attenuate the gate signal through the effect of the parasitic capacitance and the wire resistance, resulting in lowering contrast and making the display uneven. The display apparatus according to the present embodiment, however, has no problem about the parasitic capacitance and the wire resistance, because the apparatus serves to perform the light scanning.

In fact, as a result of testing the LCD panel of this embodiment, the test proved that the LCD panel provides uniform contrast on the display, and leaves no after image and brings about no degradation of the contrast when patterns of static image are displayed for a long time.

Next, a seventeenth embodiment of the present invention will be described.

Figure 36:
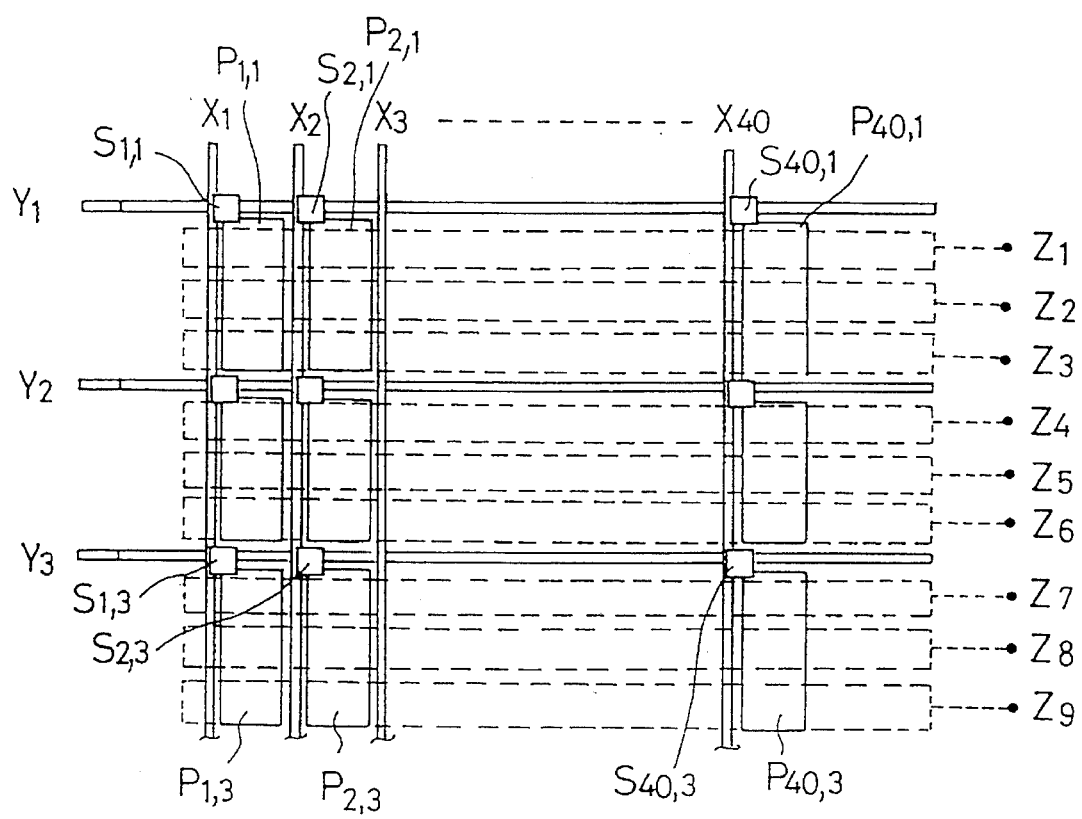
FIG. 36 is a plan view showing a display apparatus according to a seventeenth embodiment of the present invention.

FIG. 36 is a plan view showing a display panel of a pixel-divisional simple matrix type LCD according to the seventeenth embodiment of the present invention.

The forming process, the conditions and the materials of the present embodiment are the same as those of the sixteenth embodiment shown in FIG. 32, except that the ITO layer formed on the opposed substrate is etched to be striped electrodes. The number of pixels of the display panel is 30 (column)×40 (row). The display mode of the liquid crystal is a twisted nematic (TN) mode.

According to the present embodiment, pixel electrodes $P_{1,1}$ to $P_{40,3}$, ... are arranged in a matrix where 30 pixel electrodes are ranged on one column and 40 pixel electrodes are ranged on one row. For each of the pixel electrodes $P_{1,1}$ to $P_{40,3}$, ..., photoconductive elements $S_{1,1}$ to $S_{40,3}$, ... are provided, respectively. For each row of the pixel electrodes $P_{1,1}$ to $P_{40,3}$, ..., that is, each group of $P_{1,1}$ to $P_{1,3}$, ..., $P_{2,1}$ to $P_{2,3}$, ..., $P_{40,1}$ to $P_{40,3}$, ..., each of the signal lines $X_1$, $X_2$, ..., $X_{40}$ extending in the column direction is formed on the same substrate. The signal lines $X_1$, $X_2$, ..., $X_{40}$ are connected to the pixel electrodes $P_{1,1}$ to $P_{1,3}$, ..., $P_{2,1}$ to $P_{2,3}$, ..., $P_{40,1}$ to $P_{40,3}$, ... of the corresponding column through the corresponding photoconductive elements $S_{1,1}$ to $S_{1,3}$, ..., $S_{2,1}$ to $S_{2,3}$, ... $S_{40,1}$ to $S_{40,3}$, ..., respectively.

The photoconductive elements $S_{1,1}$ to $S_{40,3}$, ... normally hold high impedance. Only if light is applied to the photoconductive element, it serves to lower the impedance, resulting in being able to selectively electrically connect the signal lines $X_1$ to $X_{40}$ to the corresponding pixel electrodes $P_{1,1}$ to $P_{40,3}$, ...

For each row of the pixel electrodes $P_{1,1}$ to $P_{40,3}$, ..., that is, for each row $S_{1,1}$ to $S_{40,1}$, $S_{1,2}$ to $S_{40,2}$, $S_{1,3}$ to $S_{40,3}$, ..., each of linear luminous sources $Y_1$ to $Y_3$, ... extending in the row direction are formed on the same substrate. Those linear luminous sources $Y_1$ to $Y_3$, .... are provided on the lower side of the photoconductive elements $S_{1,1}$ to $S_{40,3}$, . . . and the pixel electrodes $P_{1,1}$ to $P_{40,3}$, . . . so as to selectively apply light to the photoconductive elements $S_{1,1}$ to $S_{40,3}$, . . .

On the substrate opposed to the light-scan substrate, striped electrodes $Z_1$ to $Z_9$, . . . extending in the row direction are provided. A group of three striped electrodes are located between the adjacent linear luminous sources, that is, the three striped electrodes extend across each of the pixel electrodes.

The operation of the LCD panel according to the present embodiment will be described.

Like the sixteenth embodiment shown in FIGS. 32 to 35, by sequentially activating the linear luminous sources $Y_1$ to $Y_3$, . . . , each row group of the pixel electrodes $P_{1,1}$ to $P_{40,1}$, $P_{1,2}$ to $P_{40,2}$, . . . , $P_{1,30}$ to $P_{40,30}$ is electrically connected to the corresponding signal $X_1$ to $X_{40}$. At this time, the signals corresponding to the display pattern entered into the signal lines $X_1$ to $X_{40}$ are applied at the same time to the pixel electrodes on each row. Before activating a next linear luminous source after the current luminous source, the voltages of the signals input to the signal lines $X_1$ to $X_{40}$ are temporarily reduced to zero for reducing all the voltages applied on the pixel electrodes to zero. Then the next linear luminous source is activated.

Figure 37:
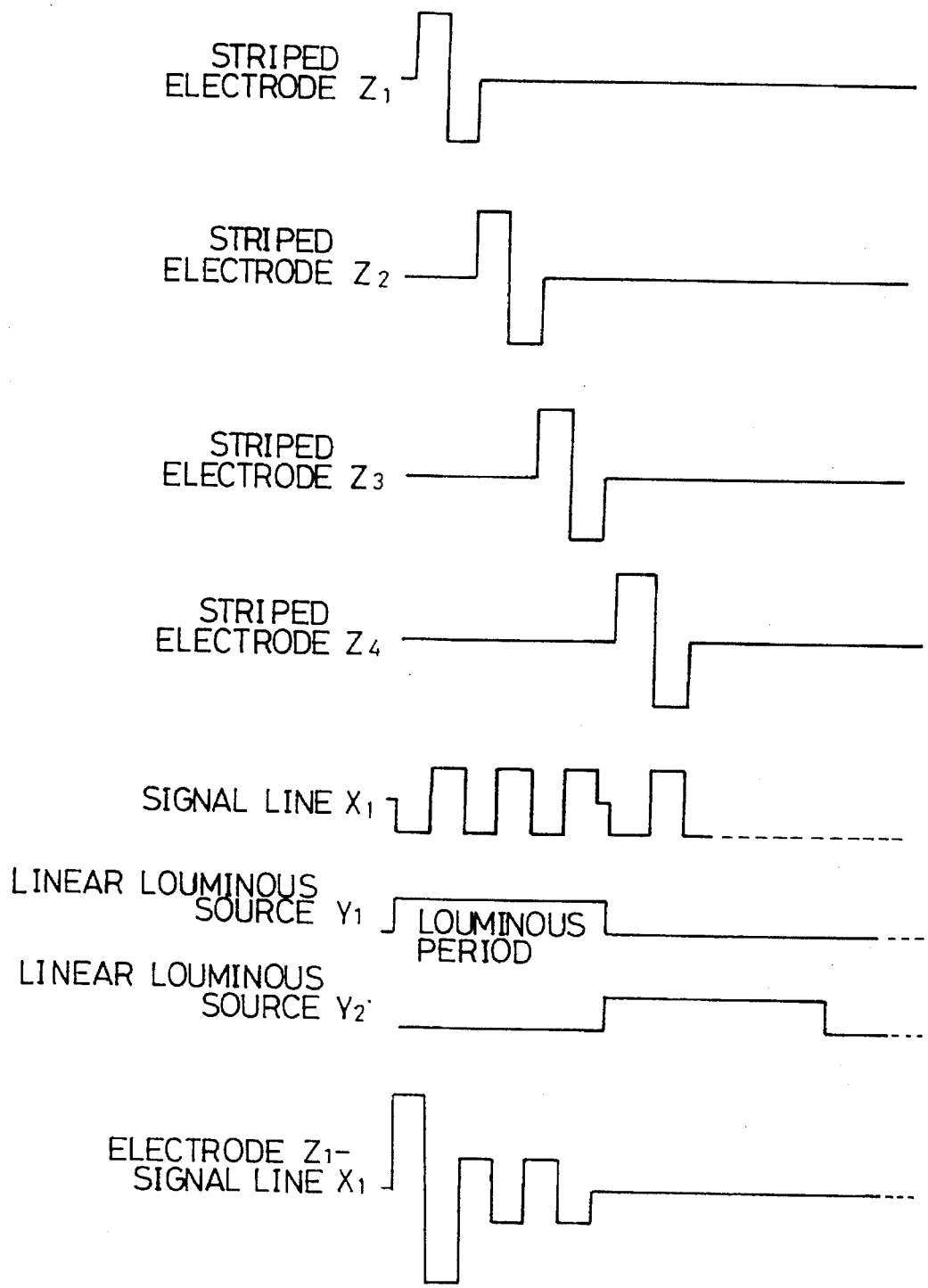
FIG. 37 is a waveform view showing signals used for driving the display apparatus of FIG. 36.

According to the present embodiment, by sequentially driving the striped electrodes $Z_1$ to $Z_9$, . . . . as shown in FIG. 37, the pixel electrodes $P_{1,1}$ to $P_{40,3}$, . . . electrically connected to the signal lines $X_1$ to $X_{40}$ are driven with the opposed striped electrodes $Z_1$ to $Z_9$, . . . being divided into groups each having three electrodes. The driving of the pixel electrodes and the striped electrodes are carried out in a simple multiplexing manner. That is, herein, assuming that the display area composed of three scan lines (striped electrodes) is one block, the linear luminous sources $Y_1$ to $Y_3$, . . . are used for selecting the corresponding block. This results in being able to triple the number of the scan lines as keeping a duty factor and the number of drivers constant. In general, assuming that the number of the linear luminous sources is N and the number of the striped electrodes (the number of actual scanned electrodes) per one linear luminous source is M, the N×M scan lines are allowed to be driven with a duty factor of 1/M.

The display apparatus of the present embodiment is capable of realizing a higher-contrast and larger-capacitance display as keeping a minimum number of drivers (equal to the number of the signal lines) as compared to the simple matrix driven type LCD known by the inventors. Further, the response speed of the display is remarkably improved, because the number M of the striped electrodes (duties) is arranged to be smaller than the known LCD.

As a result of testing the display apparatus of this embodiment, the test proved that the display apparatus is capable of providing quite excellent display characteristics when it is operated at the voltage having the driving waveform shown in FIG. 37.

Herein, the display mode is a twisted nematic (TN) mode. However, it goes without saying that the display apparatus is more advantageous if the used display mode is an super twisted nematic (STN) mode or a double super twisted nematic (DSTN) mode having a sharp threshold value characteristic.

Figure 38:
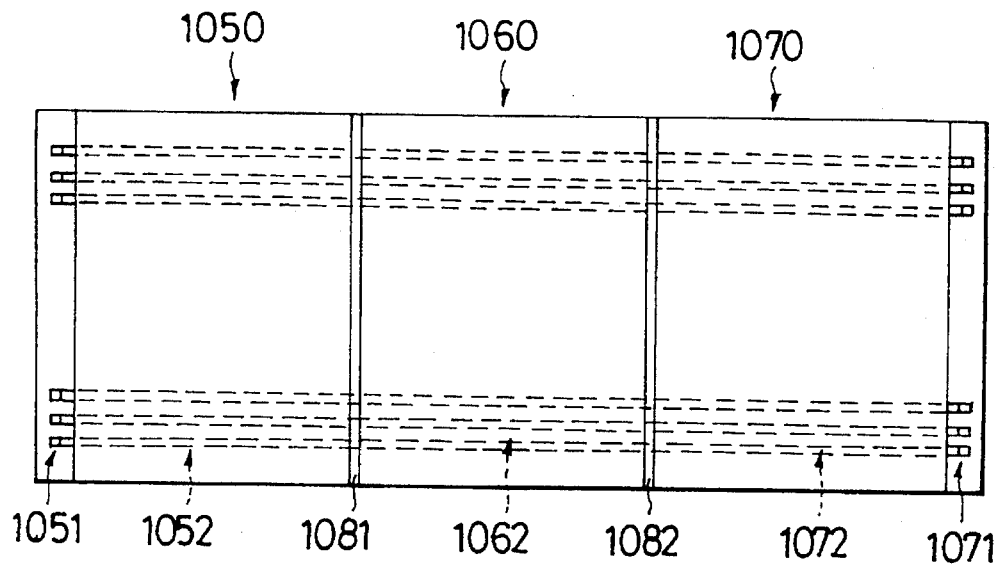
FIG. 38 is a plan view showing a display apparatus according to an eighteenth embodiment of the present invention.

FIG. 38 is a plan view showing an LCD apparatus composed of several display panels of the sixteenth embodiment (see FIGS. 32 to 35) for realizing a larger screen. This large LCD apparatus is an eighteenth embodiment of the present invention.

The display apparatus of this embodiment includes three display panels 1050, 1060, 1070 like the display panel of the sixteenth embodiment shown in FIG. 32. The display panel 1050 provides a luminous source 1051 composed of an electroluminescent (EL) element or a polymer waveguide at the left end. The display panel 1060 has only a light waveguide 1062 without having any luminous source. The display panel 1070 provides a luminous source 1071 composed of an electroluminescent (EL) element or a polymer waveguide at the right end. The display panels 1050 are 1060 are pasted through fiber plate 1081 (manufactured by Asahi Glass Co., Ltd.). The display panels 1060 and 1070 are pasted through fiber plates 1082 (manufactured by Asahi Glass Co., Ltd.). This results in optically connecting the light waveguides 1052, 1062, 1072 of the display panels 1050, 1060, 1070 to one another. The present inventors have made sure that the arrangement makes it possible to implement a large-scale screen of 9 cm×36 cm.

This display apparatus does not require high-density electrical connection between the apparatuses unlike the known electrical scan type display apparatus, resulting in being able to enlarge the screen very easily.

In place of the fiber plates used for connecting the display panels, it is possible to use an optical component such as a SELFOK lens array or a microlens array, or a matching agent for an index of refraction such as silicon (Si) oil may be used.

The formation of polymer dispersed type liquid crystal where liquid crystal is dispersed in a polymer network without any sealing in the liquid crystal panel makes it more advantageous to connect the panels more quietly and enhance the quality. The polymer dispersed type liquid crystals include microcapsulated liquid crystal, solid polymerized compound made by hardening a uniform solution composed of liquid crystal and polymerized compound with ultraviolet rays or heat, uniform solution composed of liquid crystal, polymer and common solvent from which the common solvent is evaporated for removal, cooled uniform solution composed of fused liquid crystal and thermalplastic resin, and liquid crystal being dipped in micron glass particles or a cellulosic film for sponge. For example, such a type of liquid crystal is produced by uniformly mixing a photopolymerization starting agent in a mixed liquid containing 2-ethyl-hexyl-acrylate (monomer), urethane acrylate oligomer and ZLI-1840 (manufactured by Merck Co., Inc.) at a ratio of 16:24:60 in sequence, sealing the mixed solution in the panel, and applying ultraviolet rays to the sealed solution.

Figure 39:
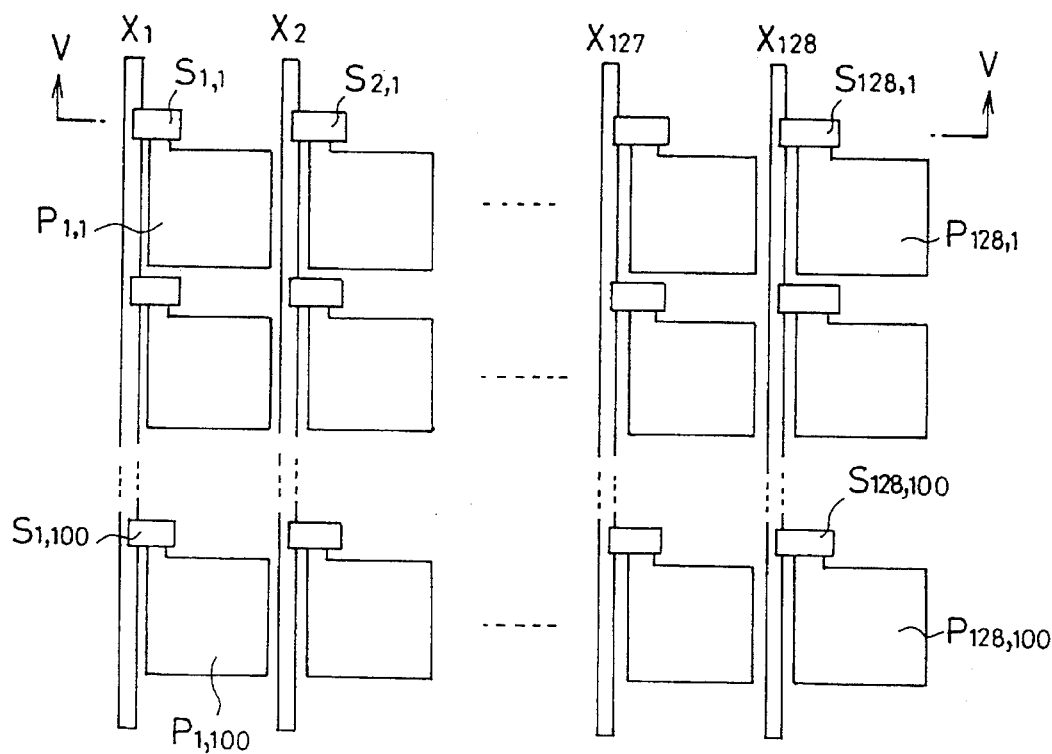
FIG. 39 is a plan view showing a signal-electrode substrate of an active matrix driven type LCD panel according to a nineteenth embodiment of the present invention.
Figure 40:
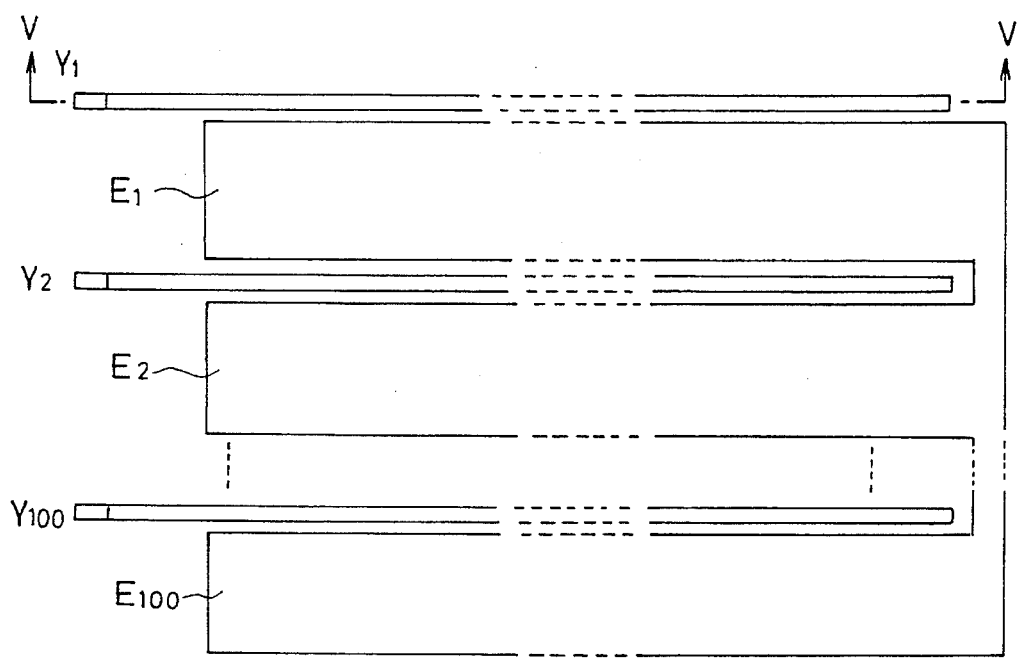
FIG. 40 is a plan view showing a light-scan substrate opposed to the signal electrode substrate shown in FIG. 39.

FIG. 39 is a plan view showing a signal electrode substrate of an active matrix driven type LCD panel according to a nineteenth embodiment of the present invention. FIG. 40 is a plan view showing a light-scan substrate opposed to the signal electrode substrate shown in FIG. 39.

The structure of the signal electrode substrate shown in FIG. 39 is the same as the structure of the light-scan substrate shown in FIG. 32, except that no linear luminous source is provided. As shown in FIG. 39, pixel electrodes $P_{1,1}$ to $P_{128,100}$ are arranged on the substrate in a matrix, where 100 electrodes are ranged on one column and 128 electrodes are ranged on one row. For each of the pixel electrodes $P_{1,1}$ to $P_{128,100}$, photoconductive elements $S_{1,1}$ to $S_{128,100}$ are provided, respectively. For each column of the pixel electrodes $P_{1,1}$ to $P_{128,100}$, that is, $P_{1,1}$ to $P_{1,100}$, $P_{2,1}$ to $P_{2,100}$, . . . , $P_{128,1}$ to $P_{128,100}$, the signal lines $X_1$, $X_2$, . . . , $X_{128}$ extending in the column direction are formed on the same substrate. The signal lines $X_1$, $X_2$, . . . , $X_{128}$ are connected to the corresponding columns of the pixel electrode $P_{1,1}$ to $P_{1,100}$, $P_{2,1}$ to $P_{2,100}$, ..., $P_{128,1}$ to $P_{128,100}$ through the photoconductive elements $S_{1,1}$ to $S_{1,100}$, $S_{2,1}$ to $S_{2,100}$, ..., $S_{128,1}$ to $S_{128,100}$, respectively.

As shown in FIG. 40, as opposed to each row of the pixel electrodes $P_{1,1}$ to $P_{128,1}$, $P_{1,2}$ to $P_{128,2}$, ..., $P_{1,100}$ to $P_{128,100}$ formed on the signal electrode substrate, electrodes $E_1$, $E_2$, ..., $E_{100}$ are provided on the light-scan substrate in the row direction, respectively. Those electrodes $E_1$, $E_2$, ..., $E_{100}$ are connected to one another at their ends. Linear luminous sources $Y_2$, ..., $Y_{100}$ extending in the row direction are provided between the adjacent electrodes of $E_1$ to $E_{100}$ and linear luminous source $Y_1$ is provided adjacent to the electrode $E_1$ and along the row direction.

That is, this embodiment is arranged so that the linear luminous sources of the sixteenth embodiment shown in FIG. 32 are formed on the substrate opposed to the substrate having the photoconductive elements formed thereon.

Figure 41:
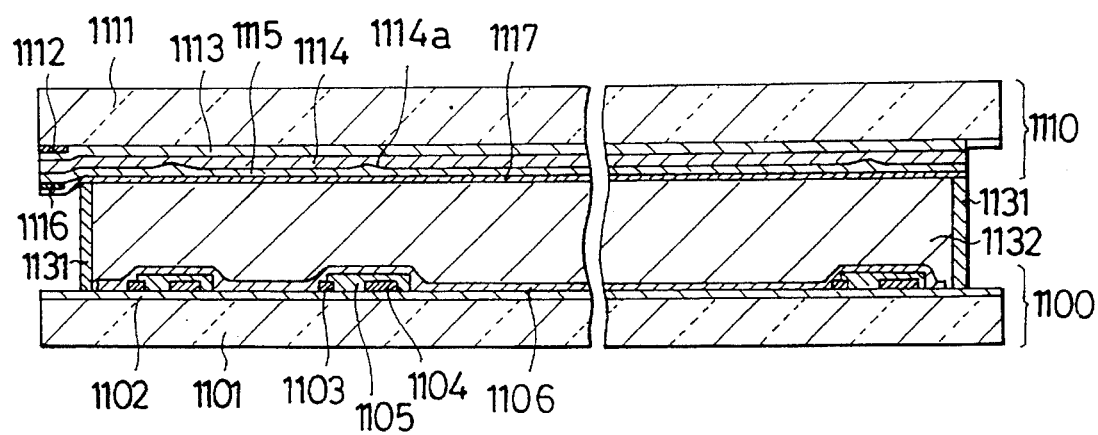
FIG. 41 is a sectional view cut on the V—V line of FIG. 40 showing an LCD panel having the signal electrode substrate shown in FIG. 39 and the light-scan substrate shown in FIG. 40 incorporated therein.

FIG. 41 is a sectional view cut on the V—V line of FIG. 40 showing an LCD panel having the signal electrode substrate shown in FIG. 39 and the light-scan substrate shown in FIG. 40 incorporated therein.

At first, the signal electrode substrate 1100 will be described later.

As shown in FIG. 41, a passivation film 1102 is formed on the glass substrate 1101 with the CVD method. The passivation film 1102 is made of tantalum oxide ($Ta_2O_3$). Then, an ITO film is formed on the passivation film 1102 with the sputtering method. The ITO film is etched for forming signal electrodes 1103 and pixel electrodes 1104. The thickness of the electrodes is about 2000 Å. The signal electrodes 1103 and the pixel electrodes 1104 respectively correspond to the signal lines $X_1$, $X_2$, ..., $X_{128}$ shown in FIG. 39 and the pixel electrodes $P_{1,1}$, $P_{2,1}$, ..., $P_{128,1}$. An a-Si layer is formed on the electrodes 1103 and 1104 with the CVD method and is etched for forming photoconductive layers 1105. The photoconductive layer 1105 is formed to bridge-connect the signal electrode 1103 to the pixel electrode 1104. The photoconductive layers 1105 correspond to the photoconductive elements $S_{1,1}$ to $S_{128,1}$ shown in FIG. 39.

The linear luminous source formed on the light-scan substrate 1110 opposed to the signal electrode substrate 1100 is formed in the same process as that of the light-scan substrate shown in FIG. 35. That is, an aluminum (Al) layer is formed on the glass substrate 1111 with the electron beam (EB) deposition method and is etched for forming a lower electrode 1112 of the luminous source composed of an electroluminescent (EL) element or a polymer waveguide. By depositing $Al_2O_3$ and $Si_3N_4$ with the sputtering method, an insulating film 1113 is formed on the glass substrate 1111 and the lower substrate 1112. The thickness of the insulating film 1113 is about 2000 Å. A light waveguide 1114 (corresponding to the linear luminous source $Y_1$ shown in FIG. 40) is formed on the insulating film 1113 with the electron beam (EB) deposition method. The light waveguide 1114 is made of ZnS containing 0.5% of Mn and has a thickness of about 8000 Å. The etching treatment is selectively carried out on the light waveguide 1114 for forming cutaways 1114a at the spots opposite to the photoconductive layer 1105 formed on the glass substrate 1101. By sputtering $Si_3N_4$ and $SiO_2$ (silicon oxide), another insulating film 1115 is formed on the light waveguide 1114 where the cutaways 1114a are selectively formed. The thickness of the insulating film 1115 is about 2000 Å. By sputtering ITO on the insulating film 1115 and etching the ITO film, an upper electrode 1116 is formed. The thickness of the ITO film is about 1500 Å. The light waveguide 1114 is laid between the lower electrode 1112 and the upper electrode 1116. The end of the light waveguide 1114 has the luminous source made of an electroluminescent (EL) element.

Polyimide films 1106 and 1117 are coated on the surfaces of the light-scan substrate 1100 and the opposed substrate 1110, respectively. Those polyimide films 1106 and 1117 serve as horizontally orientating the liquid crystal and have the thickness of about 500 Å, respectively. Then, the rubbing treatment is carried out on the polyimide films 1108 and 1117. The light-scan substrate 1100 and the opposed substrate 1110 are pasted by a sealing member 1131 with spacers having 5 μm thickness. Then, liquid crystal 1132 of PCH (phenylcyclohexanone) system (ZLI-1565, manufactured by Merck Co., Inc.) as a display medium is injected and sealed in vacuum between the substrates 1100 and 1110, resulting in forming the liquid crystal display panel in the same process as the sixteenth embodiment of FIG. 35.

The structure of this embodiment is analogous to the structure of the sixteenth embodiment shown in FIG. 35, except that the photoconductive element composed of the photoconductive layer 1105 and the linear luminous source composed of the light waveguide 1114 are formed on the respective substrates. Hence, this embodiment provides the same advantages as the sixteenth embodiment.

In the sixteenth embodiment, however, the signal electrodes are arranged in the column direction on the linear luminous sources which are formed in the row direction. In case that the step difference between the linear luminous source and the glass substrate is large, the etching failure appearing in forming the signal electrodes may result in cutting out the patterns. According to the present embodiment, the signal electrode is formed on a flat passivation film 1102 for preventing the appearance of etching failure.

Figure 42:
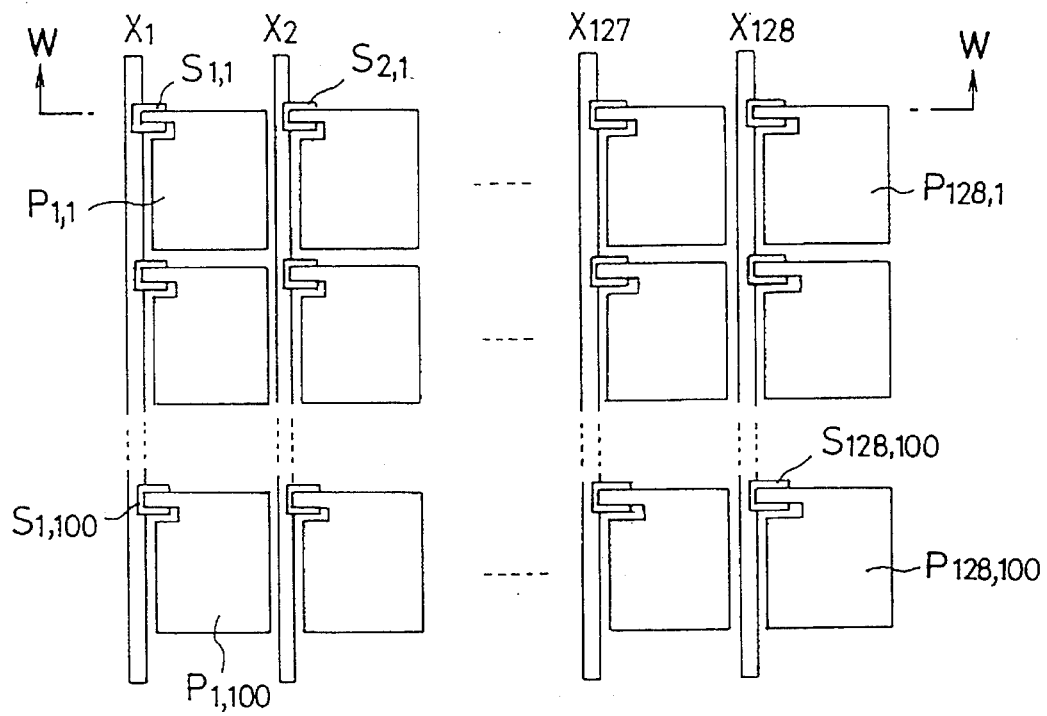
FIG. 42 is a plan view showing a signal electrode substrate of an active matrix driven type LCD display panel according to a twentieth embodiment of the present invention.
Figure 43:
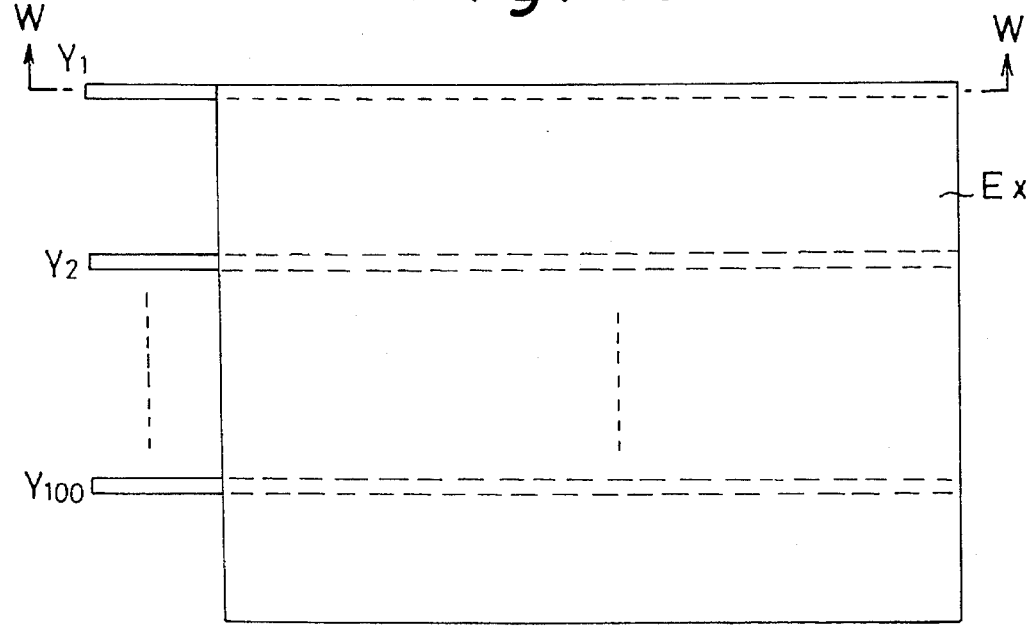
FIG. 43 is a plan view showing a light-scan substrate opposed to the signal electrode substrate of FIG. 42.

FIG. 42 is a plan view showing a signal electrode substrate of an active matrix driven type LCD display panel according to an twentieth embodiment of the present invention. FIG. 43 is a plan view showing a light-scan substrate opposed to the signal electrode substrate of FIG. 43.

As shown in FIG. 42, the arrangement of the twentieth embodiment is analogous to that of the sixteenth embodiment shown in FIG. 32, except that the signal electrodes $X_1$, $X_2$, ..., $X_{128}$, the photoconductive layers $S_{1,1}$ to $S_{128,100}$ and the pixel electrodes $P_{1,1}$ to $P_{128,100}$ are laminated.

That is, the pixel electrodes $P_{1,1}$ to $P_{128,100}$ are arranged in a matrix. For each of the pixel electrodes $P_{1,1}$ to $P_{128,100}$, the photoconductive elements $S_{1,1}$ to $S_{128,100}$ are provided, respectively. For each column of the pixel electrodes $P_{1,1}$ to $P_{128,100}$, that is, $P_{1,1}$ to $P_{1,100}$, $P_{2,1}$ to $P_{2,100}$, ..., $P_{128,1}$ to $P_{128,100}$, the signal lines $X_1$, $X_2$, ..., $X_{128}$ extending in the column direction are formed on the same substrate. The signal lines $X_1$, $X_2$, ..., $X_{128}$ are connected to the corresponding columns of the pixel electrodes $P_{1,1}$ to $P_{1,100}$, $P_{2,1}$ to $P_{2,100}$, ..., $P_{128,1}$ to $P_{128,100}$ through the photoconductive elements $S_{1,1}$ to $S_{1,100}$, $S_{2,1}$ to $S_{2,100}$, ..., $S_{128,1}$ to $S_{128,100}$, respectively. The signal electrodes $X_1$, $X_2$, ..., $X_{128}$, the photoconductive layers $S_{1,1}$ to $S_{128,100}$, and the pixel electrodes $P_{1,1}$ to $P_{128,100}$ are overlapped in sequence.

As shown in FIG. 43, there are provided on the light-scan substrate the linear luminous sources $Y_1$, $Y_2$, ..., $Y_{100}$ extending in the row direction. An electrode Ex is formed on the overall surface of the linear luminous sources.

Figure 44:
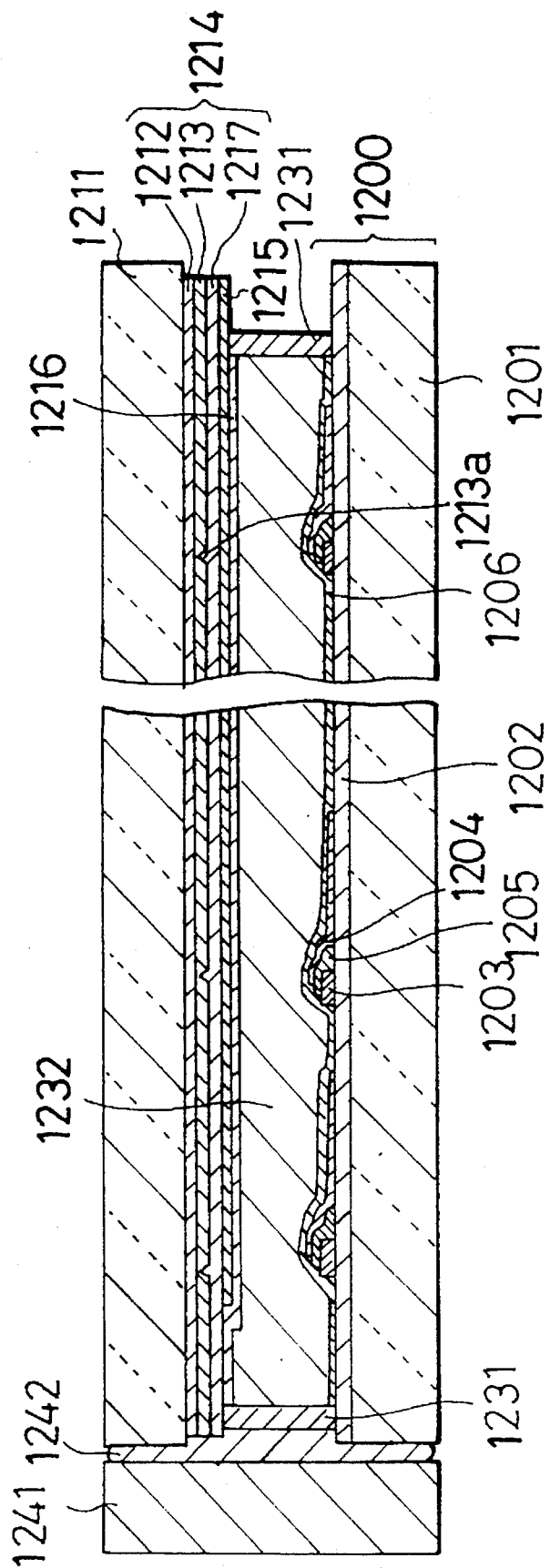
FIG. 44 is a sectional view cut on the W—W line of FIG. 43 showing an LCD panel having the signal electrode substrate shown in FIG. 42 and the light-scan substrate shown in FIG. 43 incorporated therein.

FIG. 44 is a sectional view cut on the W—W line of FIG. 43 showing an LCD panel having the signal electrode substrate shown in FIG. 42 and the light-scan substrate shown in FIG. 43 incorporated therein.

At first, a light-scan substrate 1210 will be described later.

As shown in FIG. 44, epoxy resin is coated on the glass substrate 1211 with a spinner. The coat of the epoxy resin is served as a clad layer 1212. A bisphenol-Z-polycarbonate (PCZ) film containing photopolymerization monomer (acrylate, for example, methyl acrylate) is formed on the epoxy resin with a solution casting method.

By selectively polymerizing the PCZ film through a linear photomask, the PCZ layer is formed as a core layer 1213 and a mixture of the PCZ and polyacrylate having a smaller index of refraction than the PCZ is formed as a clad layer. The core layer 1213 and the clad layer are formed as stripes. The core layer corresponds to the linear luminous sources $Y_1, Y_2, \ldots, Y_{100}$ shown in FIG. 43. The core layer 1213 is etched for forming cutaways 1213a on the surface of the core layer. By coating an epoxy resin film on the core layer for forming the clad layer 1217, the resulting layers compose a polymer waveguide. For forming an electrode 1215, an ITO film is coated on the polymer waveguide with the sputtering method. The electrode 1215 corresponds to the electrode Ex shown in FIG. 43.

Next, a signal electrode substrate 1200 will be described below.

A passivation film 1202 is formed on the glass substrate 1201 with the CVD method. The passivation film 1202 is made of $Ta_2O_3$. An ITO film is coated on the passivation film 1202 with the sputtering method. Then, a signal electrode 1203 and a pixel electrode 1204 are formed on the ITO film with the etching treatment. The thickness of each electrode is about 2000 Å. The signal electrode 1203 and the pixel electrode 1204 respectively correspond to the signal lines $X_1, X_2, \ldots, X_{128}$ and the pixel electrodes $P_{1,1}, P_{2,1}, \ldots, P_{128,1}$ shown in FIG. 42. By forming an a-Si layer with the CVD method and performing the etching treatment on the a-Si layer, a photoconductive layer 1205 is formed between the signal electrode 1203 and the pixel electrode 1204. The photoconductive layer 1205 corresponds to the photoconductive elements $S_{1,1}$ to $S_{128,1}$ shown in FIG. 42.

The structure of the signal electrode substrate 1200 according to the twentieth embodiment is analogous to that of the signal electrode substrate 1100 of the nineteenth embodiment shown in FIG. 41. According to the present (twentieth) embodiment, however, the photoconductive layers 1205 are formed to be opposed to the cutaways 1213a of the core layer 1213 when the signal electrode substrate 1200 and the light-scan substrate 1210 are pasted for forming the LCD panel.

Polyimide films 1206 and 1216 are coated on the surfaces of the signal electrode substrate 1200 and the light-scan substrate 1210, respectively. Those polyimide films 1206 and 1216 serve as horizontally orientating the liquid crystal and have the thickness of about 500 Å, respectively. Then, the rubbing treatment is carried out on the polyimide films 1206 and 1216. The signal electrode substrate 1200 and the light-scan substrate 1210 are pasted by a sealing member 1231 with spacers having 5 μ thickness. Then, liquid crystal 1232 of PCH (phenylcyclohexanone) system (ZLI-1565, manufactured by Merck Co., Inc.) as a display medium is injected and sealed in vacuum between the substrates 1200 and 1210, resulting in forming the liquid crystal display panel in the same process as the sixteenth embodiment of FIG. 35.

At the end of the LCD panel, an LED array 1241 is connected to the core layer 1213 through a ultraviolet ray hardening agent 1242 with the same index of refraction as that of the core layer.

The operation of the present (twentieth) embodiment is the same as that of the sixteenth and the nineteenth embodiments shown in FIGS. 35 and 41, respectively. Hence, the present embodiment provides the same advantages as those foregoing said example and embodiments. The different respect of the present embodiment is, however, that the photoconductive layer having as high a film-forming temperature as 250° C. to 300° C. and the linear luminous source are formed on the respective substrates. This feature makes it possible to use a polymer waveguide having as low a heat-resistance temperature as 120° C. for the linear luminous source. In addition, the present embodiment provides an advantage of preventing etching failure caused in the signal electrode like the nineteenth embodiment shown in FIG. 41.

The sixteenth and the seventeenth embodiments shown in FIGS. 32 and 36 have provided a luminous source composed of an electroluminescent (EL) element or a polymer waveguide on one side of the light waveguide. Alternatively, the luminous source may be provided on both sides of the light waveguide.

The foregoing examples and embodiments have provided for one scan line one luminous source composed of an electroluminescent (EL) element or a polymer waveguide. Alternatively, two or more luminous sources for one scan line are allowed to provide on one side or both sides of the scan line. This results in offering a more excellent advantage.

As another method, the light waveguide is formed on a glass substrate by means of a micro-optics technique such as an ion implantation technique. After making an LCD panel, the luminous sources for light scanning such as electroluminescent (EL) elements and laser elements are formed on another substrate. The substrate may be connected to the panel through an optical connecting medium.

As mentioned above, the photoconductive element may be structured to bridge-connect the signal line with the pixel electrode (see FIGS. 34 and 41) or the signal line, the photoconductive element and the pixel electrode may be laminated (see FIG. 44). The bridge-connecting structure results in lowering the capacitance composed of the signal line and the pixel electrode to a quite small value. Hence, the leakage of the signal to the pixel electrode becomes negligible during the non-selection (disconnection) time. That is, the bridge-connecting structure makes it possible to drive tile pixel at a desired voltage more positively than the laminating structure.

In addition to ZnS containing 0.5% of Mn, the light waveguide may use any material only if it has a larger index of refraction than that of the substrate around itself. Further, the light waveguide (linear luminous source) may be formed on the upper opposed substrate in a manner to be located above the photoconductive element.

To suppress change of impedance of the photoconductive element resulting from the outer light, it is effective to form a light-shielding layer on the upper and the lower sides of the photoconductive element. To prevent the light passing through the light waveguide (linear luminous source) from being diffused outside of the photoconductive element, it is effective to form the light-reflecting layer made of metal on the light waveguide (linear luminous source).

To realize a reflection type or transmission type full-color or multi-color display, it is possible to use a substrate having a color filter mounted thereon or a liquid crystal with a color display mode such as a guest host mode.

In addition to the a-Si, the photoconductive element may use a-SiC (amorphous silicon carbide) or a-SiN (amorphous silicon nitride).

In addition to the combination of the linear light waveguide and the luminous source composed of an electroluminescent (EL) element or a polymer waveguide, the linear luminous source may be composed of the combination of a linear light waveguide and a linear electroluminescent (EL) element, an LED or a semiconductor laser.

The display medium may use LCD, ECD, EPID (electrophoresis display). For realizing a full-color display, the LCD is the most desirable display medium.

Many widely different embodiments of the present invention may be constructed without departing from the spirit and scope of the present invention. It should be understood that the present invention is not limited to the specific embodiments described in the specification, except as defined in the appended claims.

What is claimed is:

1. A display apparatus comprising:

a first substrate having transparent electrodes formed thereon;

a second substrate having a plurality of linear luminous sources arranged in parallel with each other laminated thereon, each of said plurality of linear luminous sources being capable of emitting light, a plurality of linear electrodes arranged in parallel with each other, being crossed with said plurality of linear luminous sources, structured and arranged so that a signal can be applied to a selected one of said plurality of linear electrodes, and a plurality of photoconductive layers provided at crossed positions of said plurality of linear luminous sources and said plurality of linear electrodes, each photoconductive layer serving to perform an electrical switching operation in response to light applied from one of said plurality of linear luminous sources, at least two members of a set including each of said plurality of linear electrodes, each of said transparent electrodes, and each of said plurality of photoconductors defining respective planar structures; and a liquid crystal layer arranged between said first substrate and said second substrate, said liquid crystal layer having pixels each to be driven by said signal applied through one of said photoconductive layers located at a crossed position of one of said plurality of linear electrodes to which said signal is applied and one of said plurality of linear luminous sources which emits the light, wherein each of said linear luminous sources has a cut-away formed by etching treatment for increasing quantity of light emitted outside of said linear luminous source.

2. A display apparatus comprising:

a first substrate having transparent electrodes;

a second substrate having a plurality of linear luminous sources on said second substrate arranged in parallel with each other, each of said plurality of linear luminous sources being capable of emitting light, a plurality of linear electrodes formed on said second substrate arranged in parallel and crossed with said plurality of linear luminous sources, structured and arranged so that a signal can be supplied to a selected one of said plurality of linear electrodes, a plurality of pixel electrodes formed on the second substrate, a plurality of photoconductive layers formed on the second substrate adjacent to crossed positions of said plurality of linear luminous sources and said plurality of linear electrodes, said plurality of photoconductive layers being located on the same level as said plurality of pixel electrodes to bridge between said plurality of pixel electrodes and said plurality of linear electrodes, respectively, and serving to perform a switching operation for electrically connecting one of said plurality of linear electrodes to one of said plurality of pixel electrodes in response to light applied from one of said linear luminous sources; and a liquid crystal layer being located between said first substrate and said second substrate, said liquid crystal layer having pixels corresponding to said pixel electrodes, respectively, one of said pixels being driven by the signal applied to a corresponding one of said pixel electrodes through the photoconductive layer located adjacent to a crossed position of the one of said plurality of linear electrodes to which the signal is applied and one of said plurality of linear luminous sources, which emits the light, and bridging said one of said linear electrodes and said one of said pixel electrodes.

3. A display apparatus according to claim 2, wherein each of said plurality of linear luminous sources is composed of an electroluminescent luminous element and a light waveguide.

4. A display apparatus according to claim 2, wherein each of said plurality of linear luminous sources is composed of an LED and a light waveguide, said plurality of linear luminous sources forming an LED array.

5. A display apparatus according to claim 2, wherein said first substrate and said second substrate each include a fiber plate.

6. A display apparatus according to claim 2, wherein light-shielding layers are provided on the side of said second substrate away from said plurality of photoconductive layers.

7. A display apparatus comprising:

a first substrate having thereon a plurality of linear luminous sources;

a second substrate having thereon a plurality of pixel electrodes for driving a display medium, a plurality of signal lines arranged in column directions, and a plurality of photoconductors provided for said plurality of pixel electrodes and serving to electrically connect or disconnect said plurality of signal lines to or from said pixel electrodes, respectively, at least two members of a set including each of said plurality of pixel electrodes, each of said plurality of signal lines, and each of said plurality of photoconductors defining respective planar structures, said plurality of linear luminous sources being arranged in row directions for selectively applying light to said plurality of photoconductors, on said second substrate, and for controlling connection or disconnection of said photoconductors; and a display medium provided between said first substrate and said second substrate.

8. A display apparatus according to claim 7, wherein each of said plurality of linear luminous sources is formed of a polymer waveguide.

9. A display apparatus according to claim 7, wherein each of said plurality of linear luminous sources is composed of an electroluminescent luminous element and a light waveguide.

10. A display apparatus according to claim 7, wherein said display medium includes liquid crystal.

* * * * *